(12) United States Patent
Duginske

(10) Patent No.: US 11,338,372 B2
(45) Date of Patent: May 24, 2022

(54) MODULAR JIG AND FIXTURE SYSTEMS AND METHODS

(71) Applicant: Mark A. Duginske, Merrill, WI (US)

(72) Inventor: Mark A. Duginske, Merrill, WI (US)

( * ) Notice: Subject to any disclaimer, the term of this patent is extended or adjusted under 35 U.S.C. 154(b) by 0 days.

(21) Appl. No.: 17/359,215

(22) Filed: Jun. 25, 2021

(65) Prior Publication Data

US 2021/0316374 A1 Oct. 14, 2021

Related U.S. Application Data

(62) Division of application No. 16/291,951, filed on Mar. 4, 2019, now Pat. No. 11,084,106.

(60) Provisional application No. 62/637,456, filed on Mar. 2, 2018.

(51) Int. Cl.
| | |
|---|---|
| *B23B 47/28* | (2006.01) |
| *B23Q 3/06* | (2006.01) |
| *B25B 5/00* | (2006.01) |
| *B27B 27/10* | (2006.01) |

(52) U.S. Cl.
CPC .............. *B23B 47/287* (2013.01); *B23Q 3/06* (2013.01); *B25B 5/006* (2013.01); *B27B 27/10* (2013.01); *B23B 47/288* (2013.01); *B23B 2247/10* (2013.01); *B23B 2247/12* (2013.01); *B23B 2260/004* (2013.01); *B23B 2260/088* (2013.01)

(58) Field of Classification Search
CPC . B23Q 3/02; B23Q 3/069; B23Q 3/06; B23Q 3/10–108; B23Q 3/102; B25B 5/006; B25B 5/166; B27B 27/10; B27B 27/02; Y10T 83/762; Y10T 83/7647; F16B 2/12

USPC .............. 269/36, 303, 304, 318, 35, 37, 291
See application file for complete search history.

(56) References Cited

U.S. PATENT DOCUMENTS

| | | |
|---|---|---|
| 2,838,966 A | 6/1958 | Campbell |
| 2,966,080 A | 12/1960 | Atols |
| 3,964,360 A | 6/1976 | Schwartz |
| 4,145,160 A | 3/1979 | Wiggins |
| 4,449,867 A | 5/1984 | Dergo |
| 4,476,757 A | 10/1984 | Morris |
| 4,920,846 A | 5/1990 | Duginske et al. |
| 4,955,766 A | 9/1990 | Sommerfeld |
| 5,018,912 A | 5/1991 | Reitz |
| 5,038,486 A | 8/1991 | Ducate, Sr. |
| 5,107,601 A | 4/1992 | Semchuck |
| 5,275,074 A | 1/1994 | Taylor et al. |
| 5,337,641 A | 8/1994 | Duginske |
| 5,353,515 A | 10/1994 | Alvis et al. |
| 5,490,665 A | 2/1996 | Thiele et al. |

(Continued)

FOREIGN PATENT DOCUMENTS

WO 2012165977 A1 12/2012

OTHER PUBLICATIONS

ABZ Woodshop, Shaker Bench Project, Copyright 2014 Mark Duginske & Jon Drew, 15 pages.

(Continued)

*Primary Examiner* — Lee D Wilson
*Assistant Examiner* — Robert F Neibaur
(74) *Attorney, Agent, or Firm* — Quarles & Brady LLP

(57) ABSTRACT

Jigs and fixtures for aligning, guiding, and/or holding a workpiece on woodworking machinery during a woodworking operation are described, as well as methods of making, modifying, and using jigs and fixtures.

20 Claims, 65 Drawing Sheets

(56) References Cited

U.S. PATENT DOCUMENTS

| | | |
|---|---|---|
| 5,493,789 A | 2/1996 | Duginske |
| 5,547,305 A * | 8/1996 | Treche .................... B25B 5/006 |
| | | 403/103 |
| 5,595,378 A * | 1/1997 | Martinsson ............. F16B 2/065 |
| | | 269/152 |
| 5,617,909 A | 4/1997 | Duginske |
| 5,666,737 A | 9/1997 | Ryan, III |
| 5,676,000 A | 10/1997 | Chen |
| 5,735,054 A | 4/1998 | Cole |
| 5,768,966 A | 6/1998 | Duginske |
| 5,787,781 A | 8/1998 | Hile |
| 5,813,803 A | 9/1998 | Sommerfeld |
| 6,000,688 A * | 12/1999 | Giangrasso ............ B23Q 3/104 |
| | | 269/252 |
| 6,237,457 B1 | 5/2001 | Taylor |
| 6,240,822 B1 | 6/2001 | Musser |
| 6,481,936 B1 | 11/2002 | Hecht |
| 6,499,224 B1 | 12/2002 | Asick |
| 6,502,492 B1 | 1/2003 | Krohmer et al. |
| D471,925 S | 3/2003 | Duginske |
| 6,557,601 B1 | 5/2003 | Taylor |
| 6,599,064 B1 | 7/2003 | Robinson |
| 6,622,997 B2 | 9/2003 | Emerson |
| 6,880,442 B2 | 4/2005 | Duginske |
| 6,910,592 B1 | 6/2005 | Lindenmeyer |
| 7,464,737 B2 * | 12/2008 | Duginske ................ B27B 27/02 |
| | | 144/253.1 |
| 7,641,425 B2 | 1/2010 | Sommerfeld et al. |
| 7,726,411 B2 | 6/2010 | McSheffrey, Jr. et al. |
| 7,798,187 B1 | 9/2010 | Duginske |
| 7,930,960 B2 | 4/2011 | Duginske |
| 8,083,443 B1 | 12/2011 | Circosta et al. |
| 8,231,313 B2 | 7/2012 | Sommerfeld et al. |
| 8,840,345 B1 | 9/2014 | Park |
| 9,381,621 B2 * | 7/2016 | Taylor ................... B25B 1/2405 |
| 9,670,949 B1 * | 6/2017 | White ....................... F16B 2/12 |
| 9,757,842 B2 * | 9/2017 | Huelsmann ............. E05C 19/14 |
| 9,969,042 B2 | 5/2018 | Clark |
| 10,144,068 B1 | 12/2018 | Poole et al. |
| 10,253,922 B1 * | 4/2019 | Yidong ................. F16M 11/16 |
| 10,399,152 B2 | 9/2019 | Chang |
| 10,646,933 B2 | 5/2020 | Duginske |
| 11,020,808 B2 | 6/2021 | Duginske |
| 2001/0047706 A1 | 12/2001 | Parks et al. |
| 2002/0150434 A1 | 10/2002 | Sommerfeld et al. |
| 2003/0056631 A1 | 3/2003 | Duginske |
| 2004/0065387 A1 | 4/2004 | Smith |
| 2005/0056345 A1 | 3/2005 | Duginske |
| 2005/0115376 A1 | 6/2005 | Jimenez |
| 2005/0279200 A1 | 12/2005 | Duginske |
| 2006/0027713 A1 * | 2/2006 | van Walraven ....... F16L 3/2431 |
| | | 248/56 |
| 2006/0191122 A1 | 8/2006 | Collins |
| 2006/0228180 A1 | 10/2006 | Sommerfeld et al. |
| 2006/0233620 A1 | 10/2006 | Herrick |
| 2006/0248998 A1 | 11/2006 | Duginske |
| 2007/0280795 A1 | 12/2007 | McDaniel et al. |
| 2009/0053003 A1 | 2/2009 | Clark |
| 2011/0192497 A1 | 8/2011 | Clark |
| 2014/0197589 A1 | 7/2014 | Ducek et al. |
| 2014/0341665 A1 | 11/2014 | Clark |
| 2015/0298217 A1 | 10/2015 | Clark et al. |
| 2017/0087644 A1 | 3/2017 | Pelkey |
| 2017/0100782 A1 | 4/2017 | Pedersen |
| 2018/0185930 A1 | 7/2018 | Duginske |
| 2019/0270143 A1 | 9/2019 | Duginske |

OTHER PUBLICATIONS

Duginske, Basic Cabinetmaking, Copyright 2005 Mark Duginske, 40 pages.
Kreg, Kreg Jig Support Stop Assembly and Instructions, Version 2005701, 2 pages.
Kreg, Quick-Start Guide, Rev C, Jun. 2010, 27 pages.
Kreg, Precision Trak & Stop Kit, KMS8000, Instructional Manual, May 2010, 3 pages.
Kreg, Kreg Jig K4 / Kreg Jig K4 Master System, Owner's Manual, Version 1, Apr. 2015, 32 pages.
Kreg, Kreg Jig K5 / Kreg Jig K5 Master System, Owner's Manual, Version 2, Nov. 2016, 40 pages.
Kreg, Solutions, vol. 32, 2016, 31 pages.
Woodpeckers, 1" Flip Stop, 1 page.
Kreg, Kreg Jig Material Support Stop Assembly and Instructions, NK9292, Version 1, Jan. 2018, 2 pages.
Kreg, Solutions, vol. 33, 2017, 64 pages.

* cited by examiner

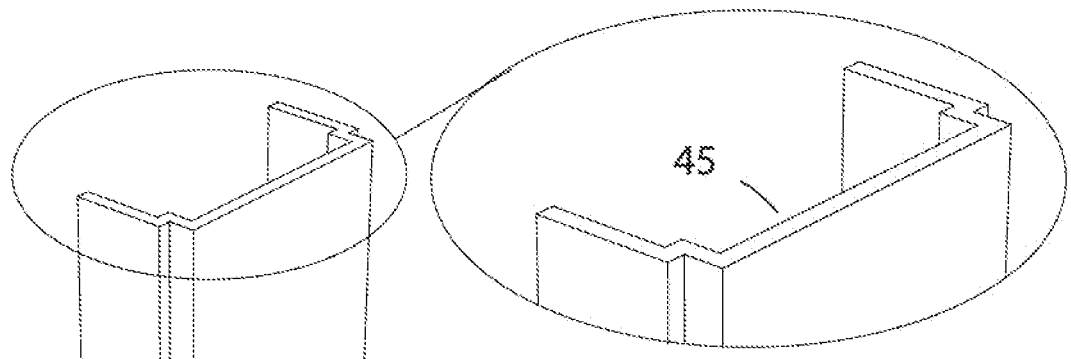
FIG. 2 B
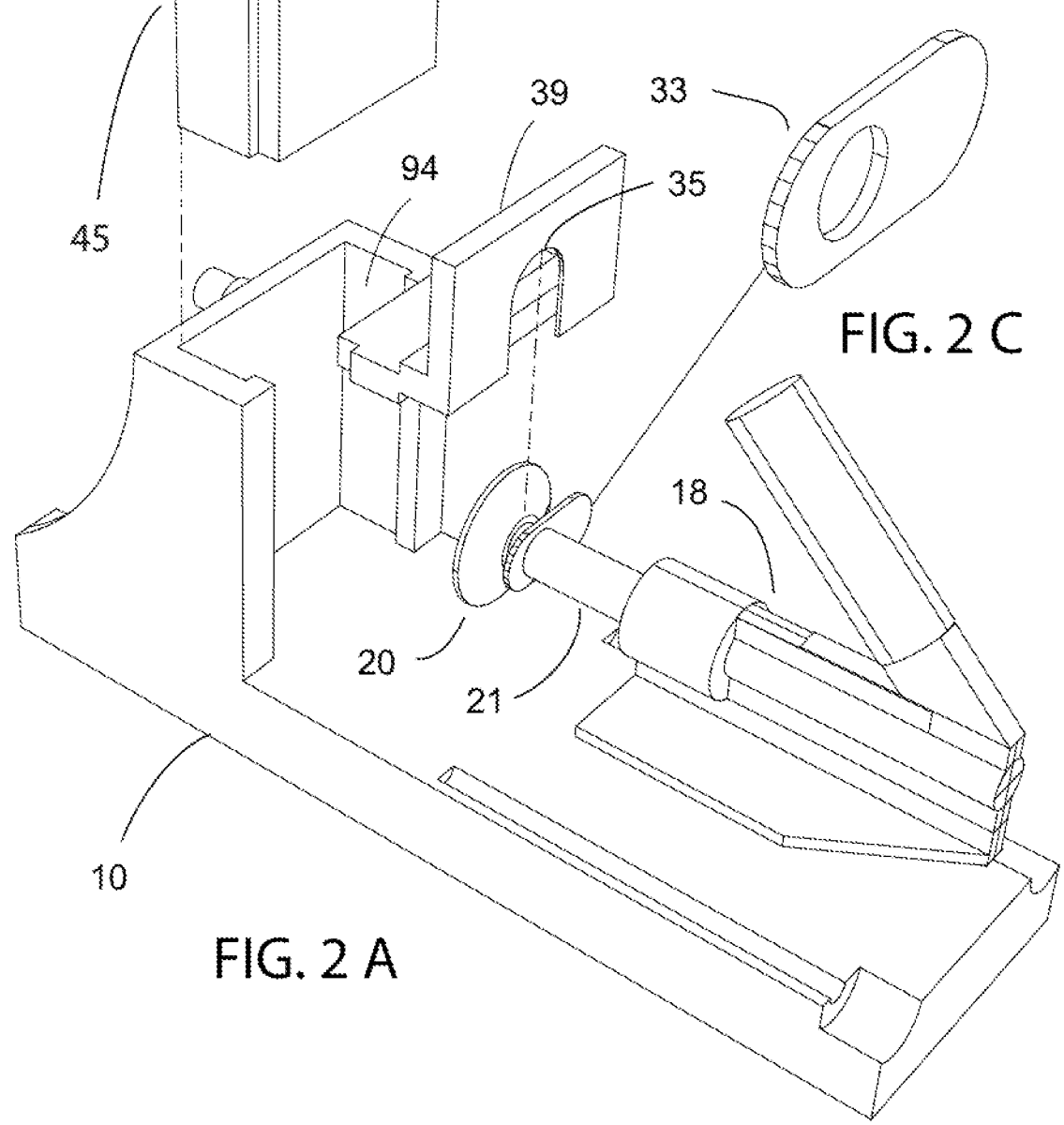
FIG. 2 C
FIG. 2 A

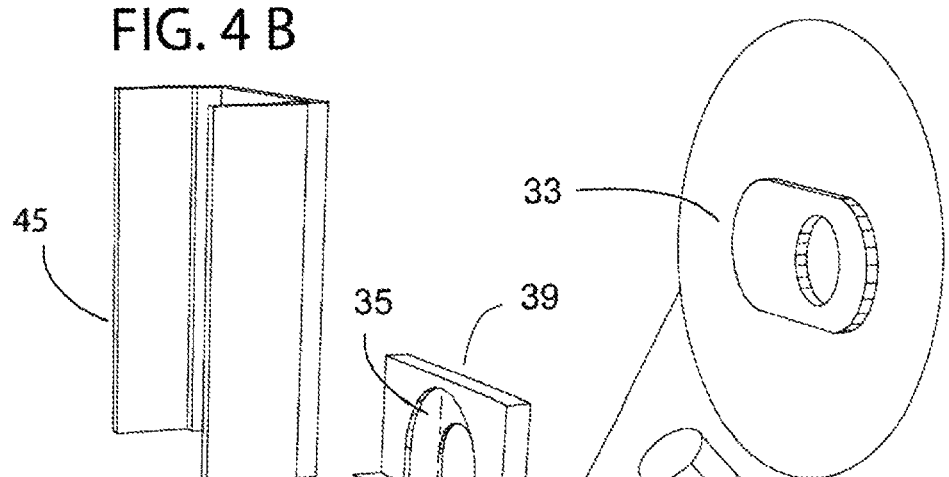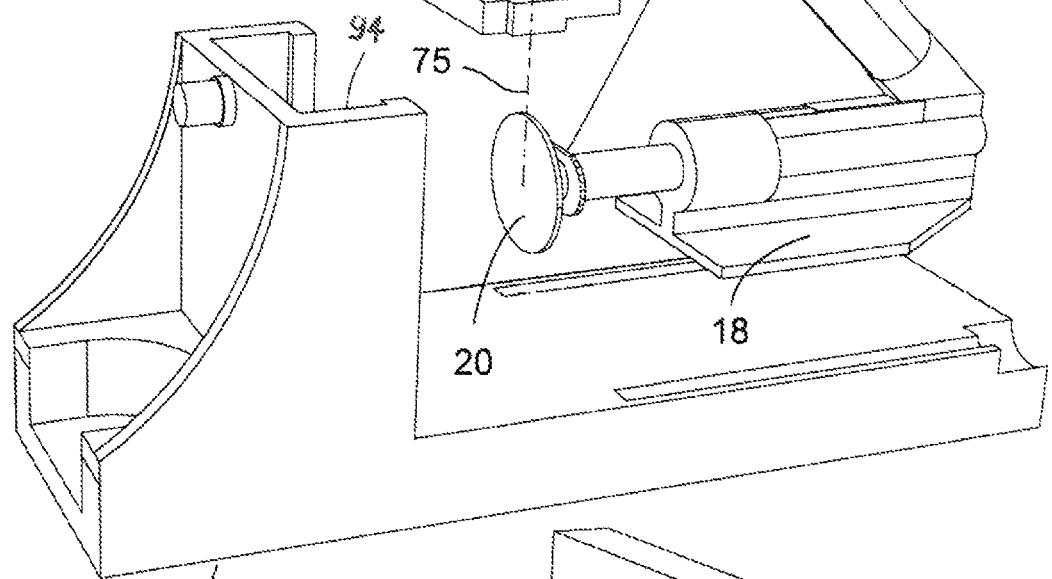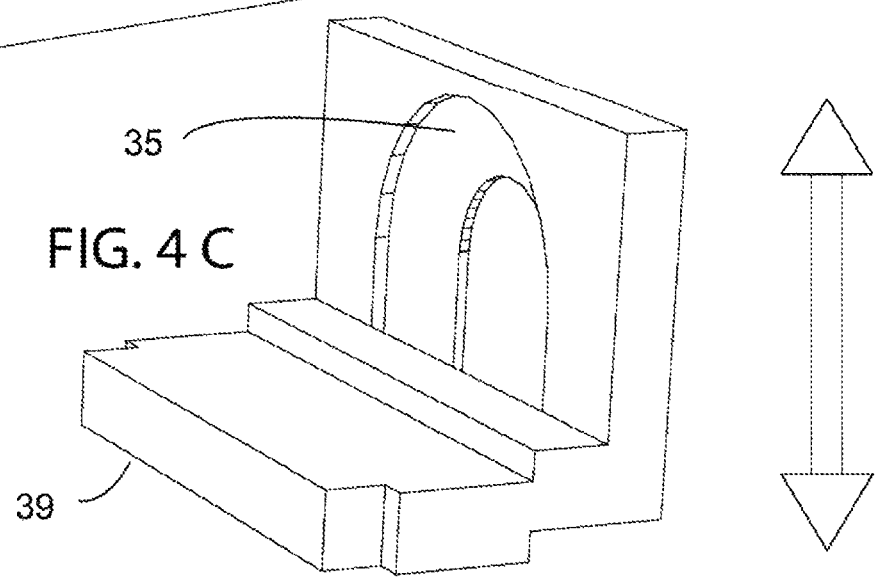

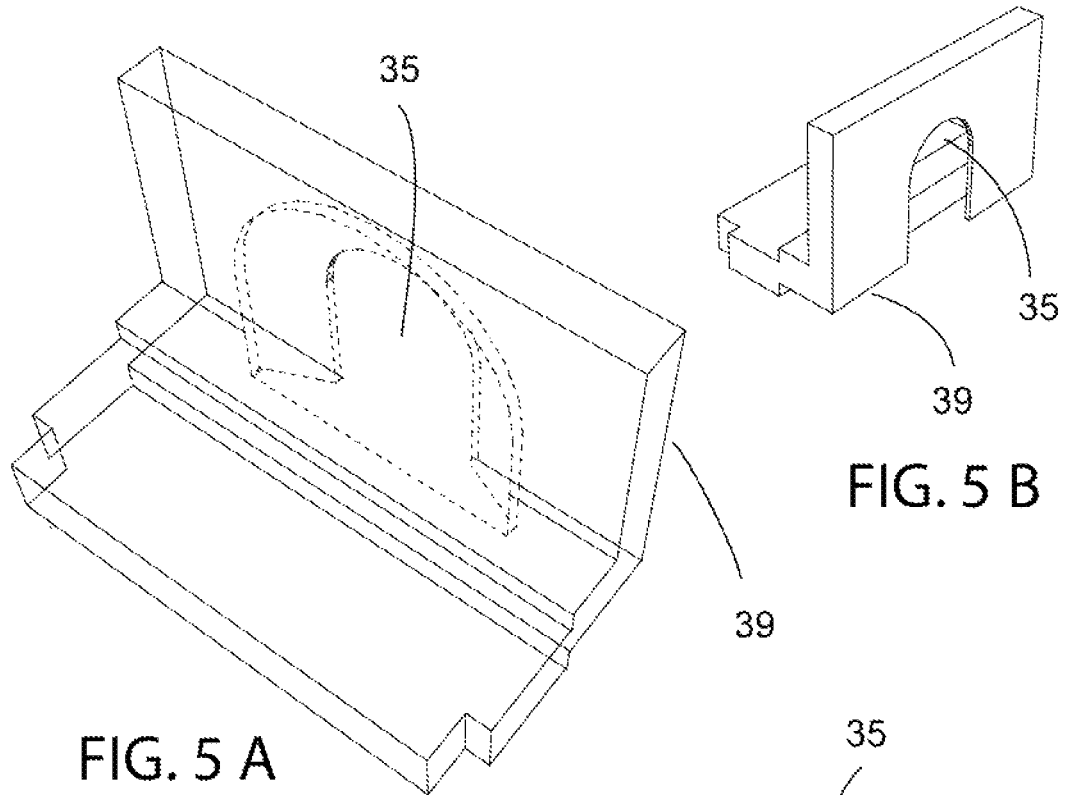
FIG. 5 A
FIG. 5 B
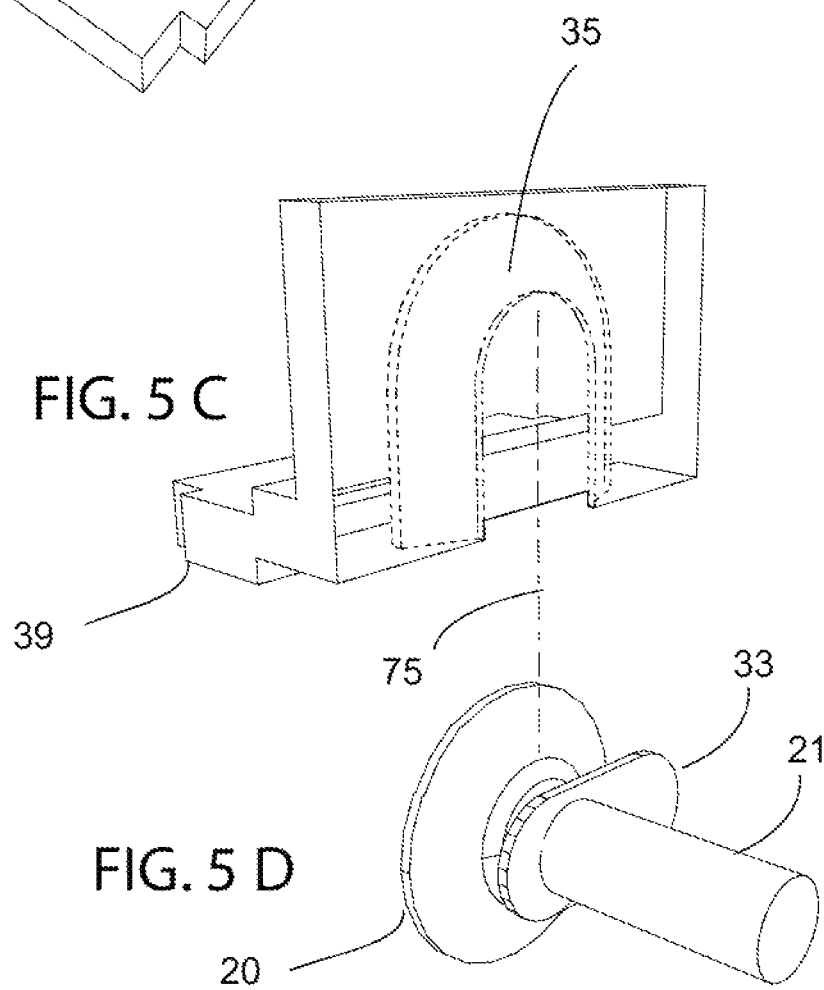
FIG. 5 C
FIG. 5 D

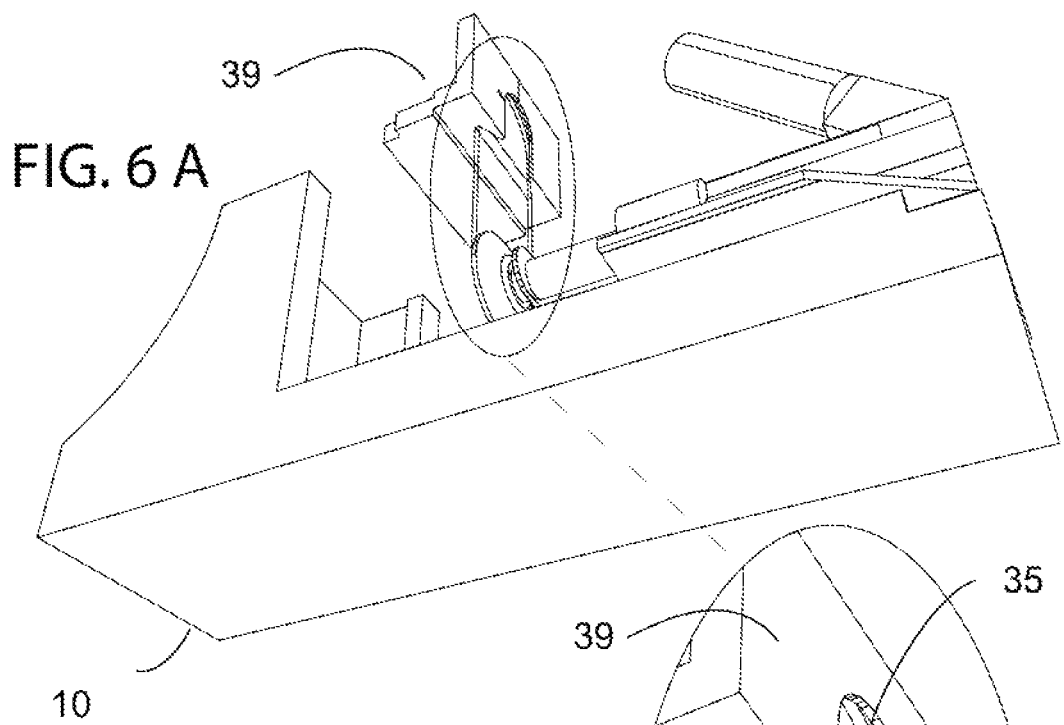
FIG. 6 A
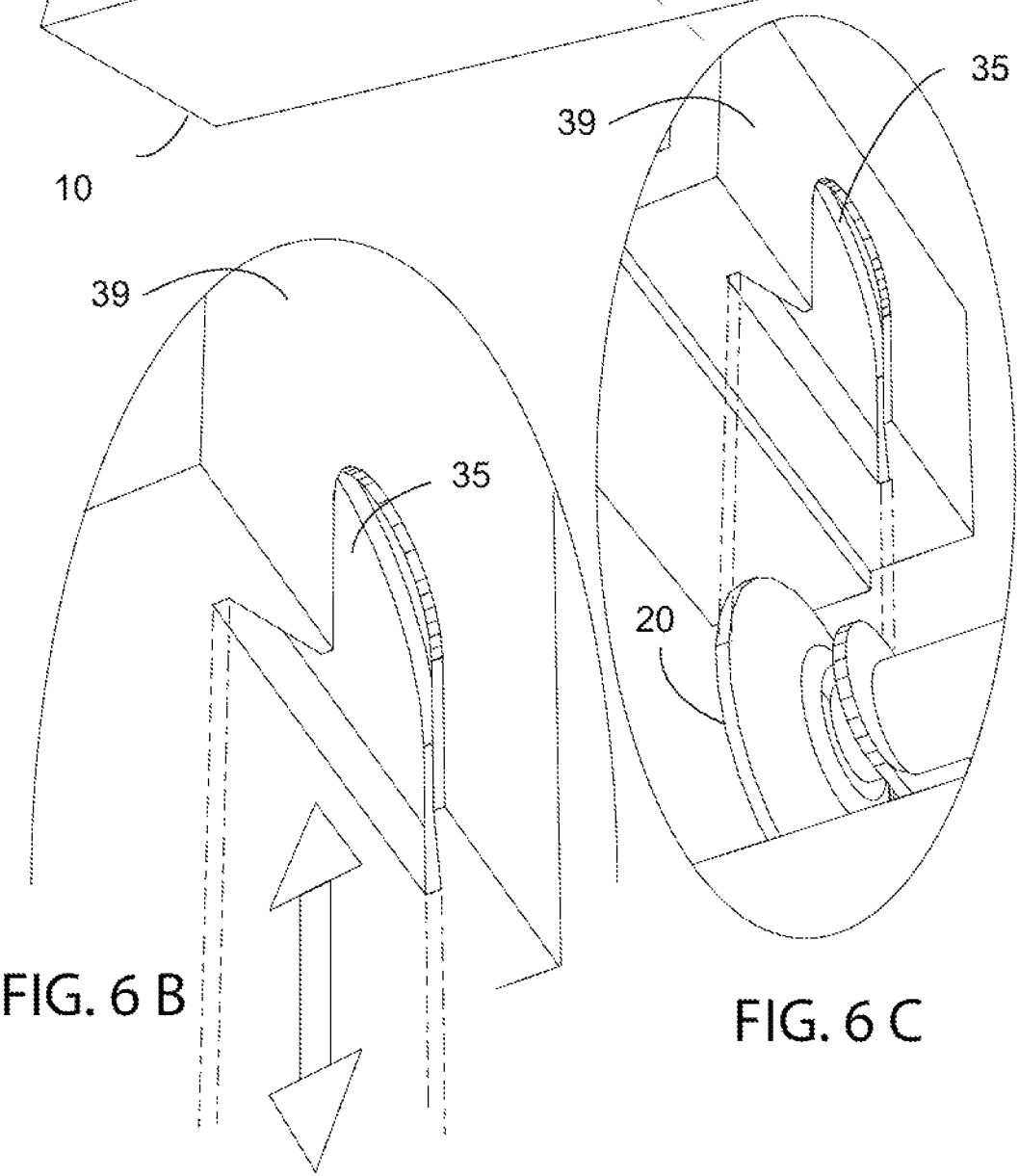
FIG. 6 B
FIG. 6 C

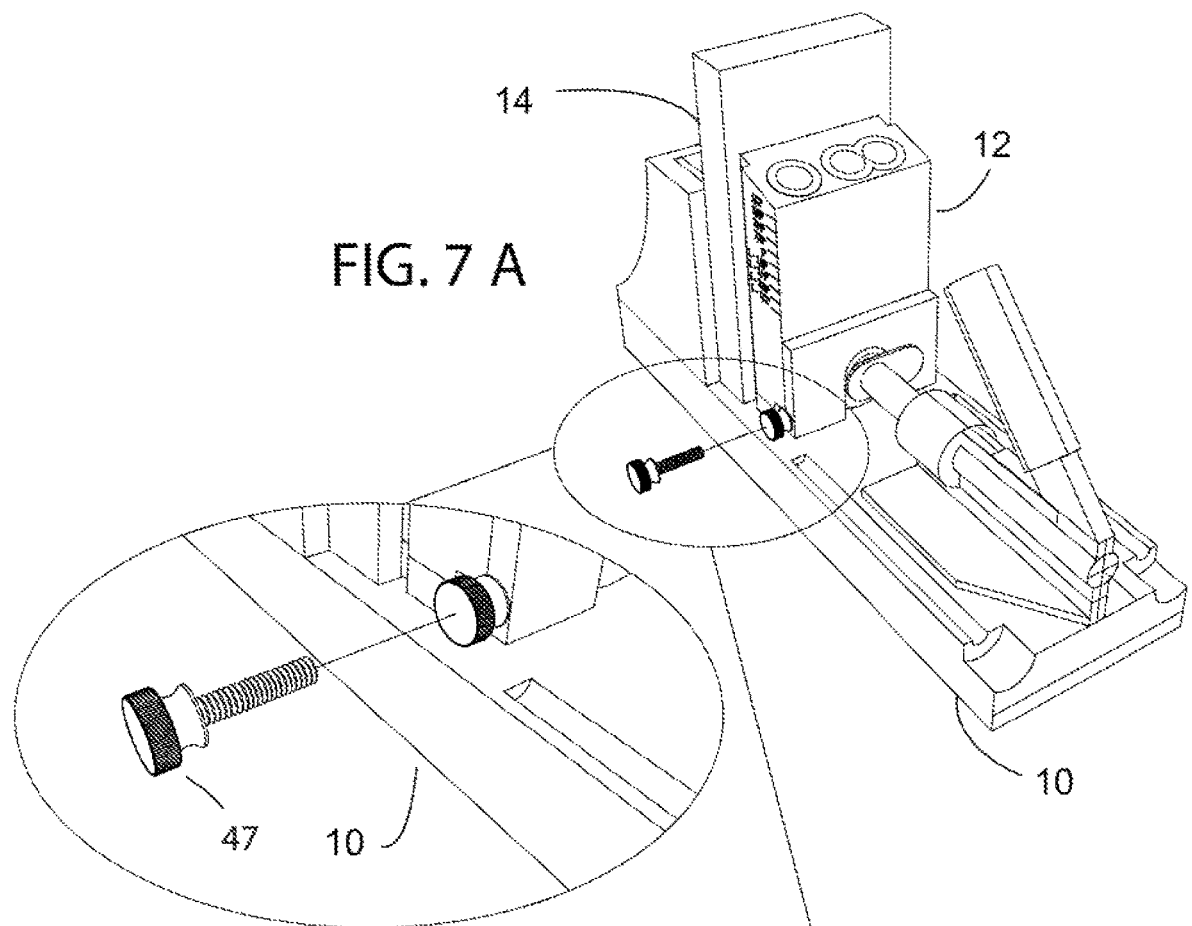
FIG. 7 A
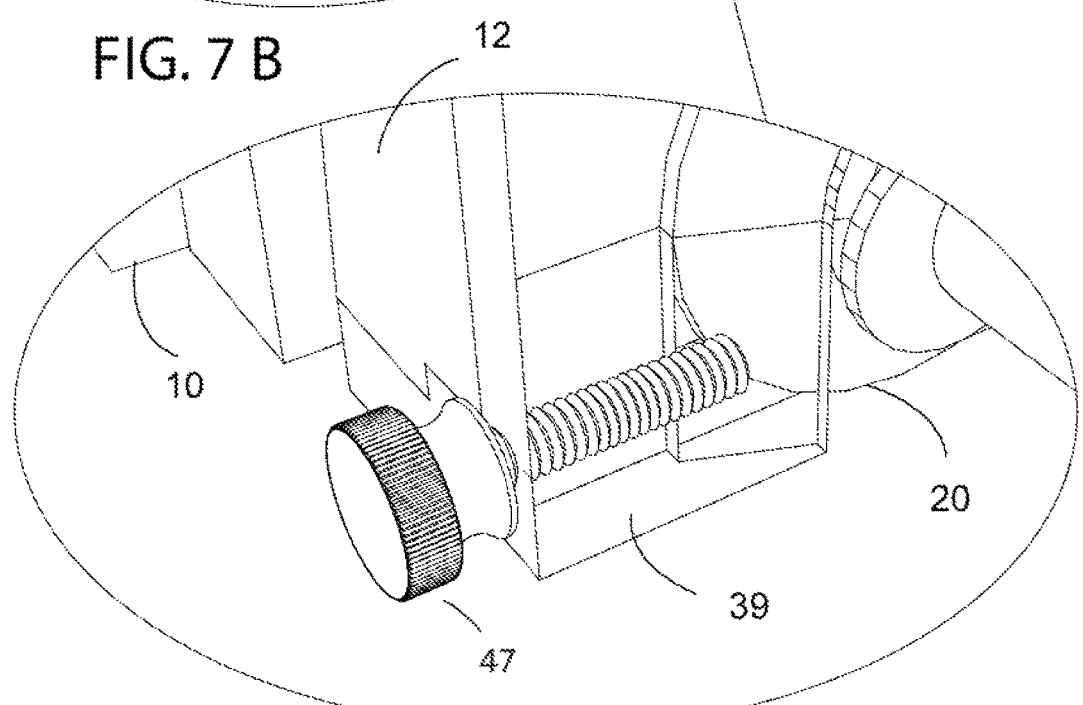
FIG. 7 B
FIG. 7 C

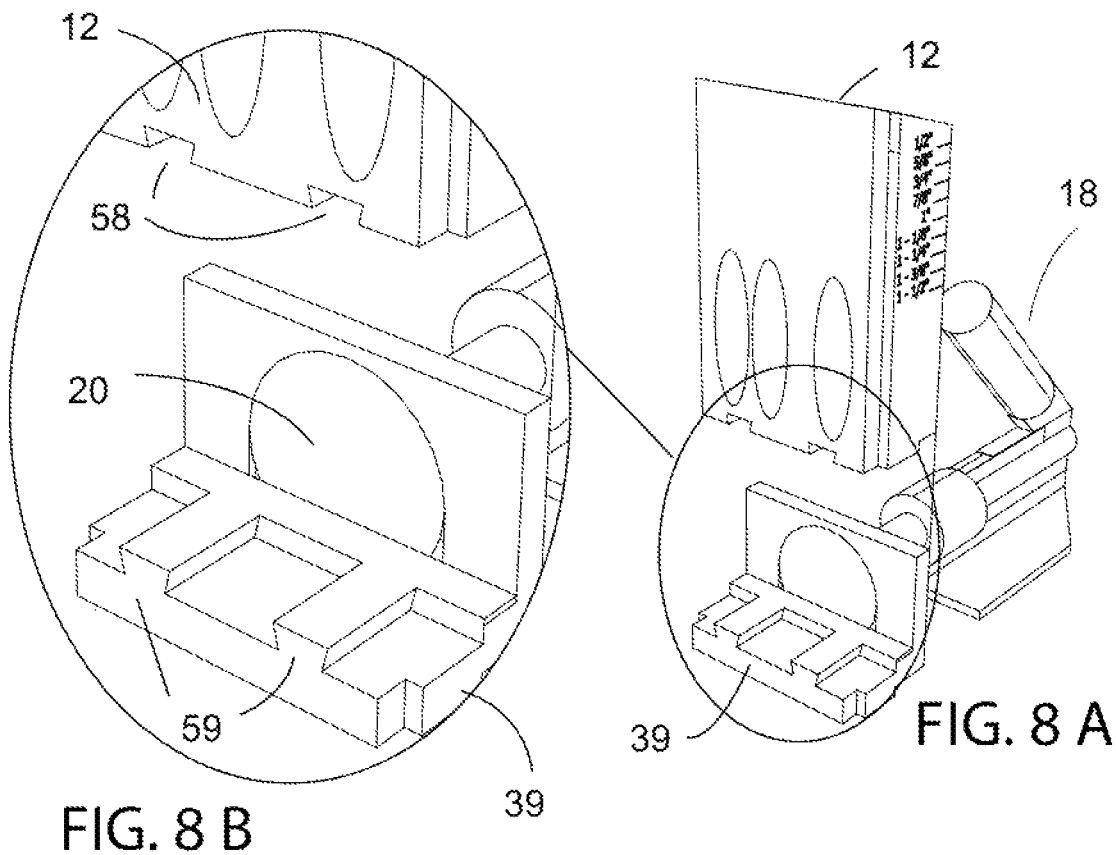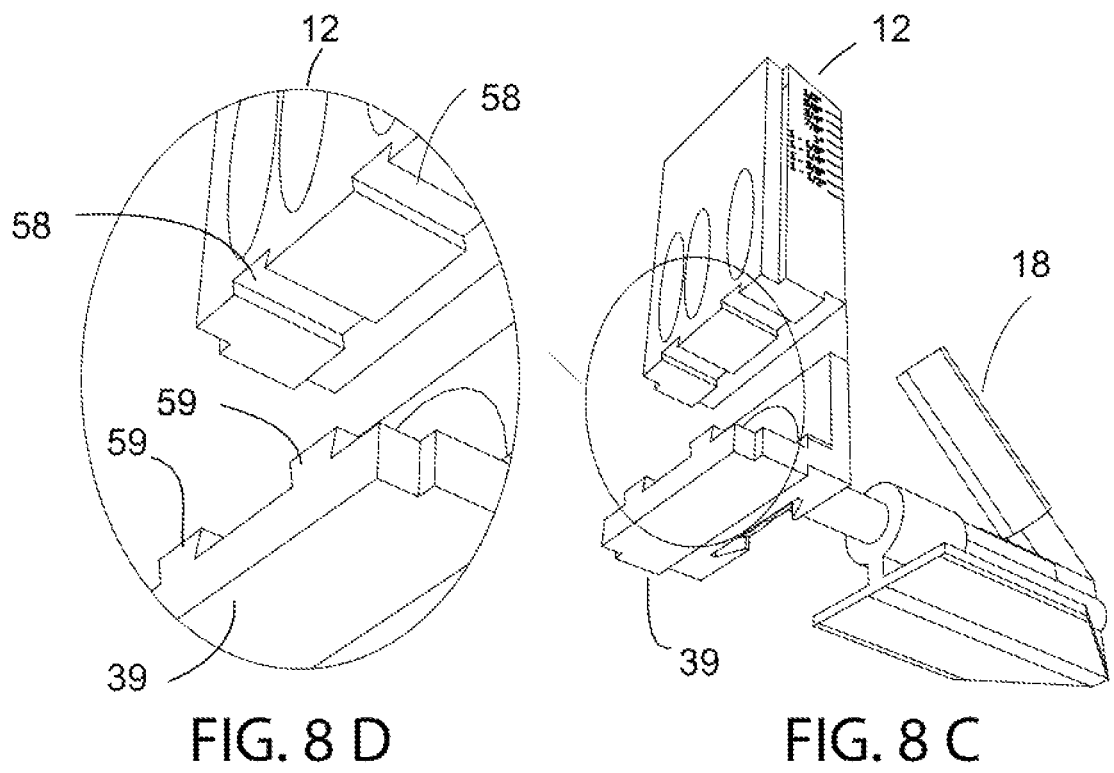

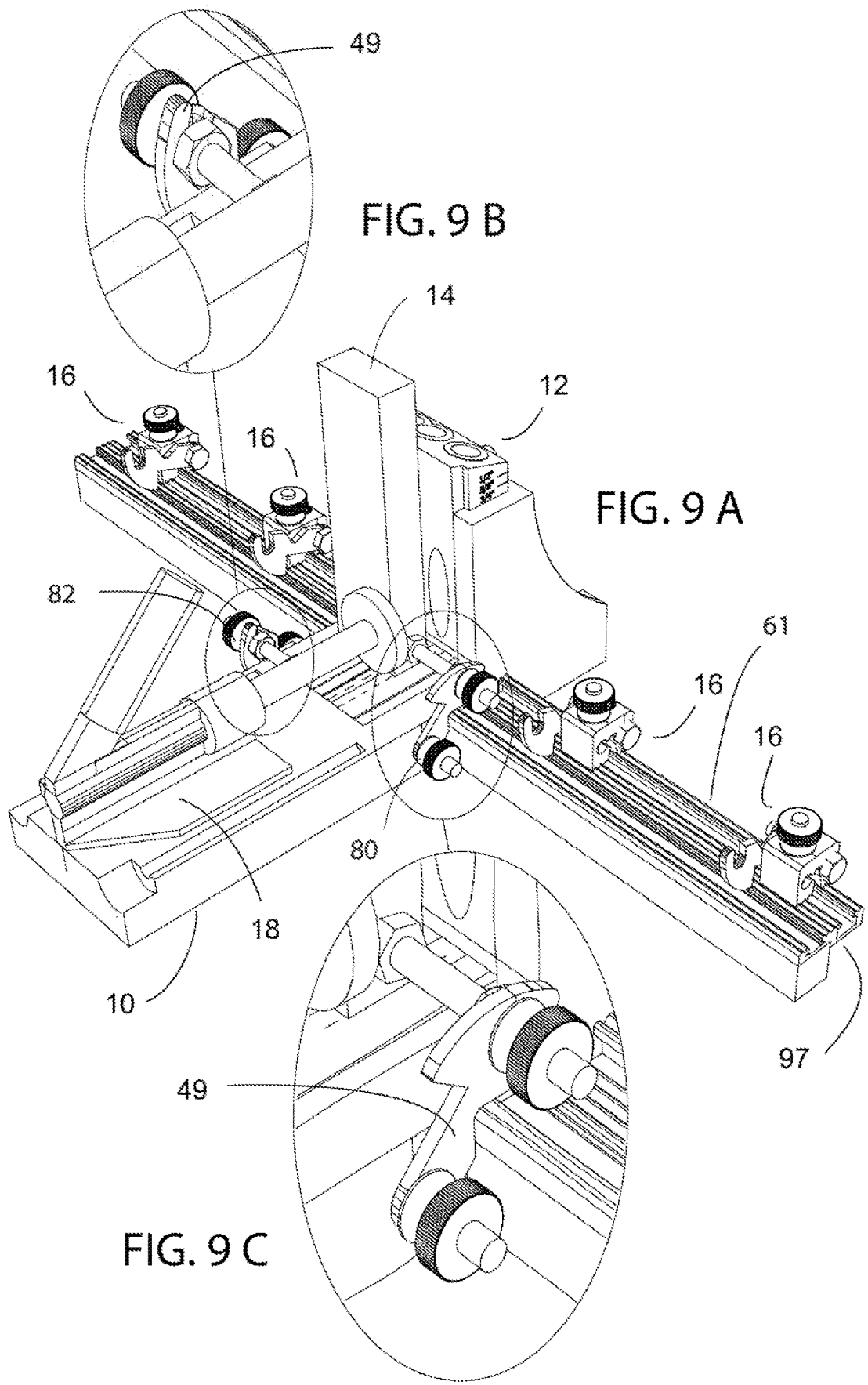

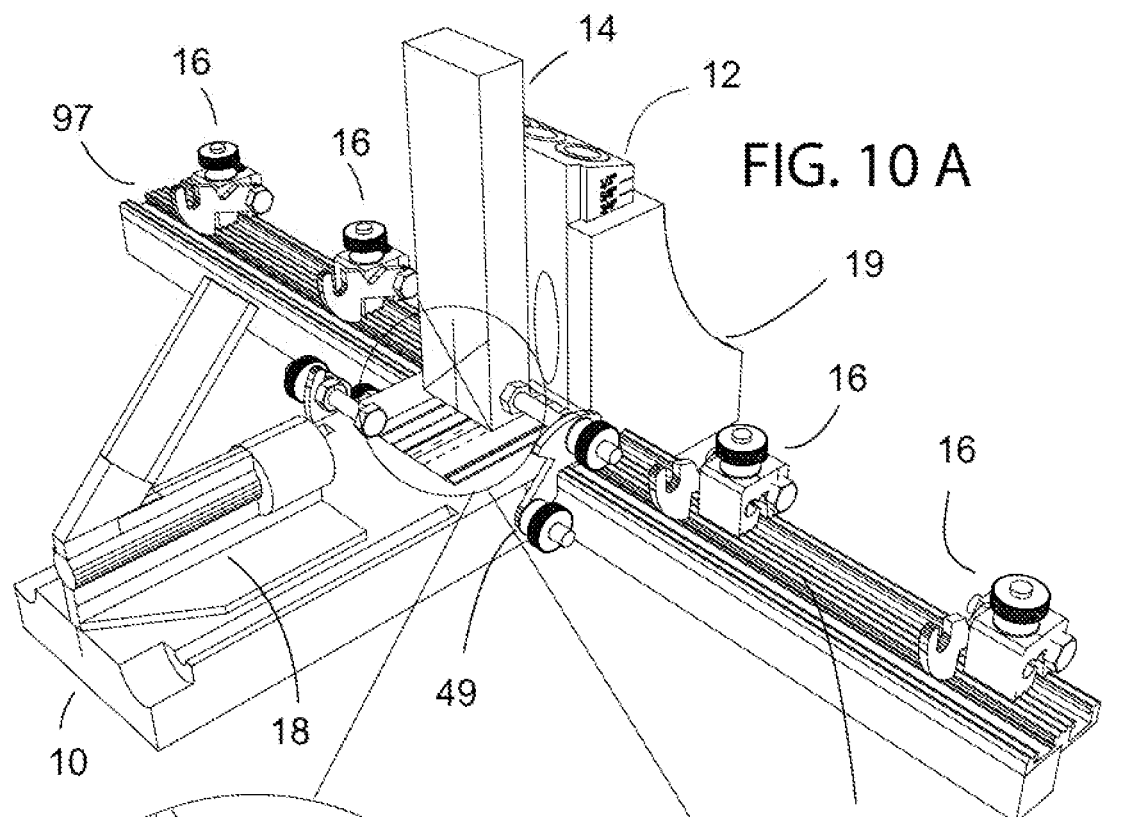
FIG. 10 A
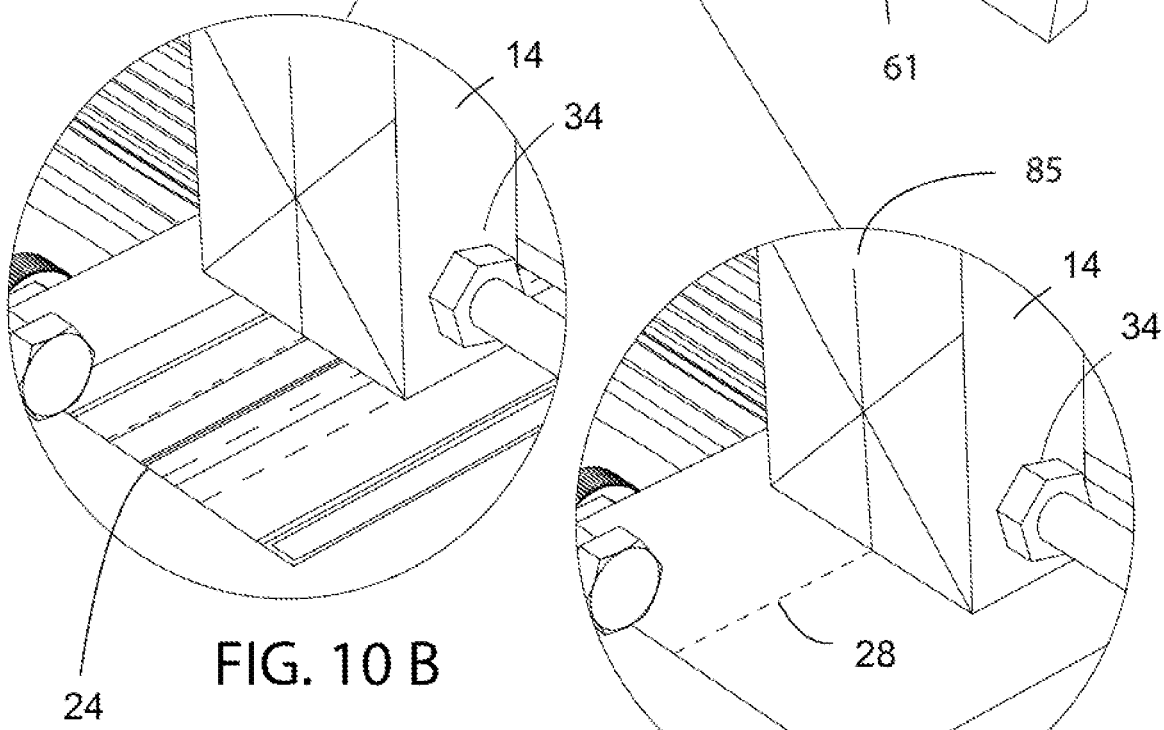
FIG. 10 B
FIG. 10 C

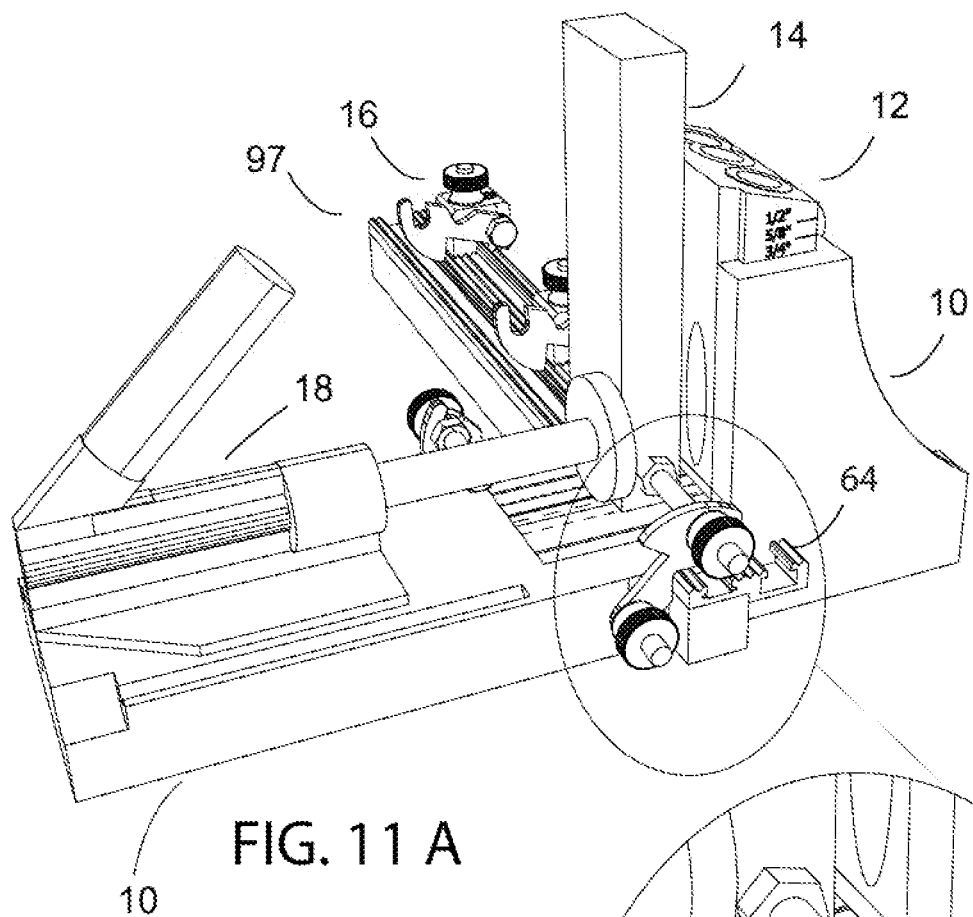
FIG. 11 A
FIG. 11 B
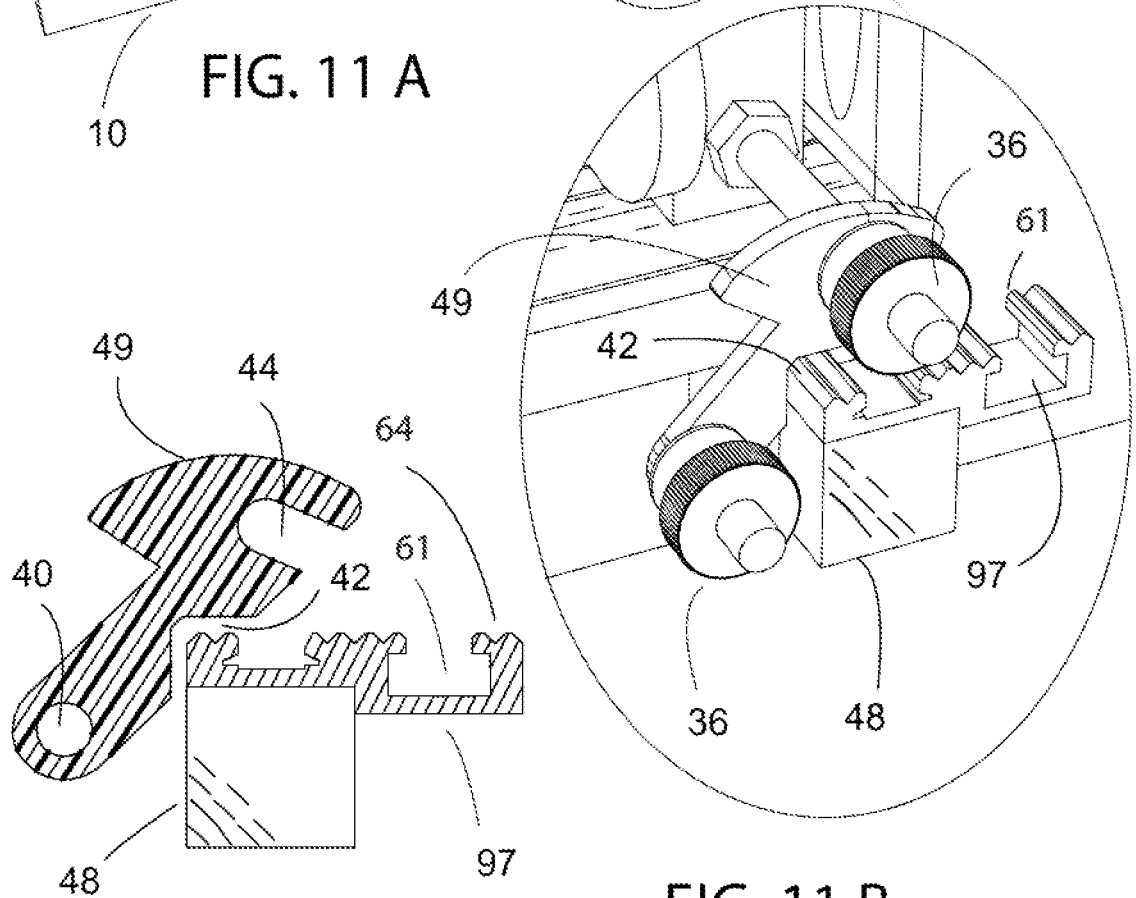
FIG. 11 C

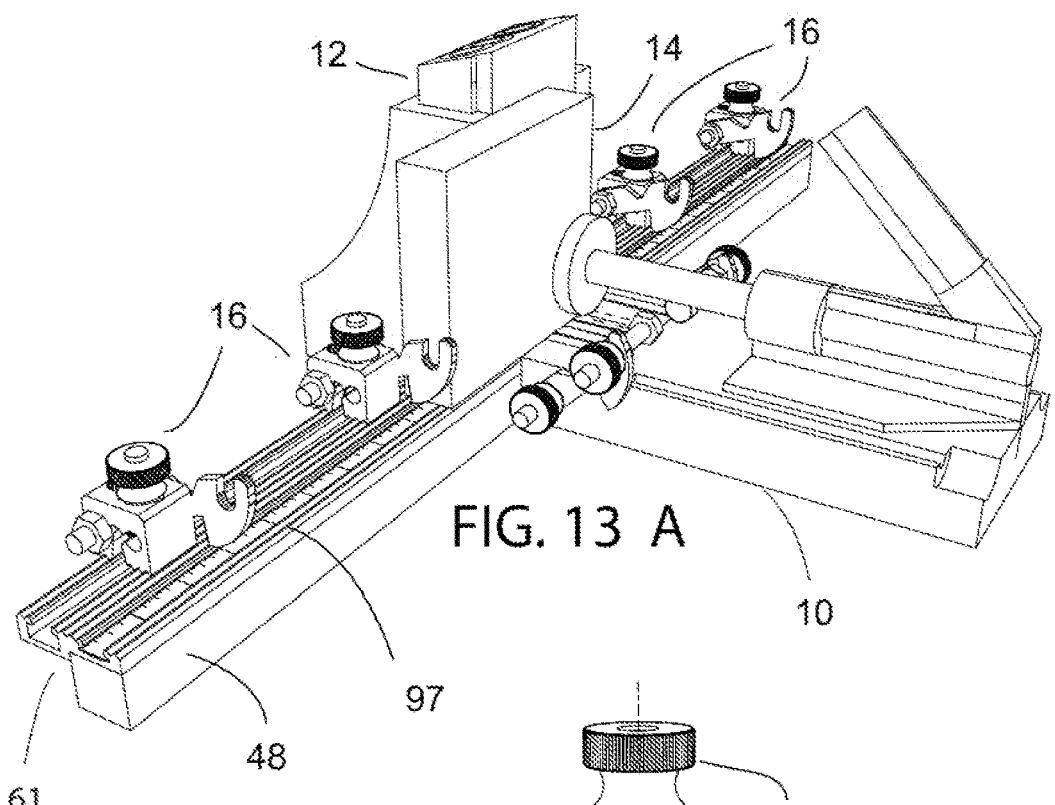
FIG. 13 A
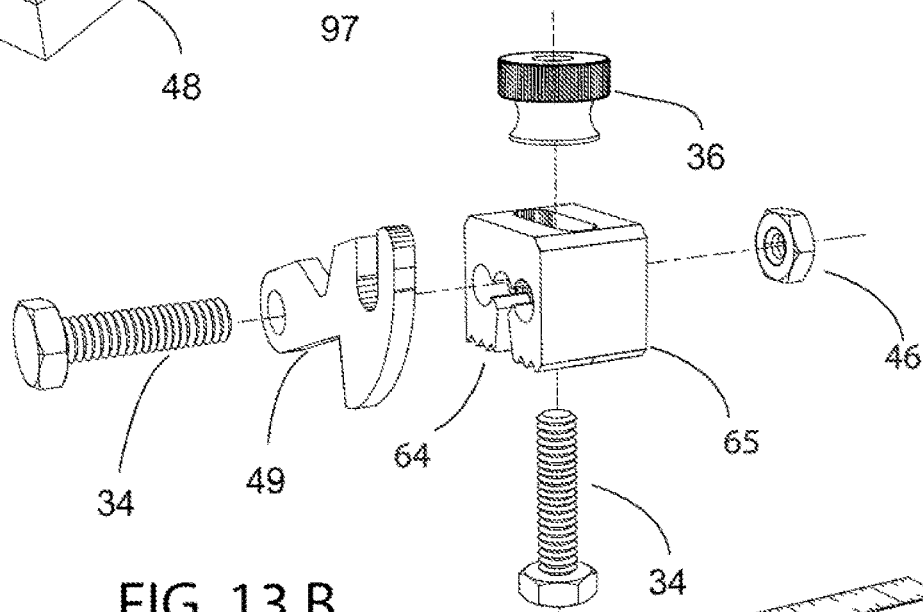
FIG. 13 B
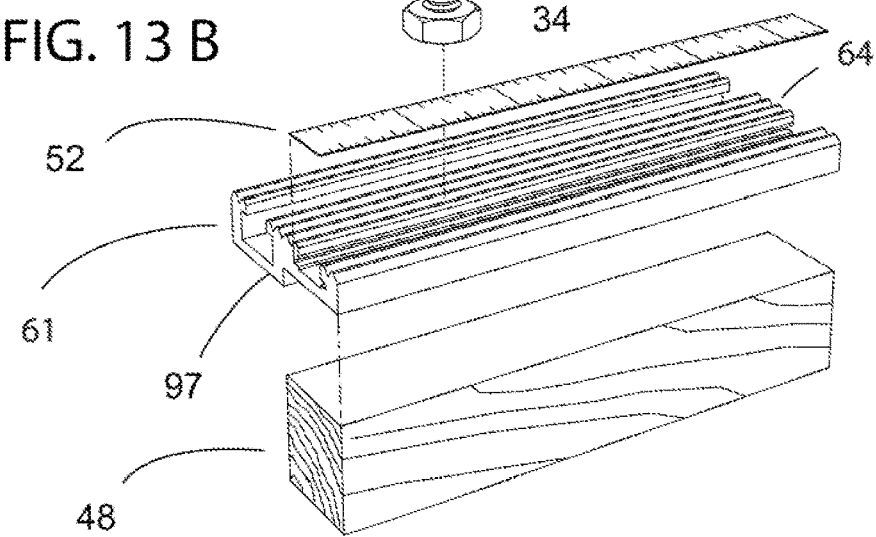

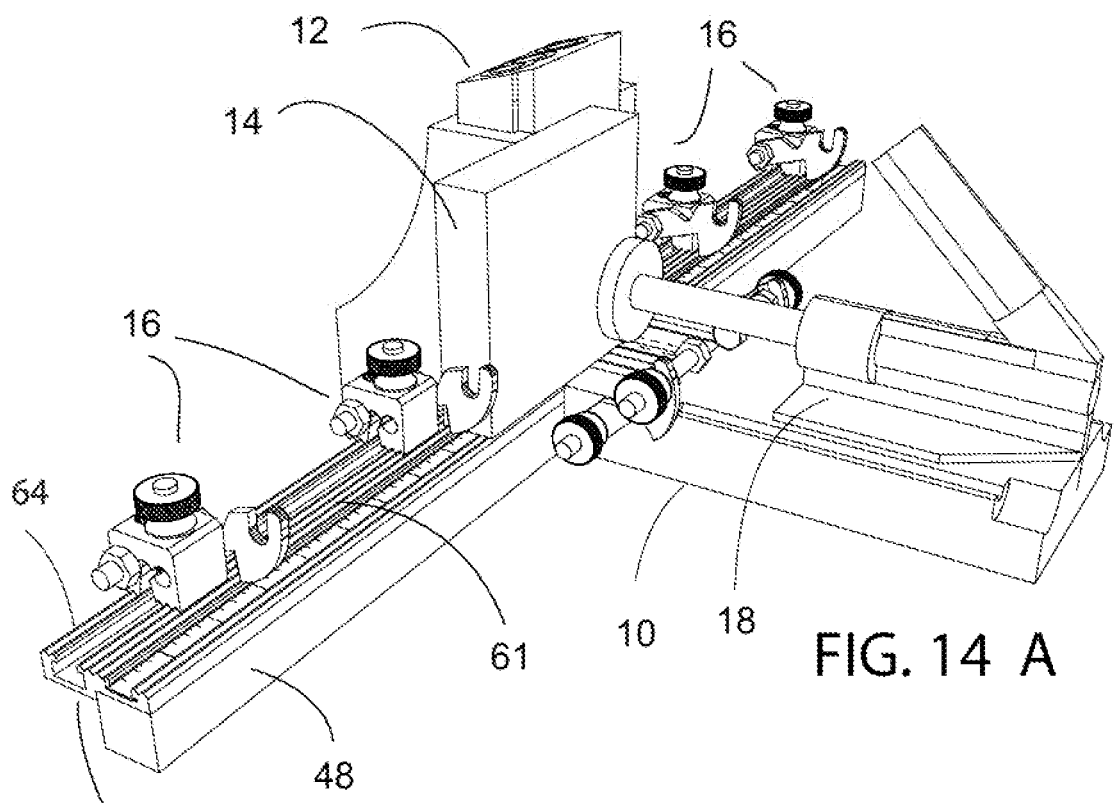
FIG. 14 A
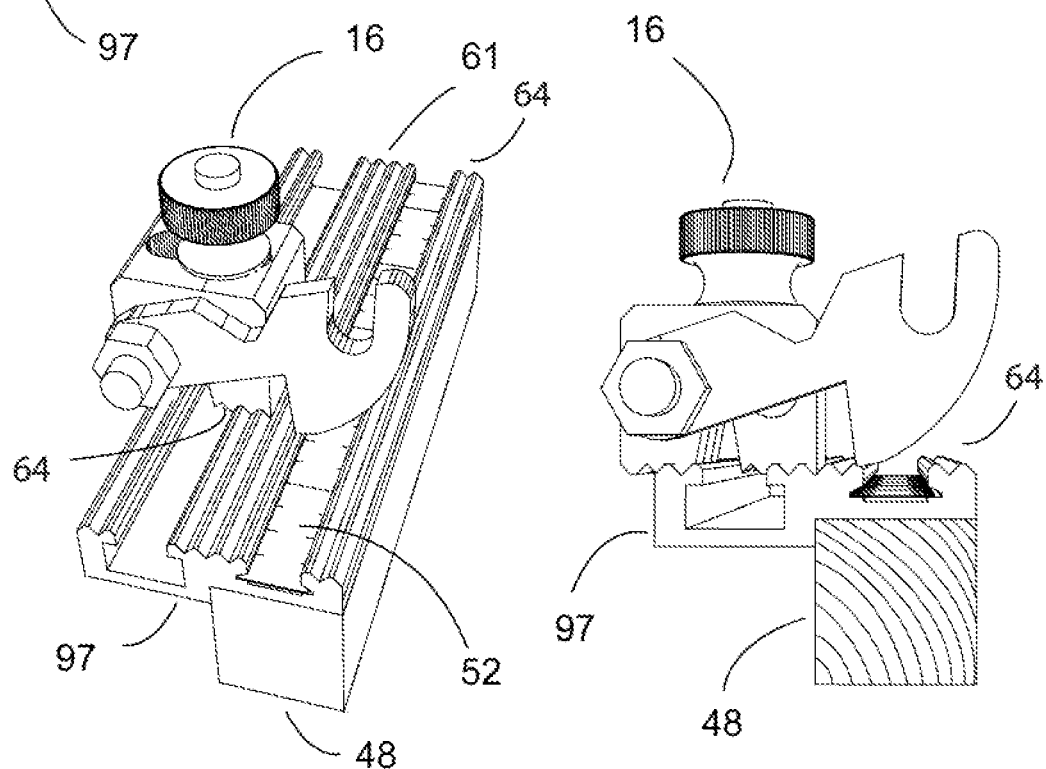
FIG. 14 B
FIG. 14 C

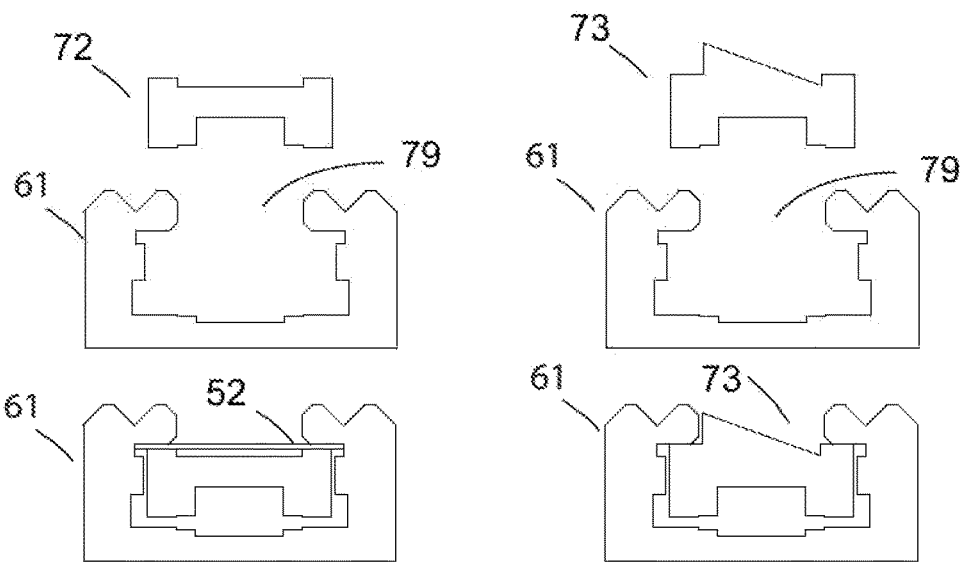
FIG. 19 A
FIG. 19 B
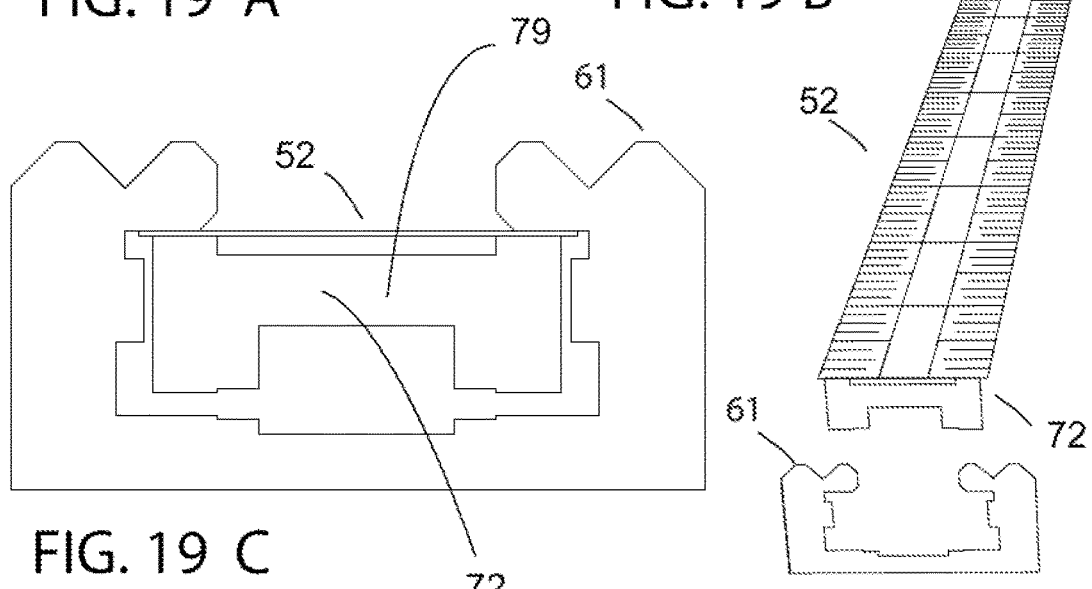
FIG. 19 C
FIG. 19 D
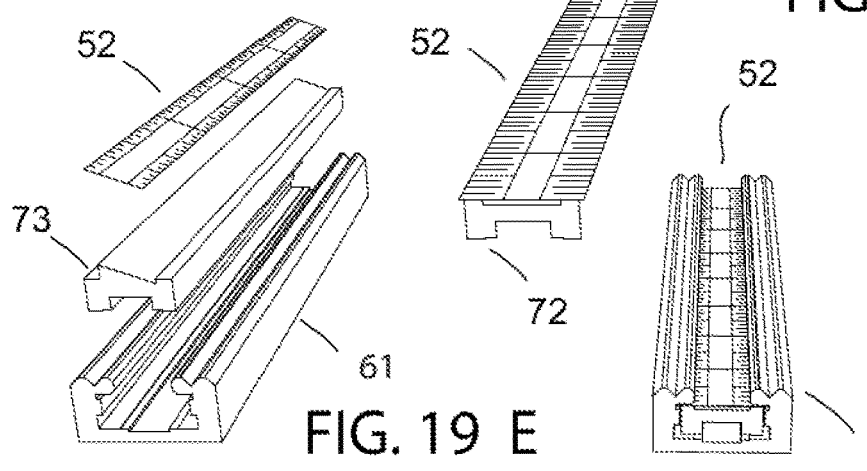
FIG. 19 E

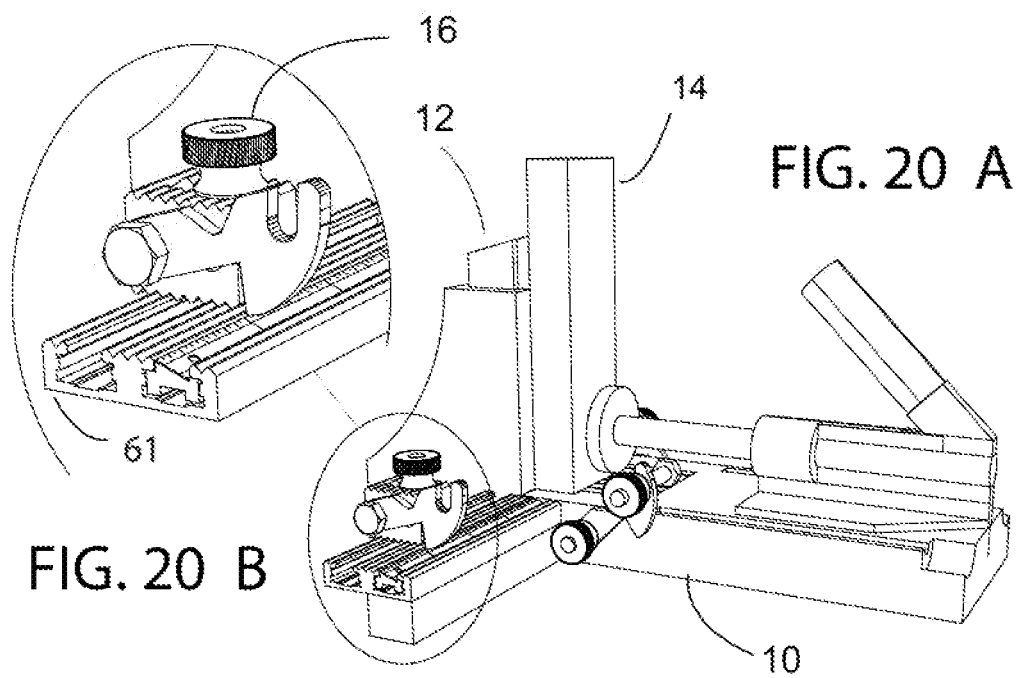
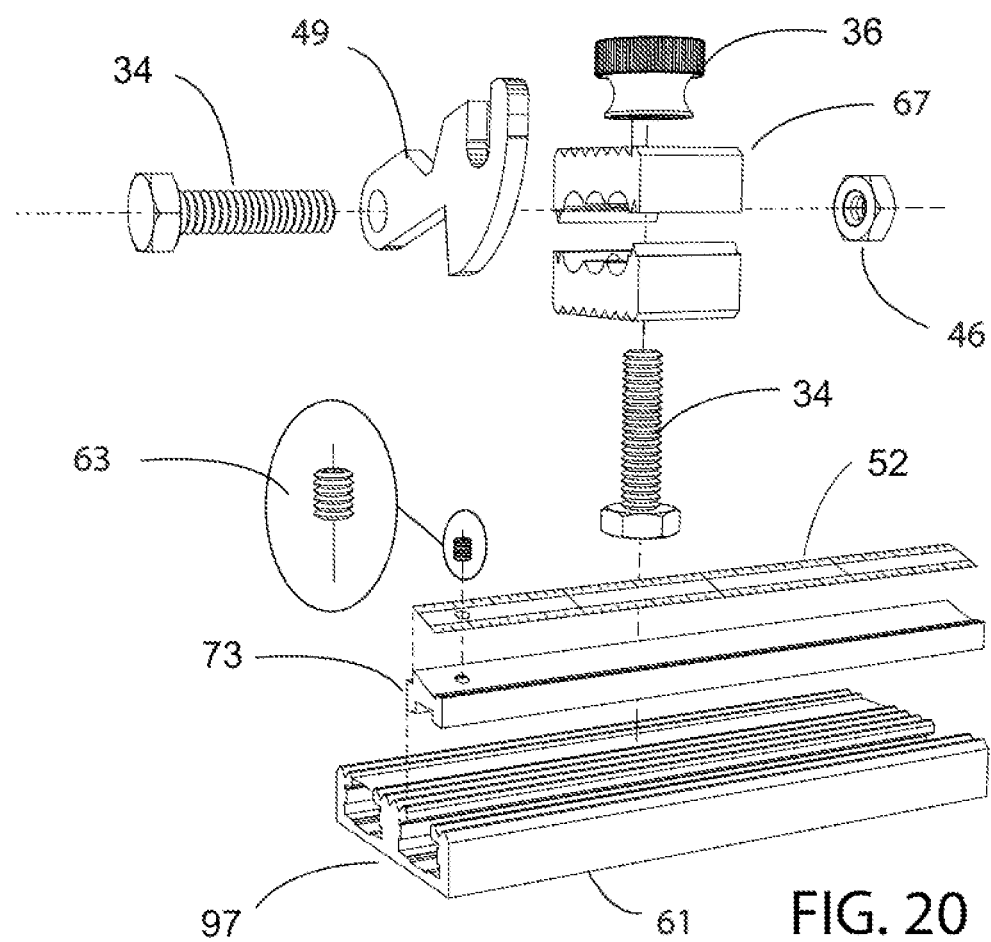

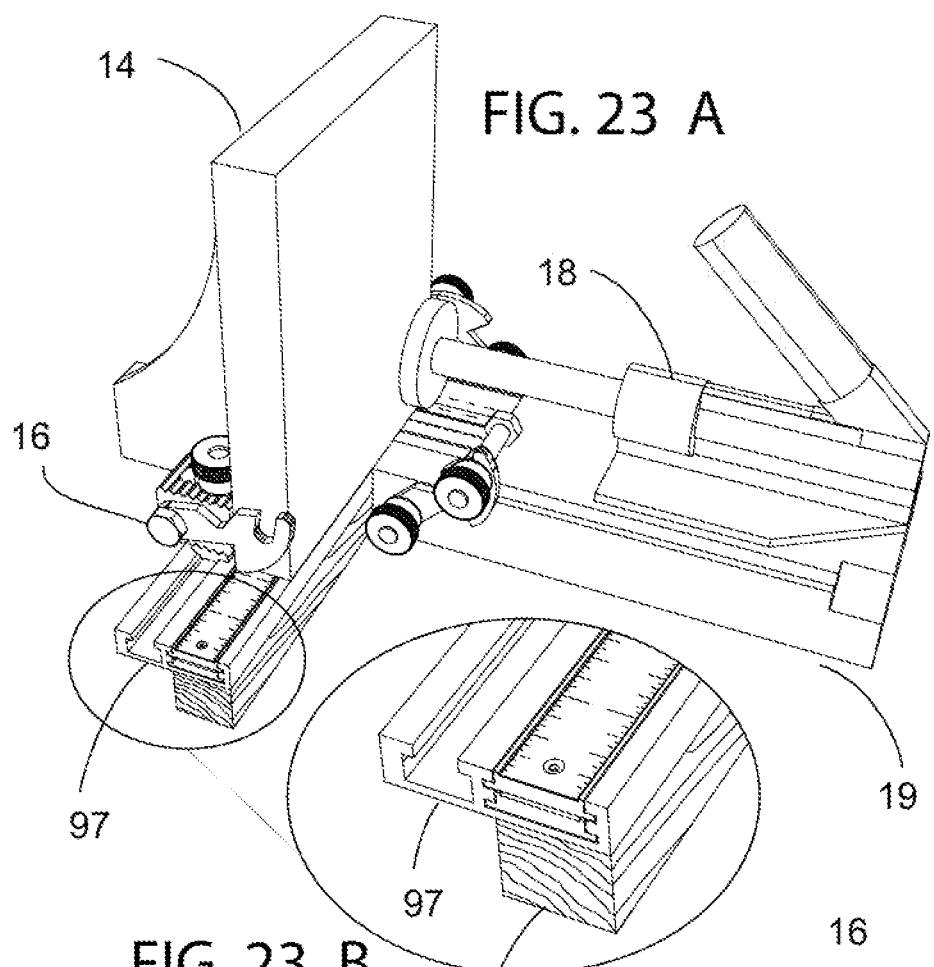
FIG. 23 A
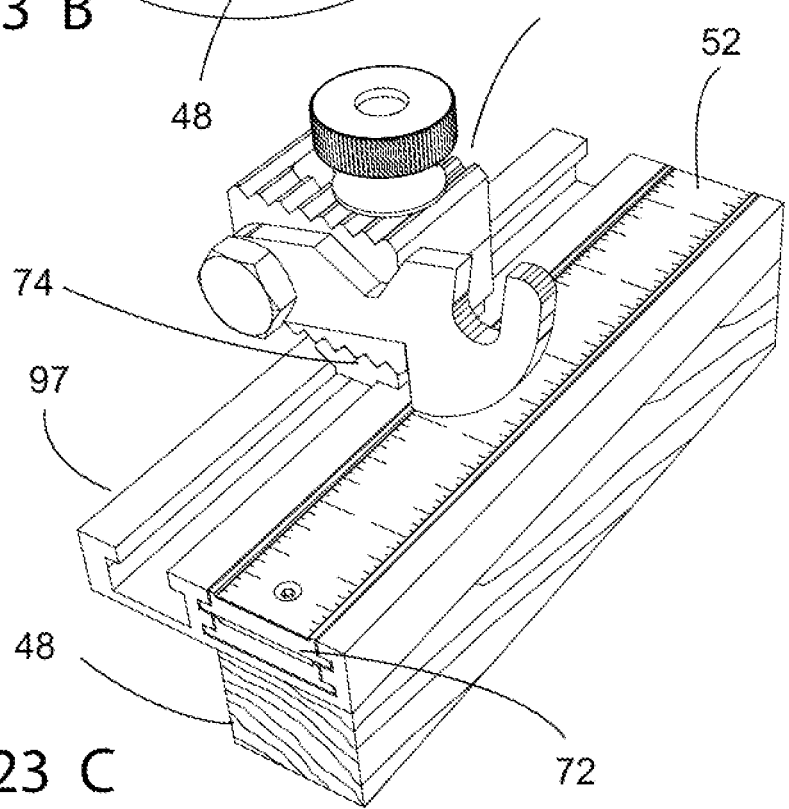
FIG. 23 B
FIG. 23 C

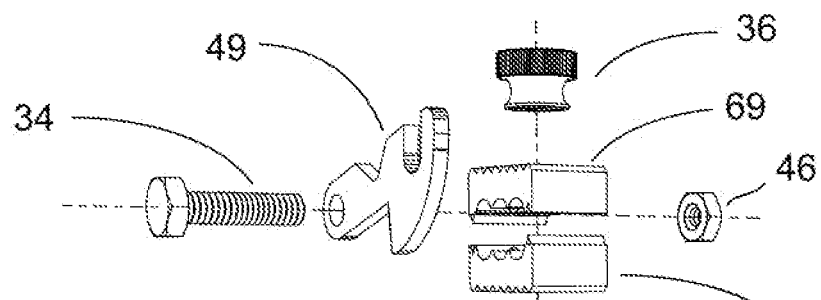
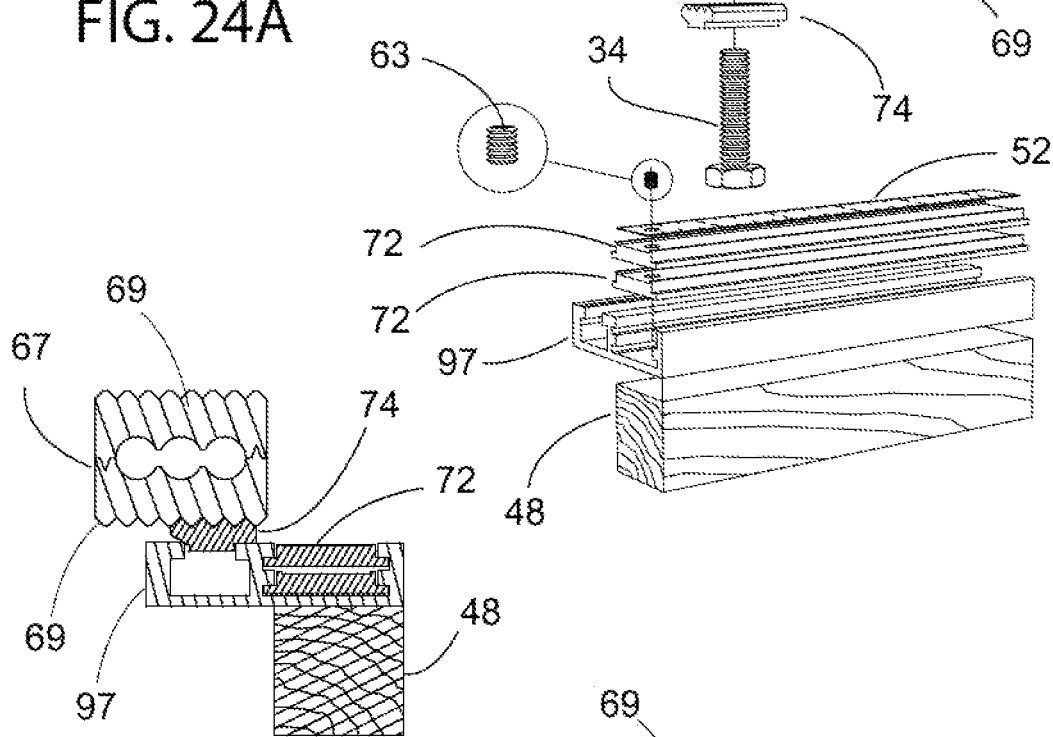
FIG. 24A
FIG. 24B
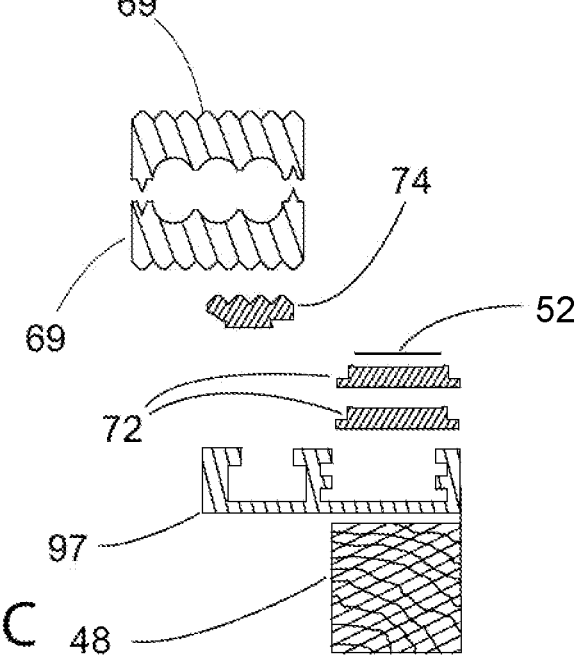
FIG. 24C

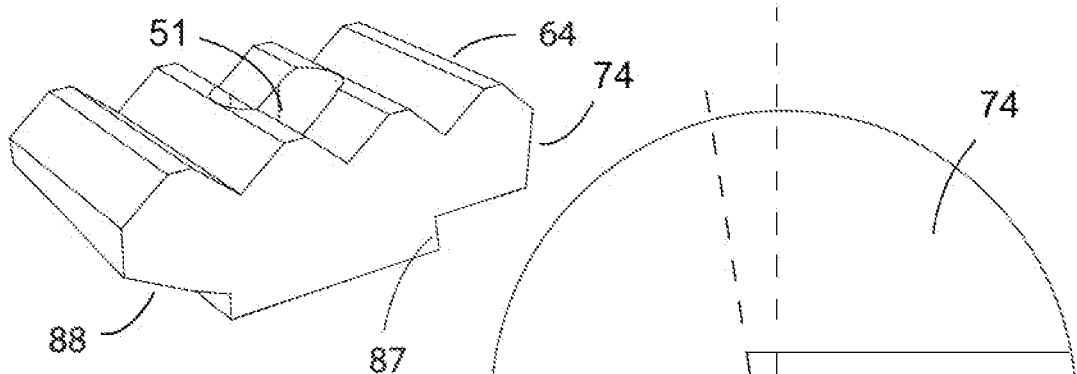
FIG. 26 A
FIG. 26 B
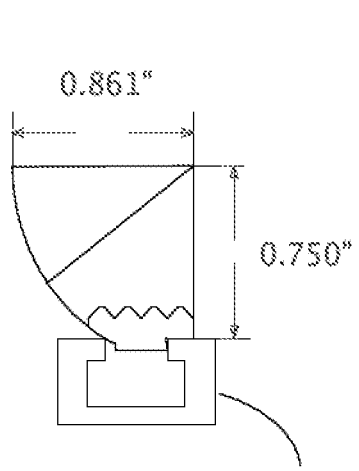
FIG. 26 C
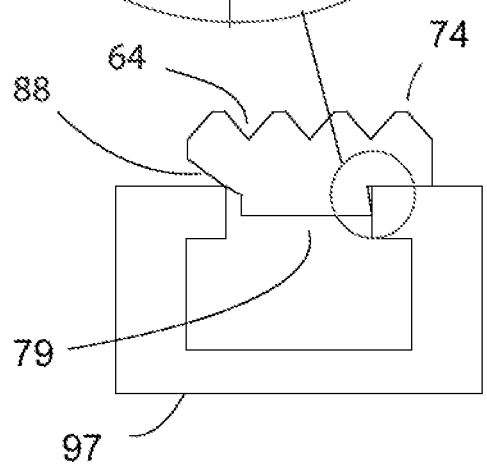
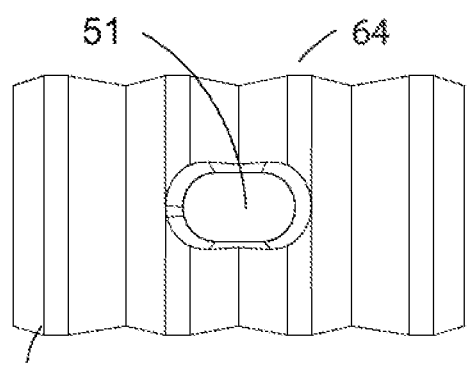
FIG. 26 D
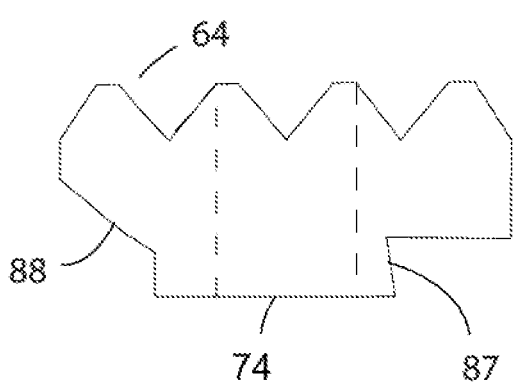
FIG. 26 E

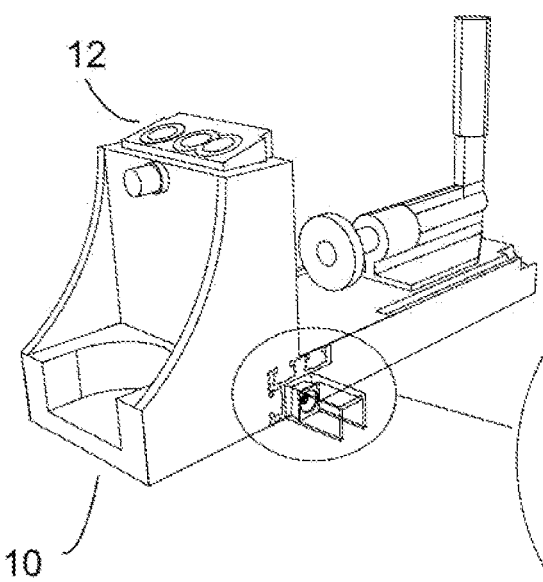
FIG. 28 A
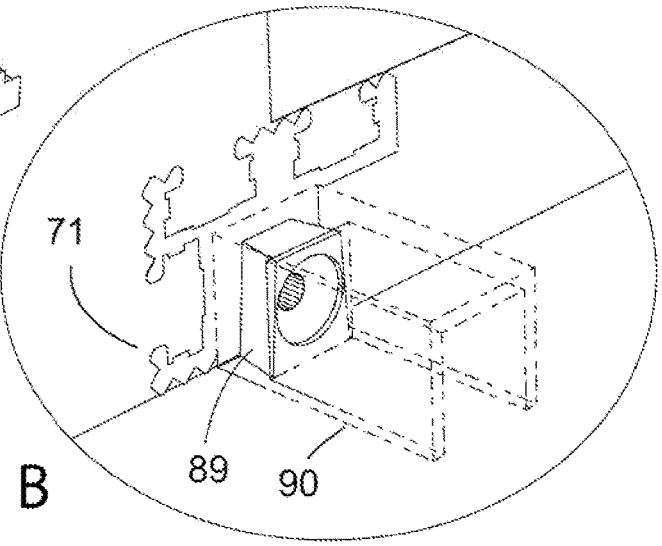
FIG. 28 B
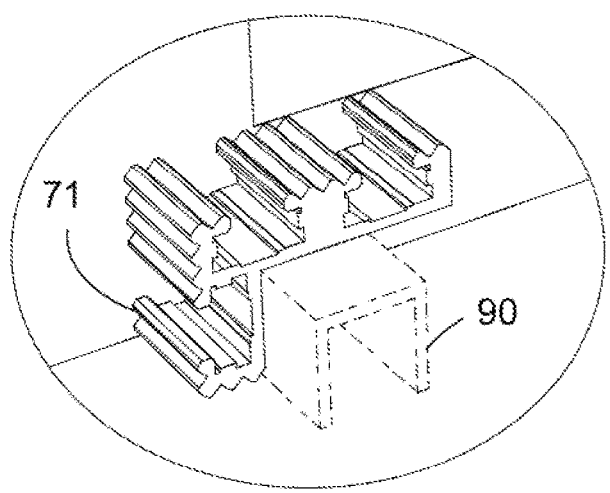
FIG. 28 C
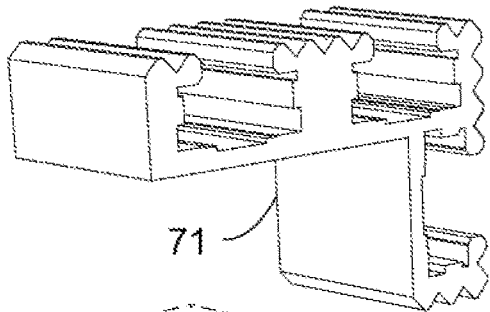
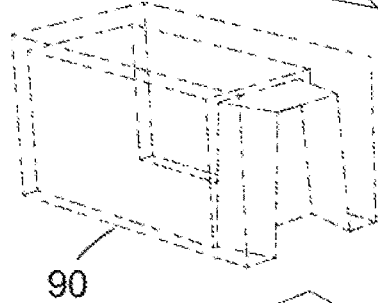
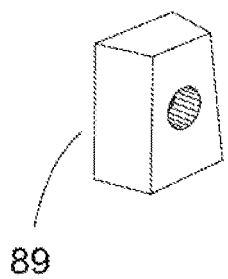
FIG. 28 D

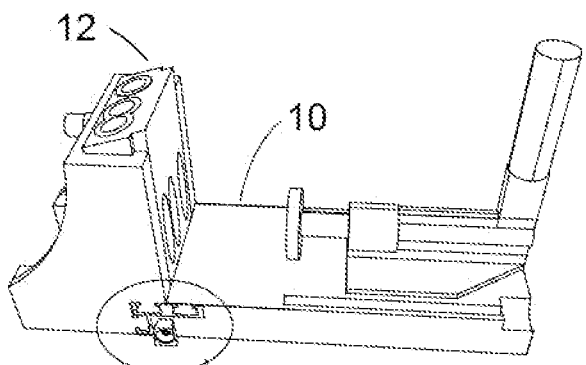
FIG. 30 A
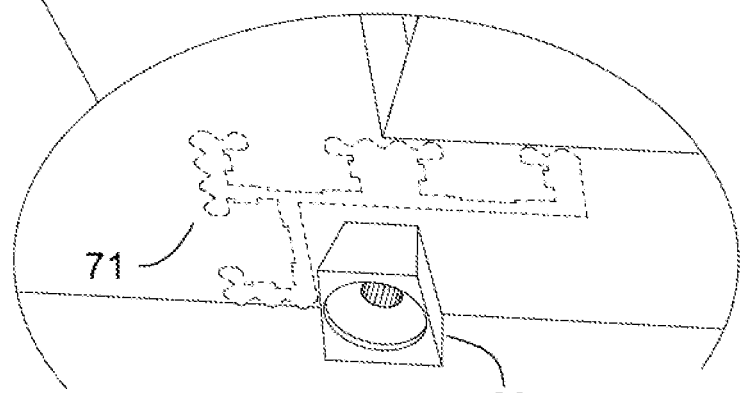
FIG. 30 B
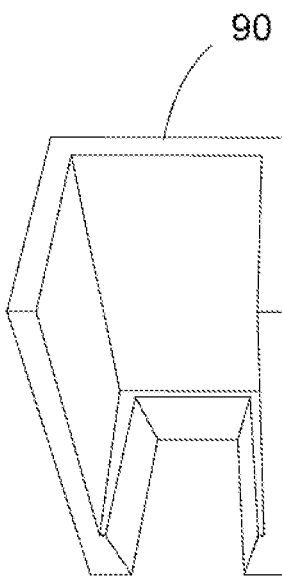 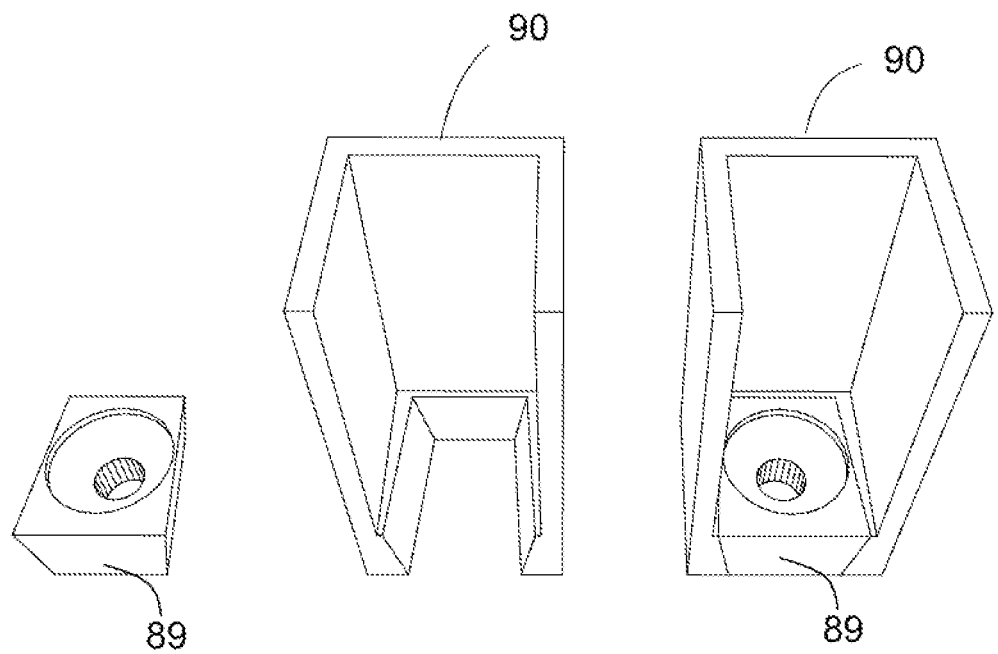 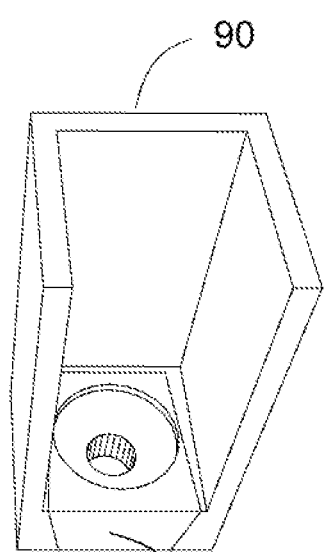
FIG. 30 C    FIG. 30 D    FIG. 30 E

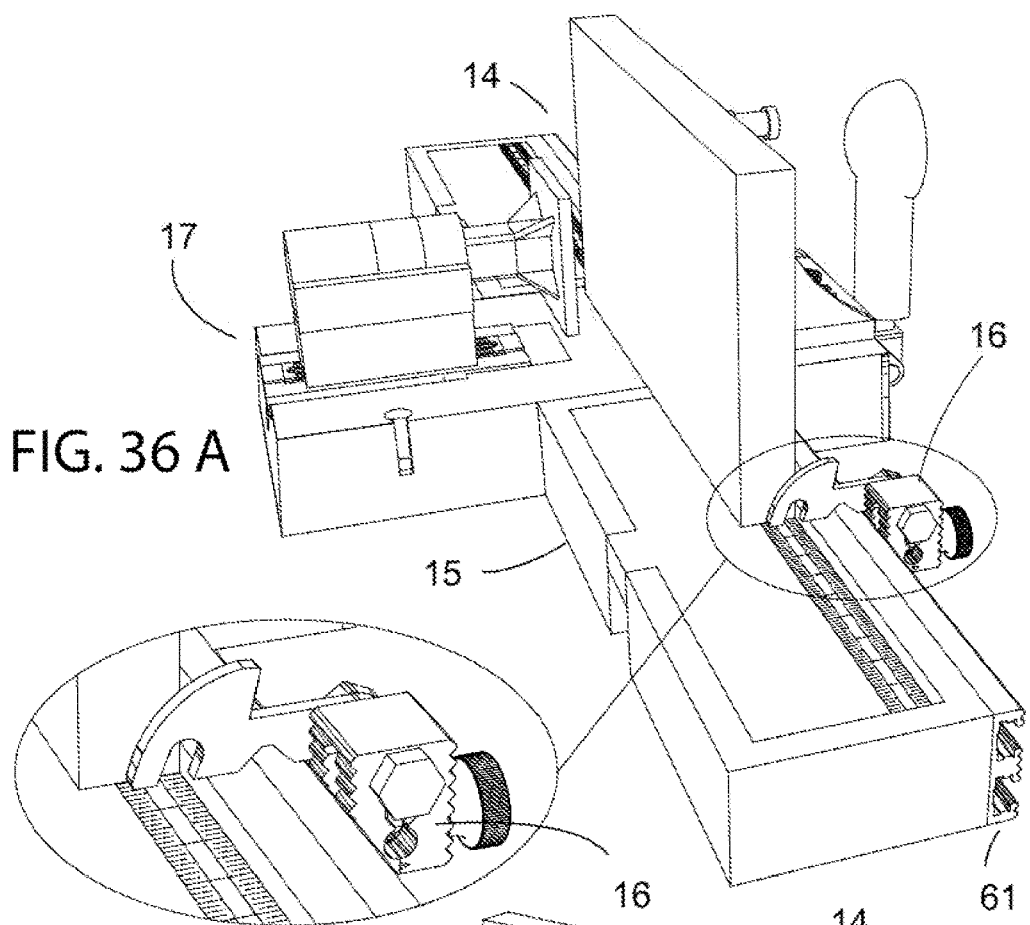
FIG. 36 A
FIG. 36 B
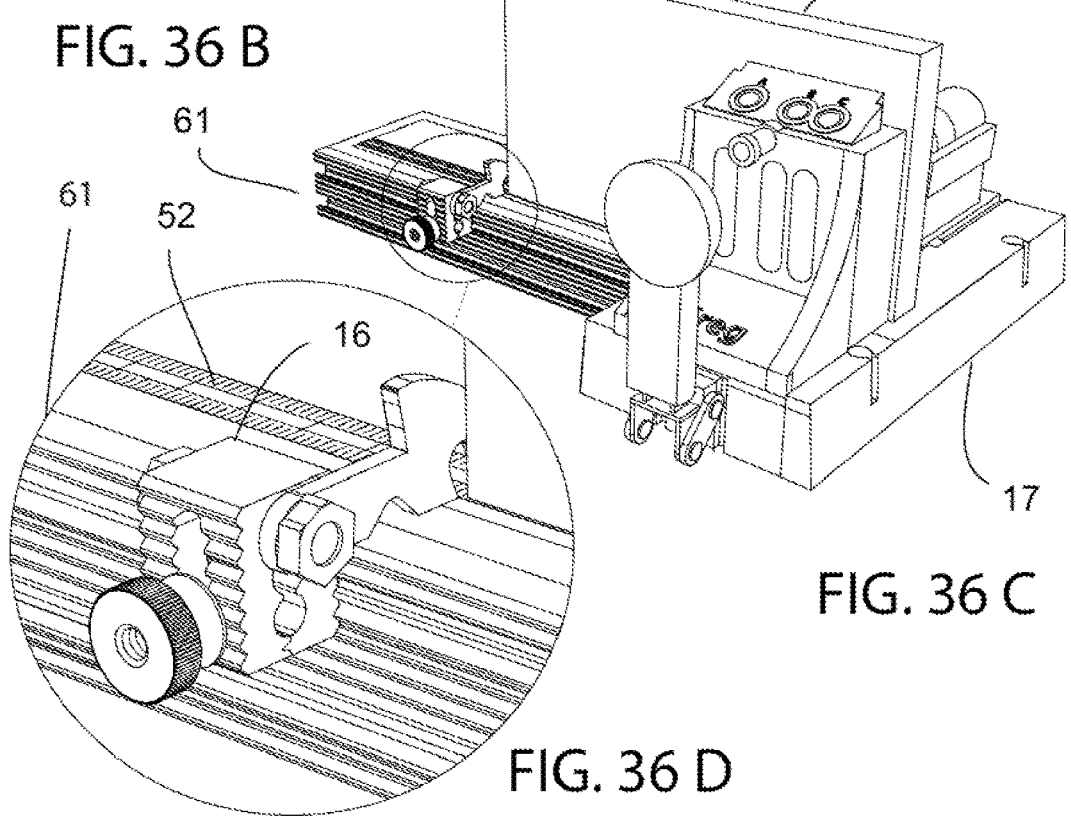
FIG. 36 C
FIG. 36 D

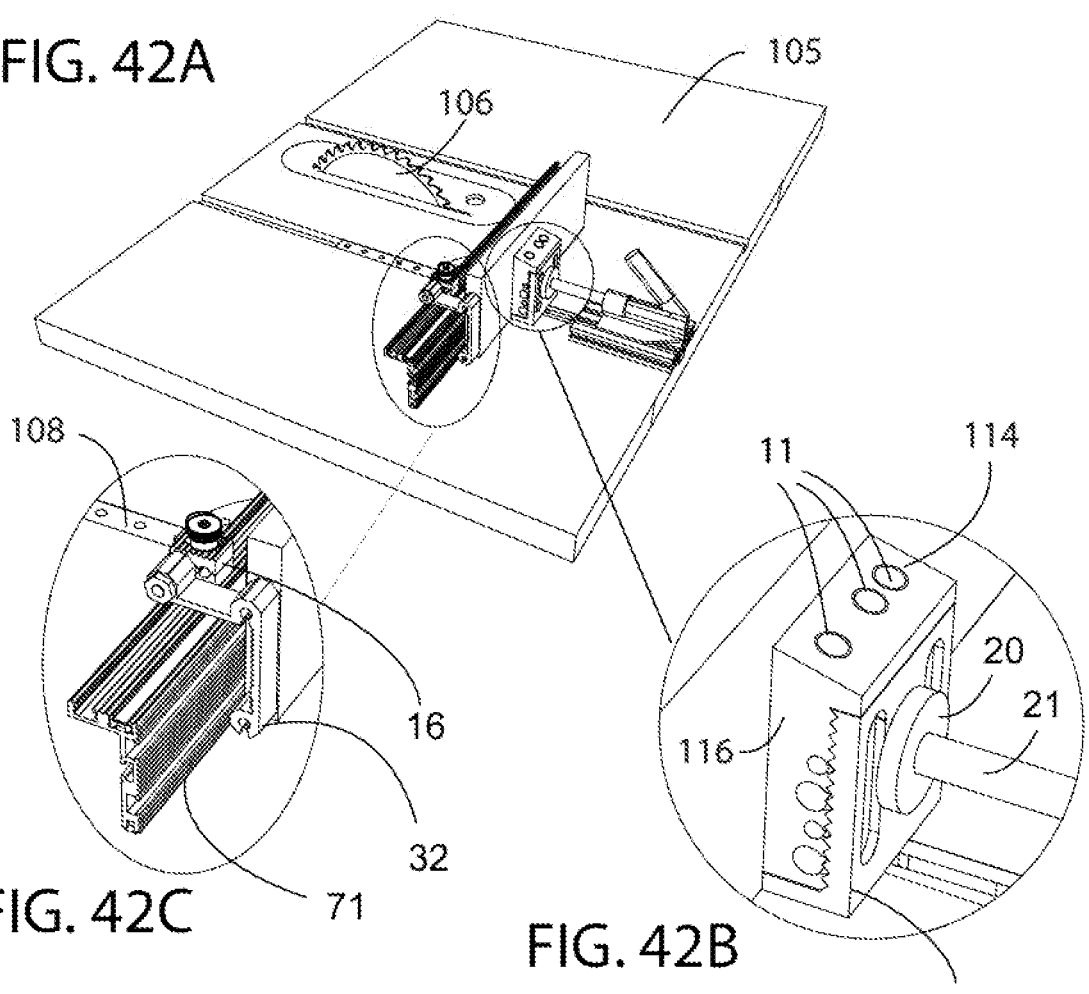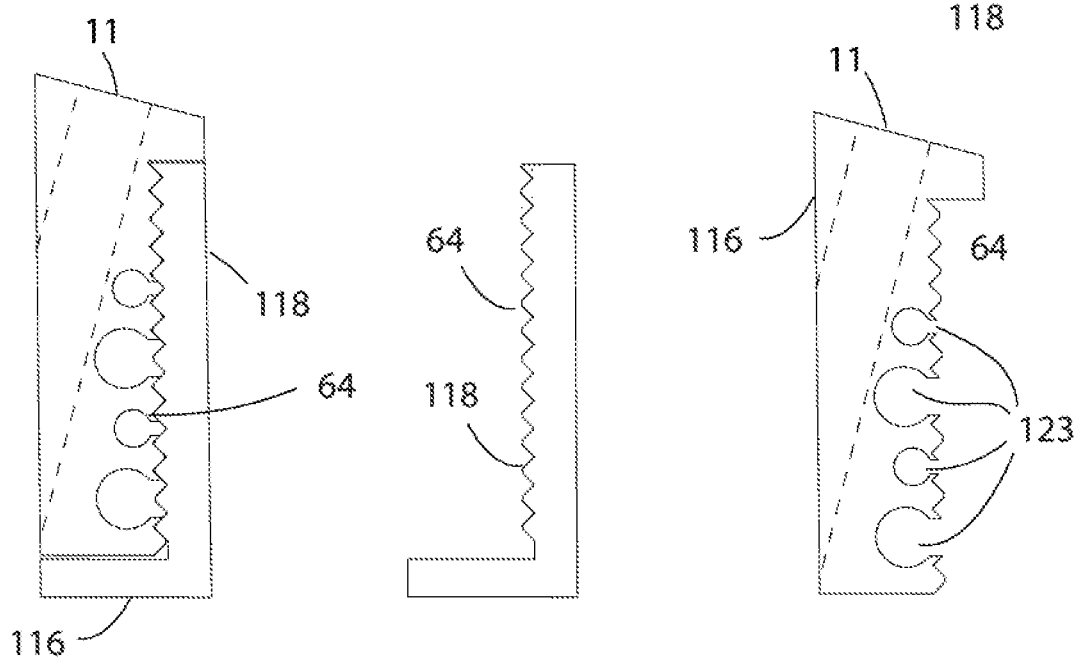

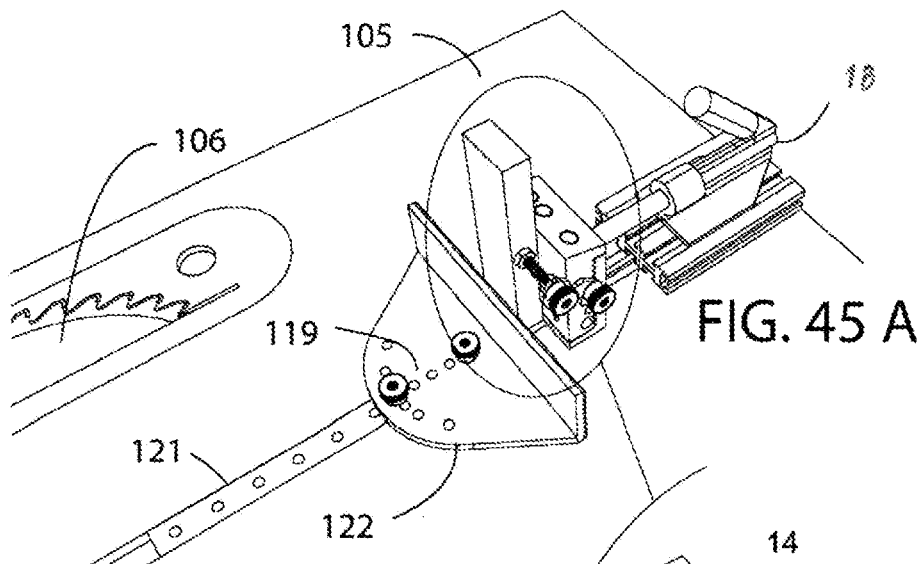
FIG. 45 A
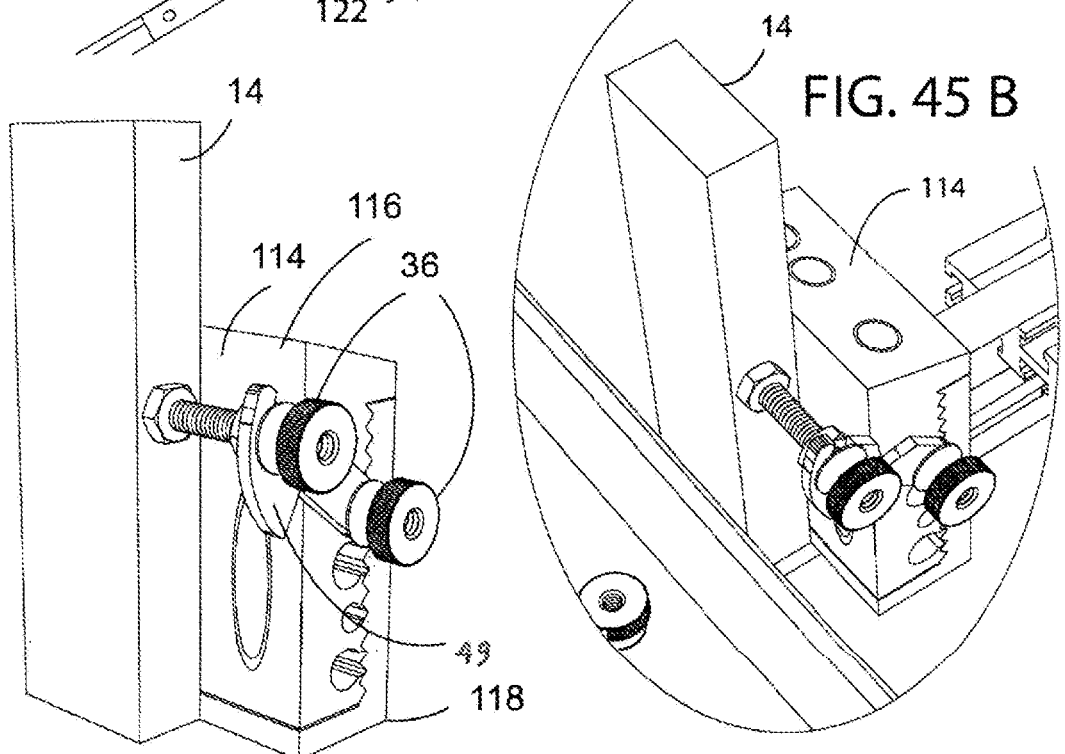
FIG. 45 B
FIG. 45 C
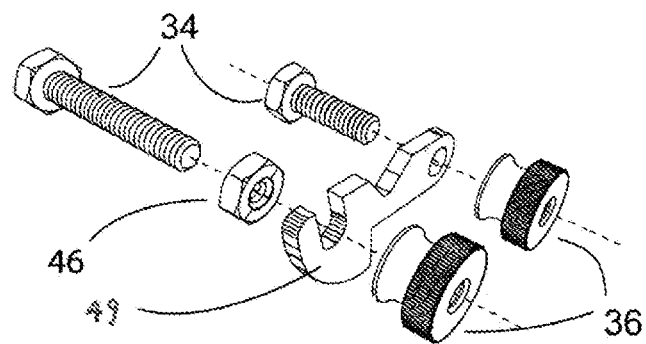
FIG. 45 D

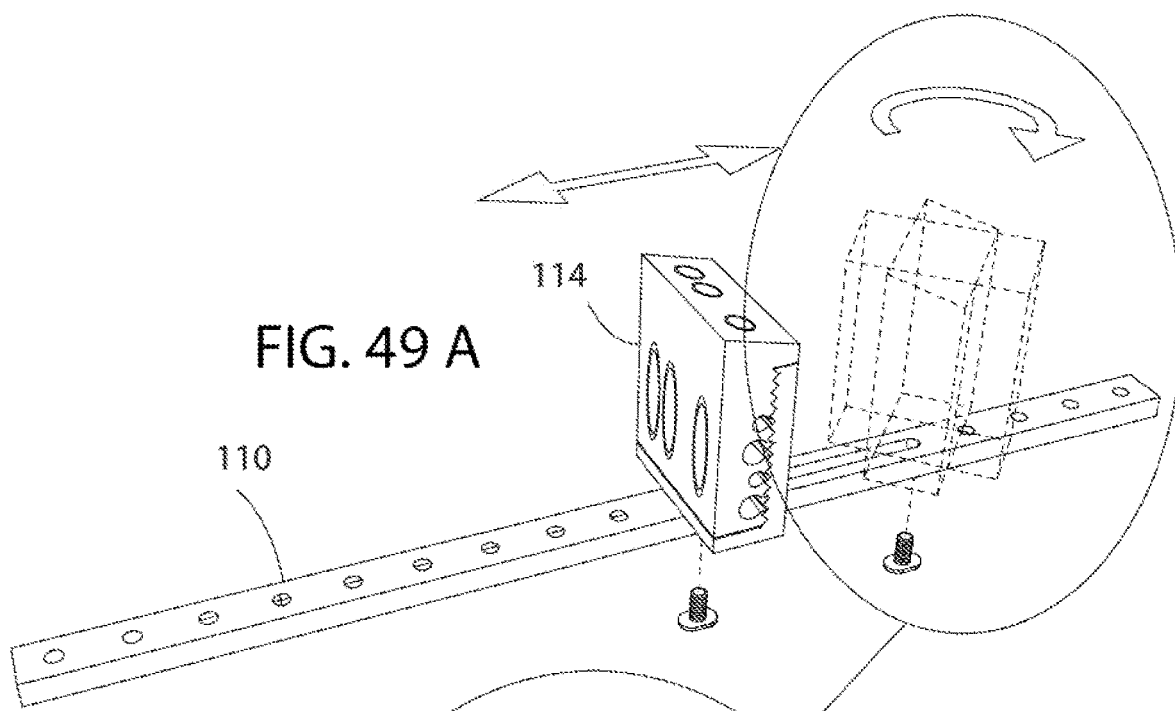
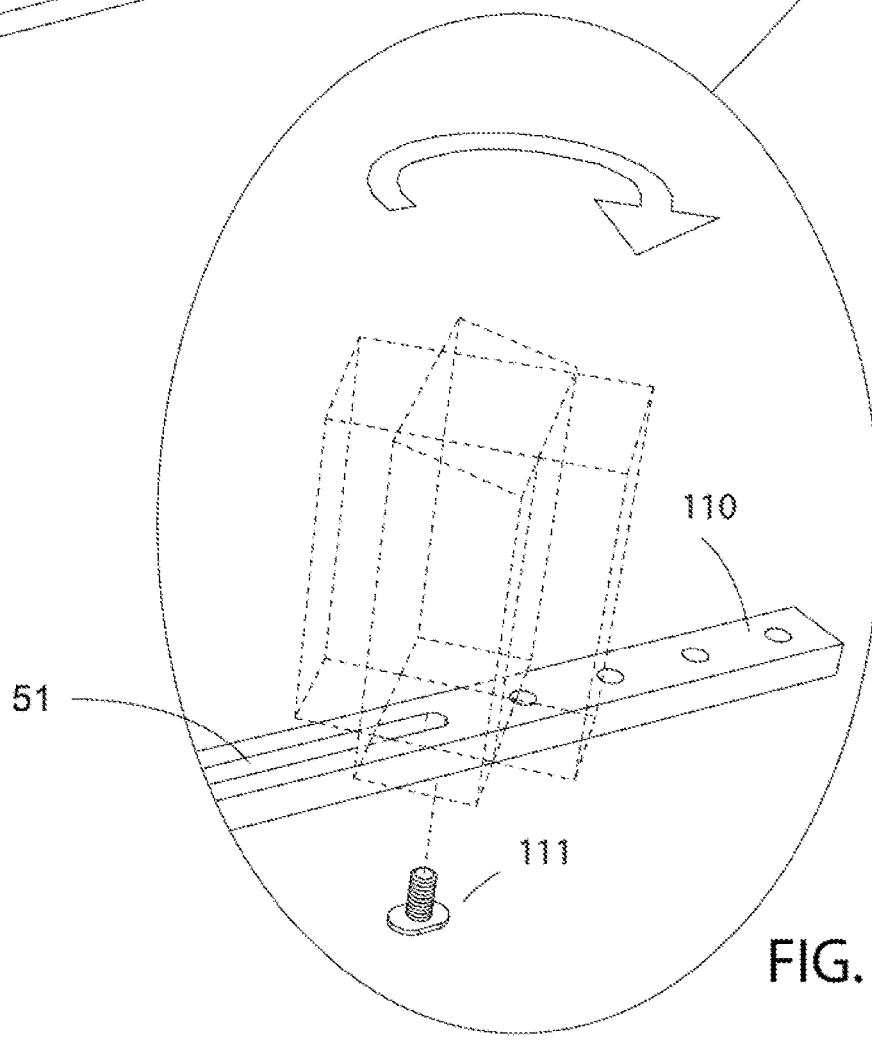

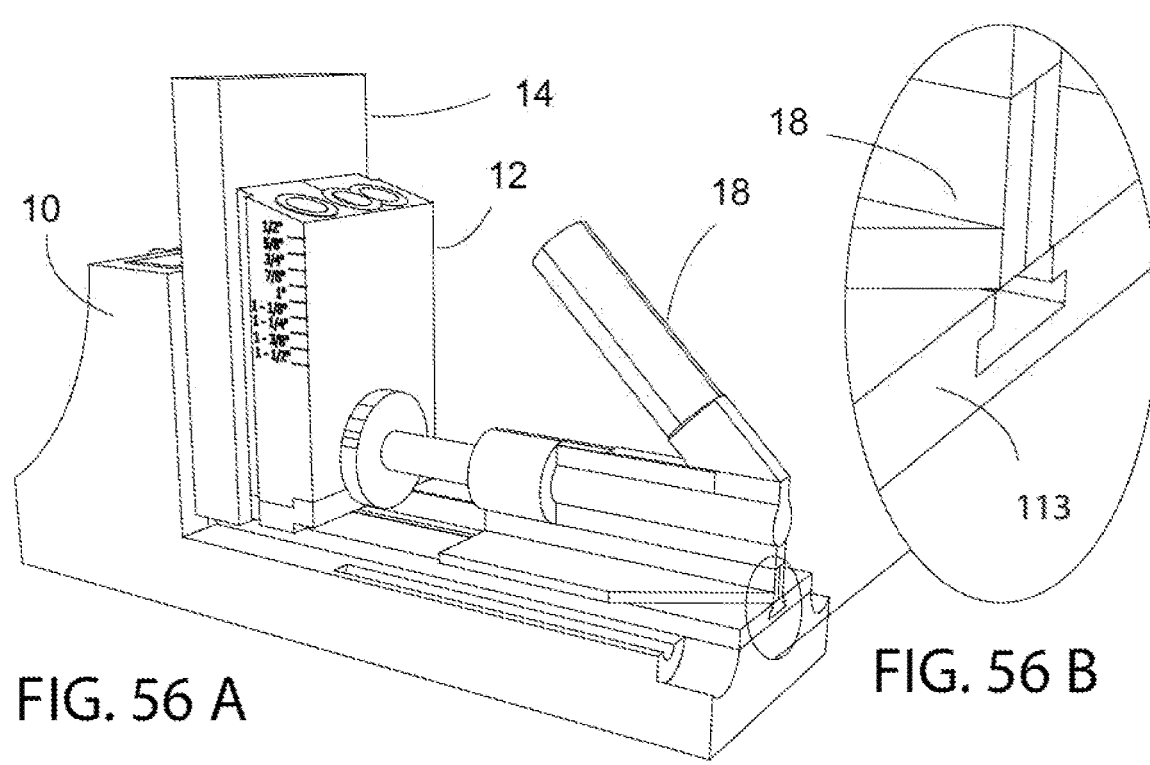
FIG. 56 A
FIG. 56 B
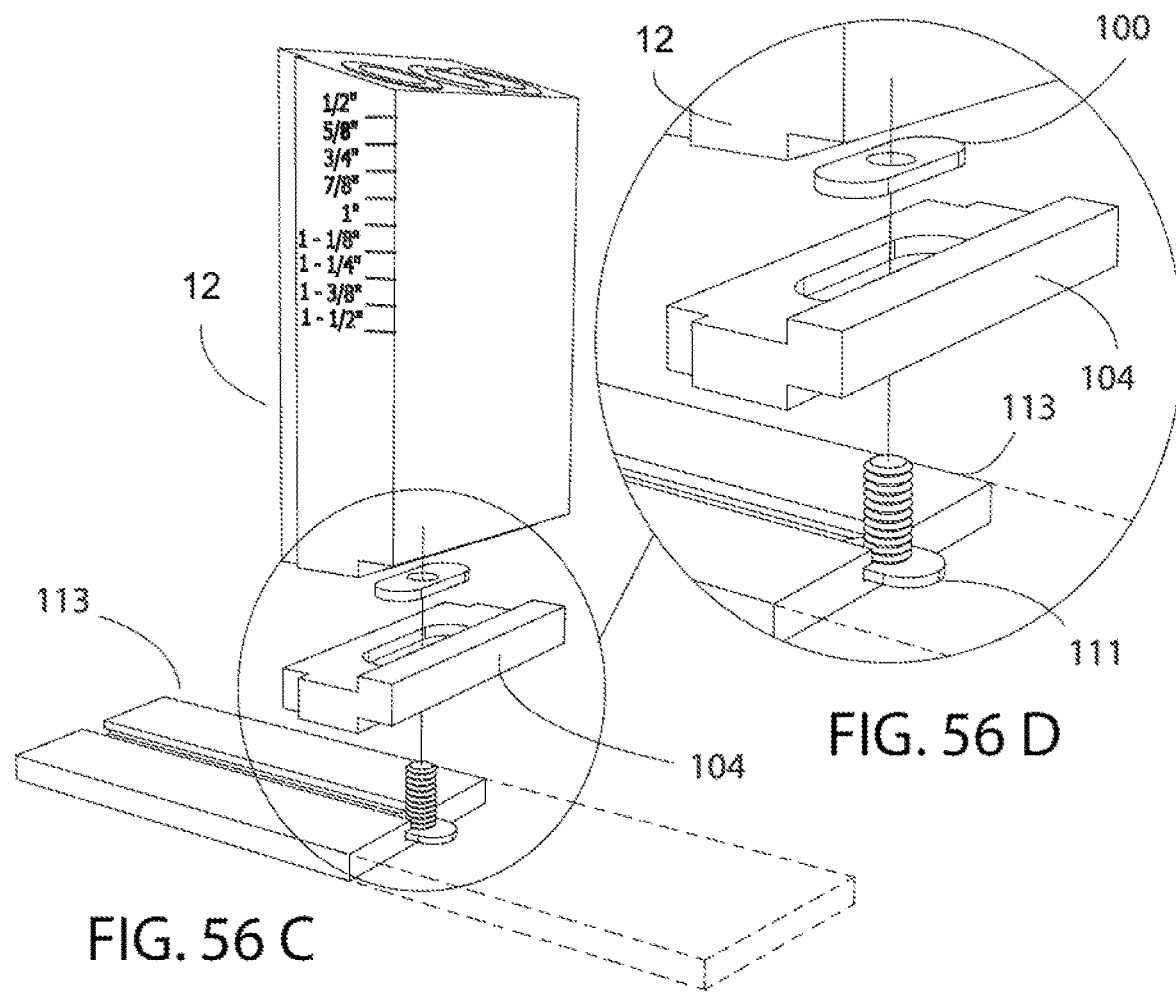
FIG. 56 C
FIG. 56 D

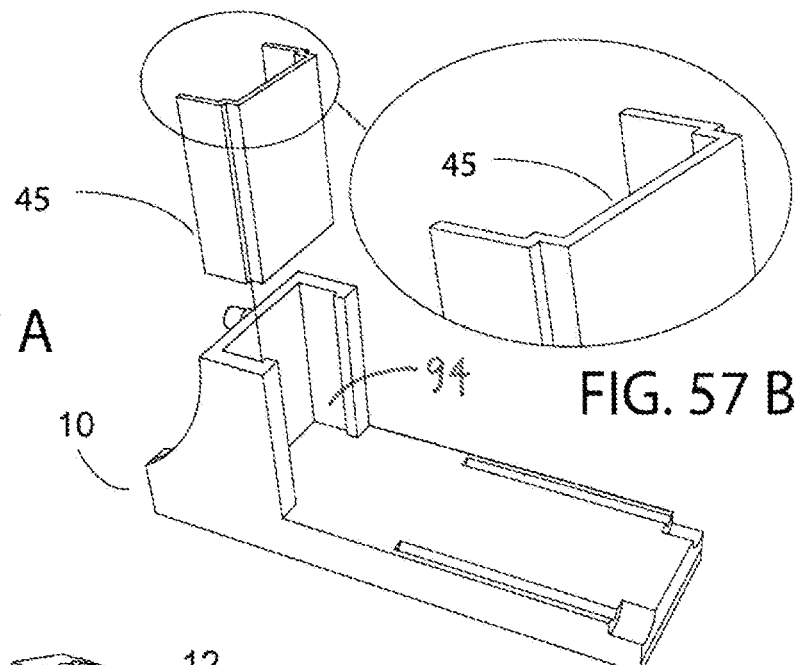
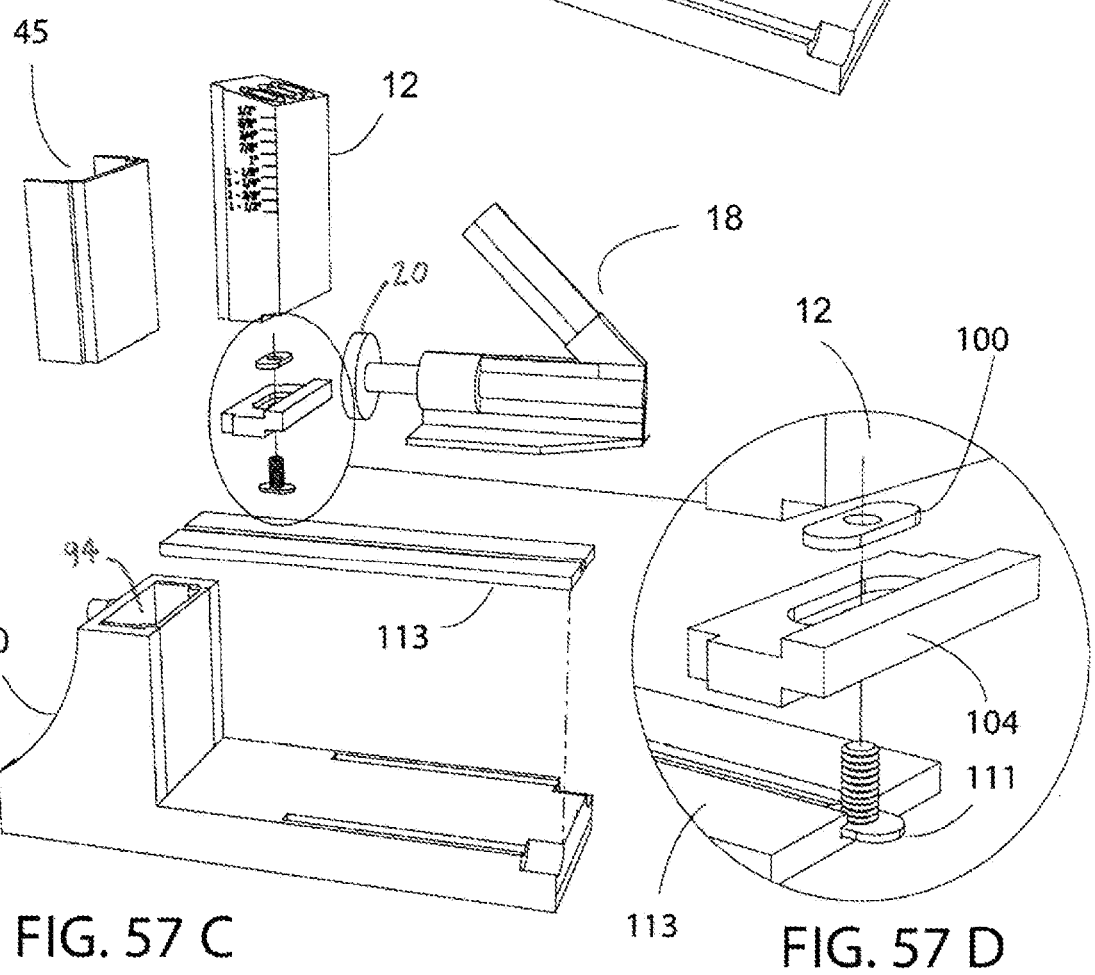

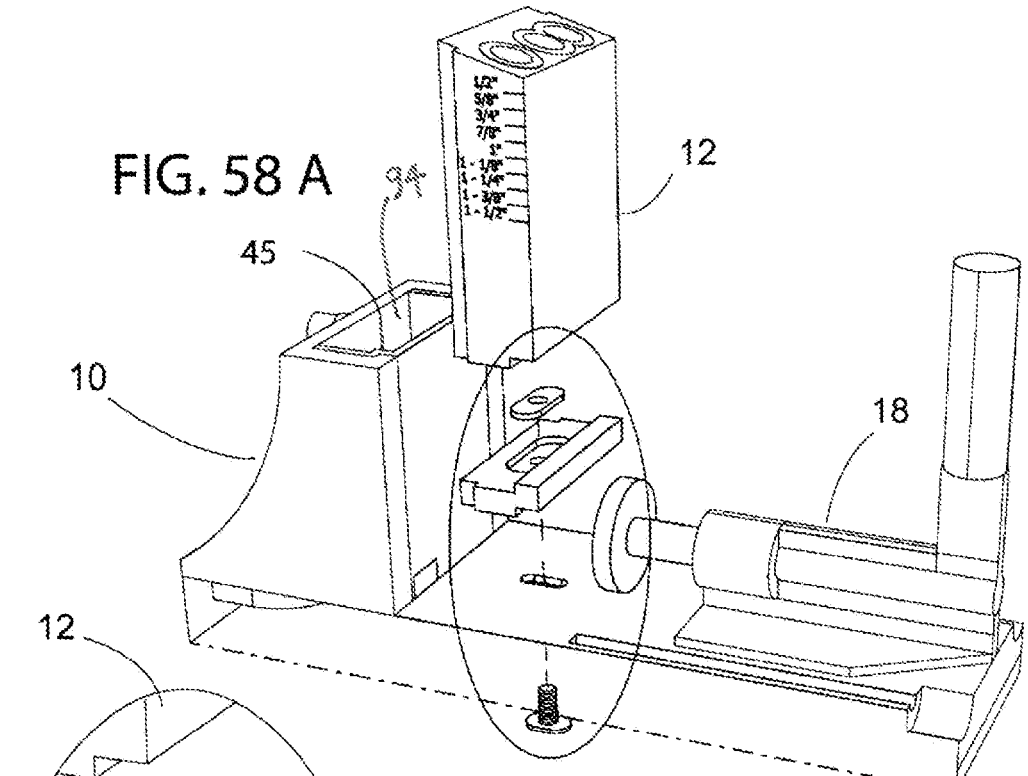
FIG. 58 A
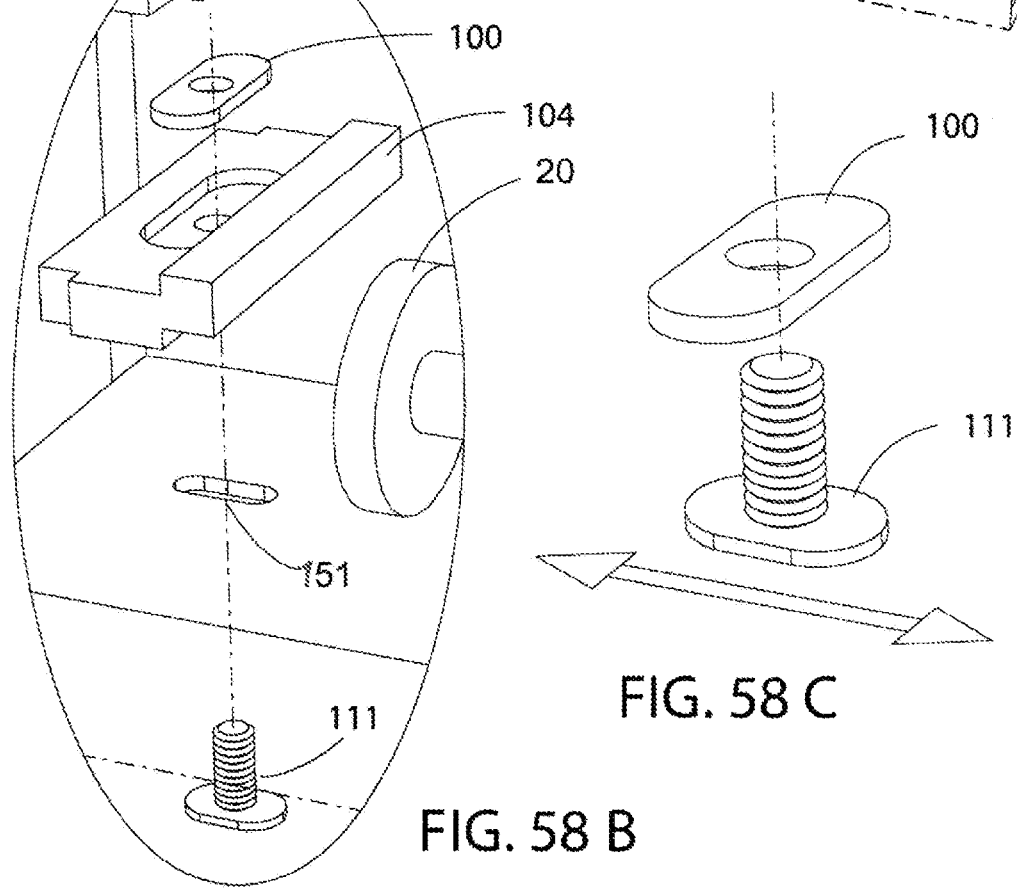
FIG. 58 B
FIG. 58 C

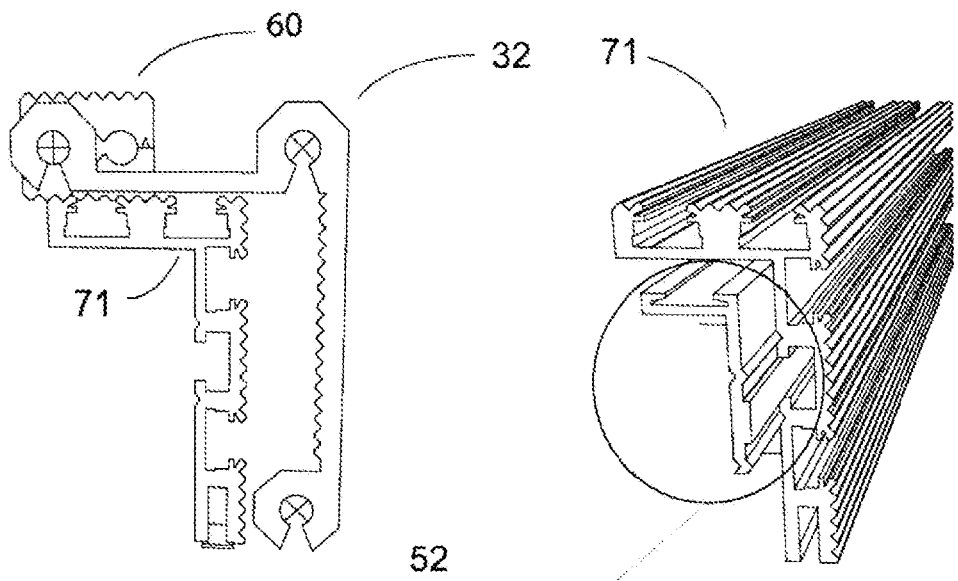
FIG. 60 A
FIG. 60 B
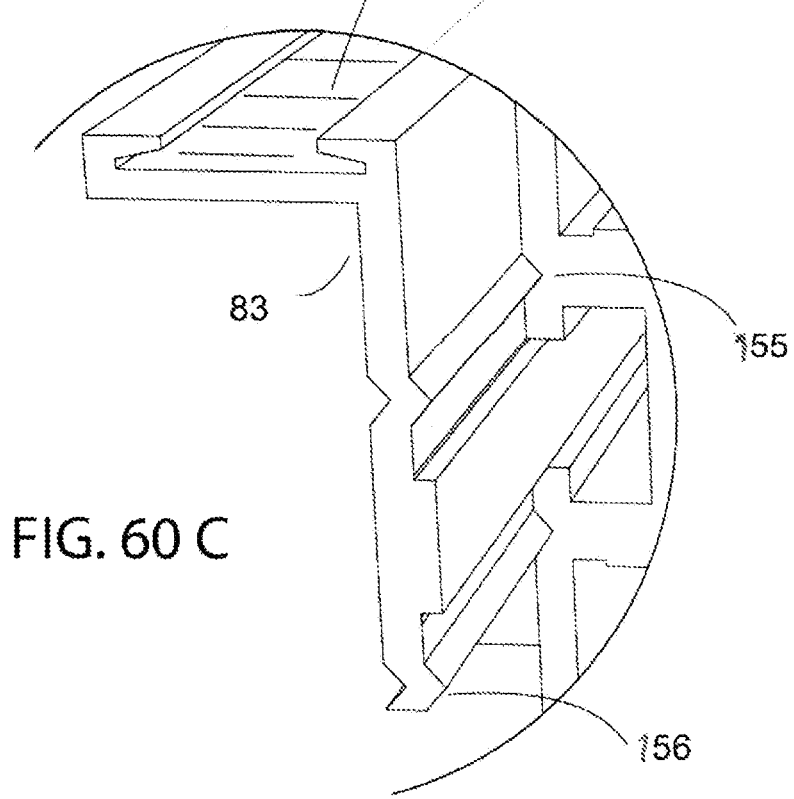
FIG. 60 C

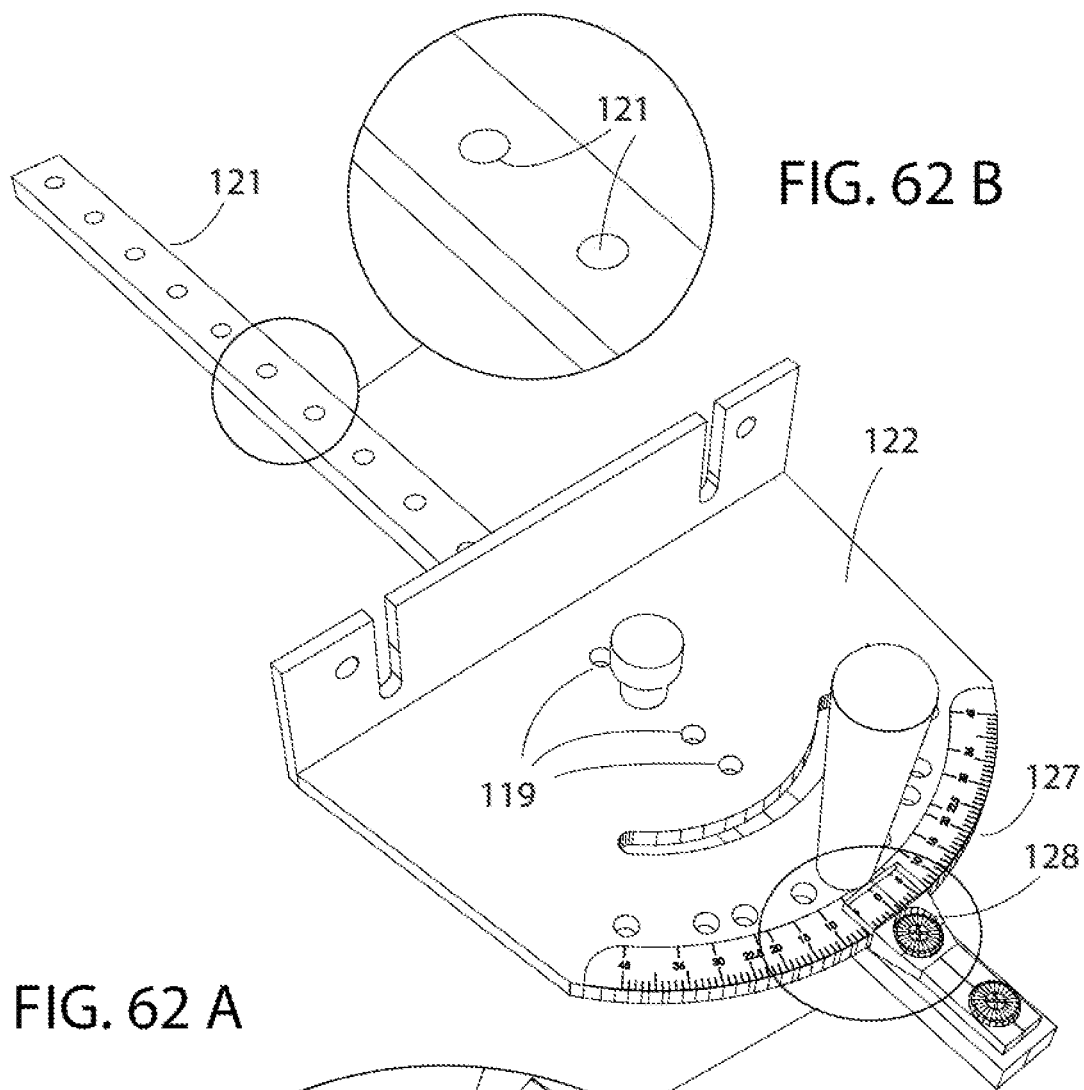
FIG. 62 B
FIG. 62 A
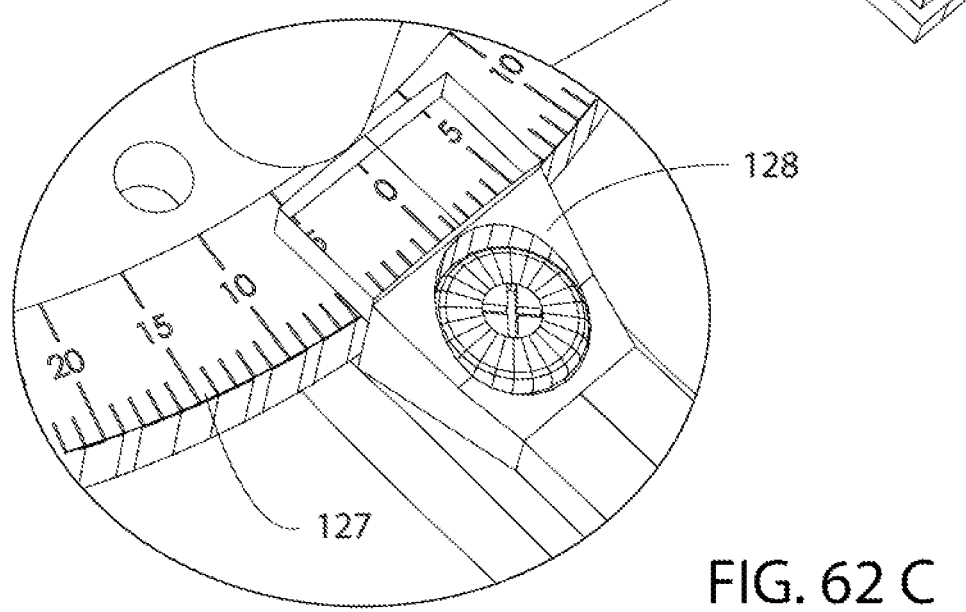
FIG. 62 C

MODULAR JIG AND FIXTURE SYSTEMS AND METHODS

CROSS-REFERENCE TO RELATED APPLICATIONS

This application is a divisional of U.S. patent application Ser. No. 16/291,951 filed on Mar. 4, 2019, which claims priority under 35 U.S.C. § 119 to U.S. Provisional Patent Application No. 62/637,456 filed on Mar. 2, 2018, entitled "Modular Jig and Fixture Systems and Methods," both of which are hereby incorporated by reference as if fully set forth herein.

STATEMENT CONCERNING FEDERALLY SPONSORED RESEARCH OR DEVELOPMENT

Not applicable.

FIELD OF THE INVENTION

This invention relates to jigs and fixtures for aligning, guiding, and/or holding a workpiece on woodworking machinery during a woodworking operation.

BACKGROUND OF THE INVENTION

Woodworking often employs a multitude of tools and machines to accomplish a variety of intricate operations. Challenges abound in addressing the ever-present desire to enhance efficient woodworking tools, machines, and methods. For instance, attempts have been made to improve the use of pocket hole jigs by enhancing access to the drill guide, such as by providing activation of the clamp from the same side as the drill guide. However, in that attempt, the construction and operation of the clamp mechanism required increased clearance and caused interference with the support surface upon which the pocket hole jig was placed or mounted. In a further attempt to address these interference issues, the base thickness was increased to provide additional clearance for the clamping mechanism, which ultimately resulted in a less efficient design that was bulk and more costly. The devices, systems, and methods disclosed herein provide inspired perspectives that address various woodworking issues faced by modern-day woodworkers.

SUMMARY

Jigs and fixtures for aligning, guiding, and/or holding a workpiece on woodworking machinery during a woodworking operation are described, as well as methods of making, modifying, and using jigs and fixtures. For example, a modular track and flip stop with a corrugated surface on the top and face of the track as well as a mating corrugated pattern on the bottom and top of the flip stop base are described. In addition, a flip stop base created from two identical mating parts that allows the top and bottom to be separated so the bolt can be moved without the need to disassemble the bolt and flip arm assembly is disclosed. Moreover, a modular miter gauge head and bar system for easily making custom, jigs, fixtures and sleds are disclosed. Other systems, methods, and variations on the preceding are also disclosed.

The foregoing and other objects and advantages of the invention will appear in the detailed description which follows. In the description, reference is made to the accompanying drawings which illustrate preferred embodiments of the invention.

BRIEF DESCRIPTION OF THE DRAWINGS

FIG. 2A is an exploded view of the pocket hole jig shown in FIG. 1A.

FIG. 2B is an exploded view of the pocket hole jig shown in FIG. 1A with a close up view of the U-shaped extrusion which fits into the drill block cavity.

FIG. 2C is an enlargement of the flat lock nut for securing the position of the clamp pad.

FIG. 4A is an exploded perspective view of the pocket hole jig shown in FIG. 1A shown from the side of the jig opposite the clamp.

FIG. 4B is an enlargement of the flat lock nut for securing the position of the clamp pad.

FIG. 4C is a perspective view of the L-shaped adapter plate which secures the drill guide to the pad of the toggle clamp. This view shows the rounded opening that accepts the top of the round clamp pad.

FIG. 5A is a perspective view of the L-shaped adapter plate which secures the drill guide to the pad of the toggle clamp. This view shows the rounded opening that accepts the top of the round clamp pad.

FIG. 5B is a perspective view of the L-shaped adapter plate which secures the drill guide to the pad of the toggle clamp shown from the opposite side of FIG. 5A.

FIG. 5C is a perspective view of the L-shaped adapter plate which secures the drill guide to the pad of the toggle clamp. This view shows the rounded opening that accepts the top of the round clamp pad.

FIG. 5D is a perspective view of the clamp pad.

FIG. 6A is a perspective view shown from the bottom of the jigs showing the L-shaped adapter plate which secures the drill guide to the pad of the toggle clamp pad. This view shows the rounded opening that accepts the top of the round clamp pad.

FIG. 6B is an enlargement of FIG. 6A with the clamp pad removed.

FIG. 6C is an enlargement of FIG. 6A.

FIG. 7A is a perspective view of a modified pocket hole jig with an L-shaped adapter plate which secures the drill guide to the pad of the toggle clamp. A threaded screw secures the L-shaped adapter plate to the round clamp pad.

FIG. 7B is an enlargement of FIG. 7A.

FIG. 7C is an enlargement of FIG. 7A with the outside surface removed showing the end of the threaded screw in contact with the bottom half of the clamp pad.

FIG. 8A is a perspective top view of the L-shaped adapter plate which secures the drill guide to the pad of the toggle clamp. This view shows the two dovetails on the top of the L-shaped adapter plate which fit into the bottom dovetail openings in the bottom of the pocket hole drill guide.

FIG. 8B is an enlargement of FIG. 8A.

FIG. 8C is a perspective view from the bottom of FIG. 8A.

FIG. 8D is an enlargement of FIG. 8C.

FIG. 9A is a perspective view of pocket hole jig with a track and flip stop system and a flip stop system mounted on the side of the jig.

FIG. 9B is an enlargement of FIG. 9A showing a stop located in the non-functioning position.

FIG. 9C is an enlargement of FIG. 9A showing a stop located in the functioning position with the bolt in contact with the workpiece.

FIG. 10A is a perspective view of FIG. 9A shown with the clamp pad removed.

FIG. 10B is an enlargement of FIG. 10A showing a stop located in the functioning position positioned against the workpiece that is positioned with the center mark on the board located on the noted center mark line of the decal.

FIG. 10C is the same view as shown in FIG. 10B with the other markings on the scale removed.

FIG. 11A is a perspective view of a modified pocket hole jig with a track and flip stop system.

FIG. 11B is an enlargement of FIG. 11A showing a short piece of track and the V-shaped opening in the flip stop arm.

FIG. 11C is a sectional view of the flip stop arm and it shows how the corner of the track fits into the V-shaped opening in the flip stop arm.

FIG. 13A is a perspective view of pocket hole jig with a track and flip stop system and a flip stop system mounted on the side of the jig.

FIG. 13B is an exploded view of the flip stop arm and the track shown in FIG. 13A.

FIG. 14A is a perspective view of pocket hole jig with a track and flip stop system and a flip stop system mounted on the side of the jig.

FIG. 14B is a perspective view of the flip stop arm and the track shown in FIG. 14A.

FIG. 14C is an end view of the flip stop arm and the track shown in FIG. 14A.

FIG. 19A is a single track with a rectangular inside track ruler extrusion. The ruler is located between the extrusion and the T-slot opening.

FIG. 19B is a single track with an angled inside track ruler extrusion.

FIG. 19C is an enlargement of FIG. 19A.

FIG. 19D is a perspective view of FIG. 19A.

FIG. 19E is a perspective view of the rulers shown in various positions in relationship to the inside extrusions.

FIG. 20A is a perspective view of a pocket hole jig with a track and stop.

FIG. 20B is an enlargement of FIG. 20A.

FIG. 20C is an exploded view of FIG. 20A illustrating the two part stop block made from two identical parts which fit together.

FIG. 23A is perspective view of a pocket hole jig with a track and stop and two inside track extrusions which can be used as a ruler extrusion and a connecter extrusion.

FIG. 23B is an enlargement of FIG. 23A.

FIG. 23C is a perspective view of a portion of FIG. 23A.

FIG. 24A is an exploded view of the flip stop illustrating the two part stop block made from two identical parts which fit together and the double inside track extrusions.

FIG. 24B is a sectional view of the block half and double inside track.

FIG. 24C is an exploded view of FIG. 24B.

FIG. 26A is a perspective view of the base adapter that fits into the T-slot.

FIG. 26B is an end view of the base adapter that illustrates the relationship with the T-slot.

FIG. 26C is an end view of the base adapter that illustrates the relationship with the T-slot and the radius of the curve that adjust the extrusion to lock tightly in the T-slot.

FIG. 26D is a top view of the base adapter.

FIG. 26E is an end view of the base adapter.

FIG. 28A is a pocket hole jig with the shape of the L-shaped extrusion located on the side of the jig. Inside the L-shape is a dovetailed hook and the rectangular shape of a connector that fits inside the L-shaped extrusion and fits over the dovetail hook.

FIG. 28B is an enlargement of FIG. 28A.

FIG. 28C shows a piece of the L-shaped extrusion fitting over the rectangular-shaped connector.

FIG. 28D is an exploded view of FIG. 28C shown from the opposite side of FIG. 28C.

FIG. 30A is a pocket hole jig with the shape of the L-shaped extrusion located on the side of the jig. Inside the L-shape is a dovetailed hook attached to the pocket hole jig.

FIG. 30B is an enlargement of FIG. 30A.

FIG. 30C is a perspective view showing the bottom of the dovetail hook.

FIG. 30D illustrates the inside of the rectangular-shaped connector showing an angled cavity that is sized to receive the dovetail hook.

FIG. 30E illustrates the inside of the rectangular-shaped connector showing the dovetail hook located in the cavity.

FIG. 36A is pocket hole jig, such as a KREG K5 pocket hole jig, shown with the L-shaped flip stop attached to the double T-slot attached to the storage box on the side of the jig.

FIG. 36B is an enlargement of the flip stop shown in FIG. 36A.

FIG. 36C is a perspective view which illustrates the flip stop from the front of the jig.

FIG. 36D is an enlargement of a flip stop shown in FIG. 36C.

FIG. 38A is a pocket hole jig with the shape of the L-shaped extrusion located on the side of the jig. Inside the L-shape is a dovetailed hook and the rectangular shape of a connector that fits inside the L-shaped extrusion and fits over the dovetail hook.

FIG. 38B is an enlargement view of FIG. 38A.

FIG. 38C illustrates the L-shaped track with the flip stop connected to the example KREG K5 jig. The short leg of the L-shaped track is parallel to the floor of the pocket hole jig.

Figure 39:
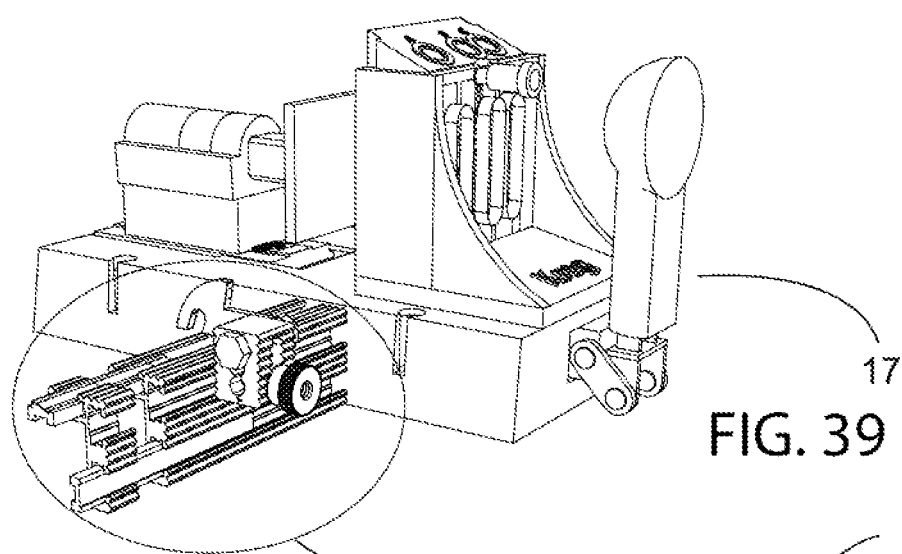
Figure 39:
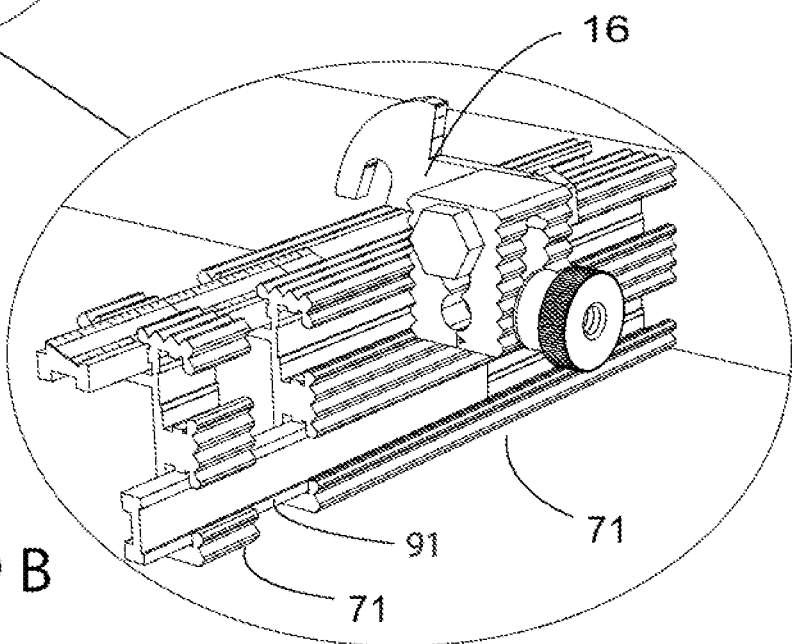
Figure 39:
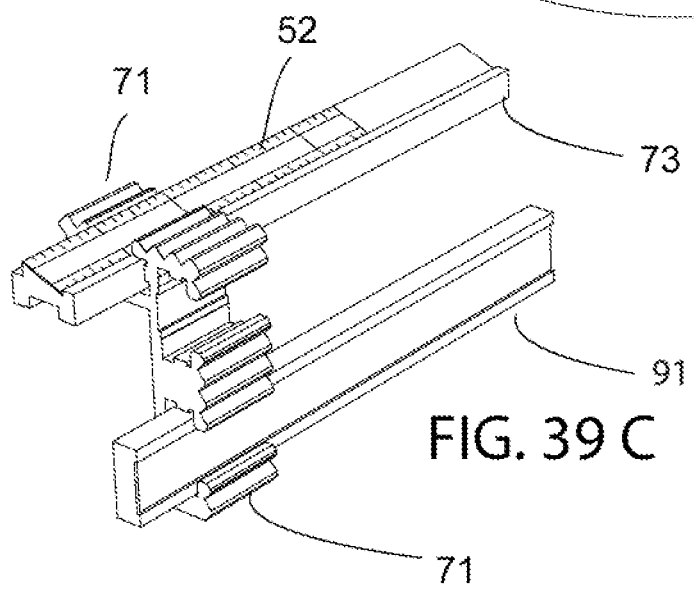

FIG. 39A is a perspective view of a pocket hole jig with the shape of the L-shaped extrusion located on the side of the jig with a flip stop attached to the track. Two extrusions are located inside the L-shaped extrusion T-slots and fit inside another extrusion. The two inside extrusions can be secured inside the T-slots to couple or lock the extrusions together.

FIG. 39B is an enlargement of FIG. 39A.

FIG. 39C is an enlargement of FIG. 39A shown with the large piece of track removed.

Figure 40:
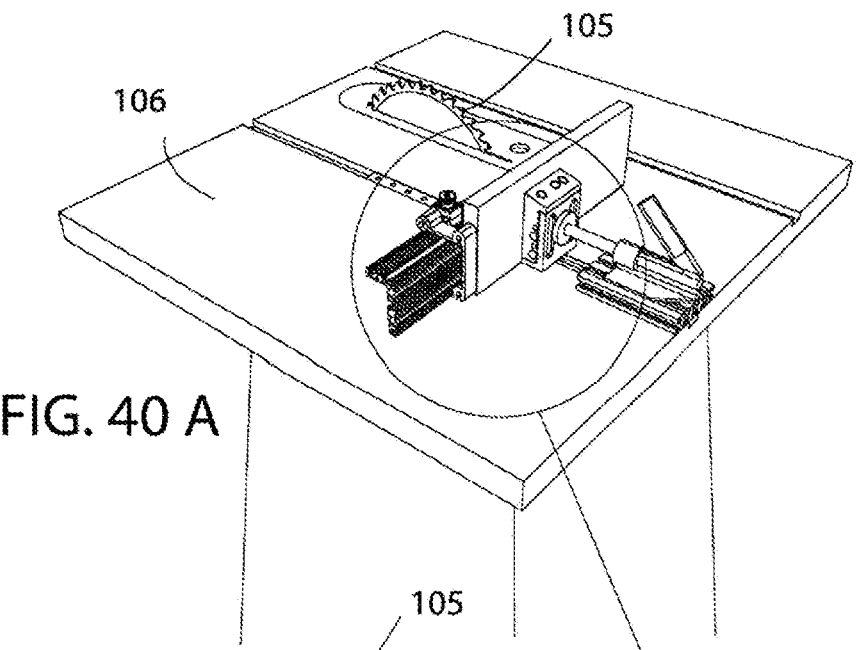
Figure 40:
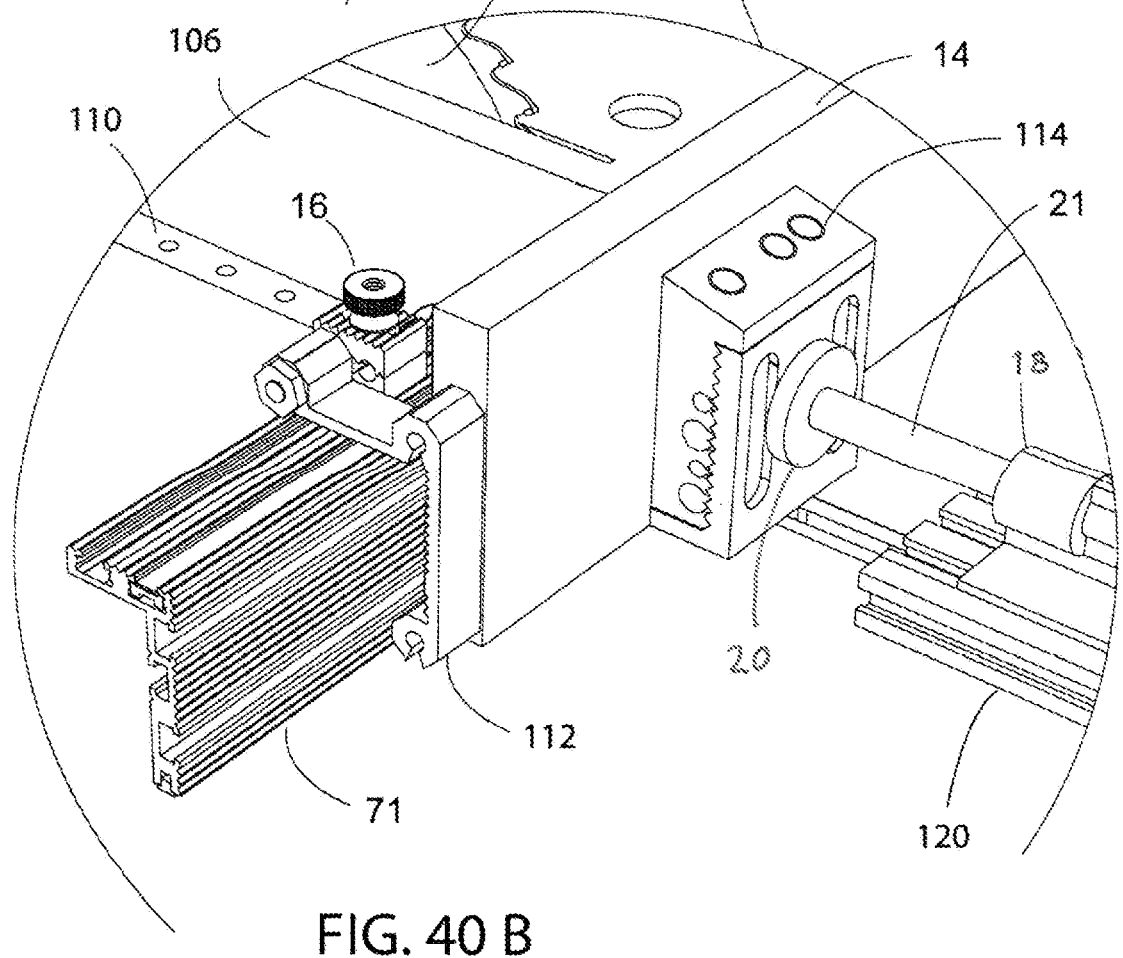

FIG. 40A shows a pocket hole drill guide secured to a miter gauge bar with a toggle clamp also attached to the miter bar positioned on a table saw. The clamp pad presses the drill guide against the workpiece which is in contact with an extrusion.

FIG. 40B is an enlargement of FIG. 40A.

Figure 41A:
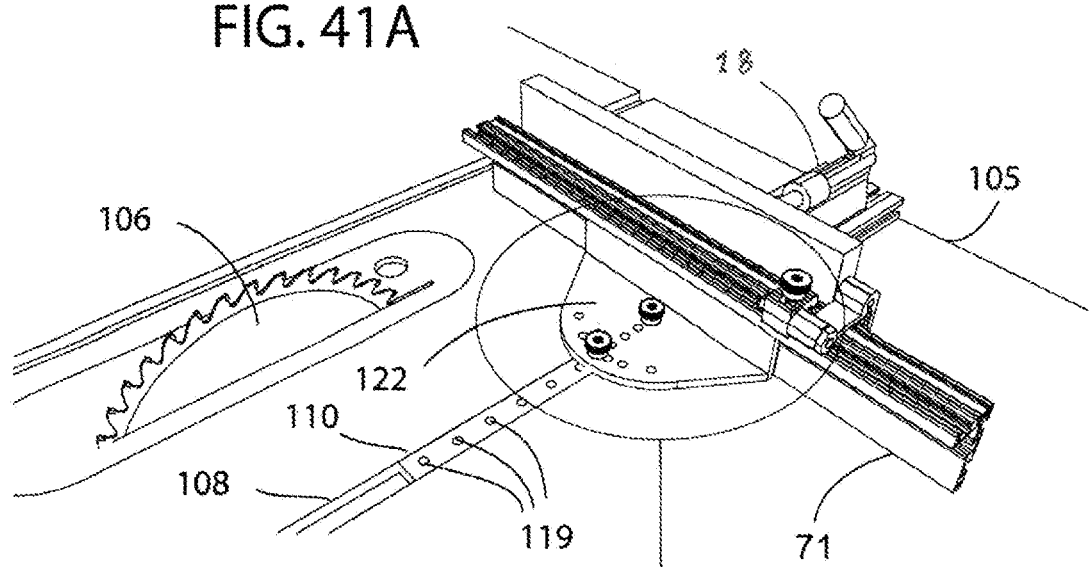

FIG. 41A is a perspective view of FIG. 40A viewed from the back of the table saw.

Figure 41B:
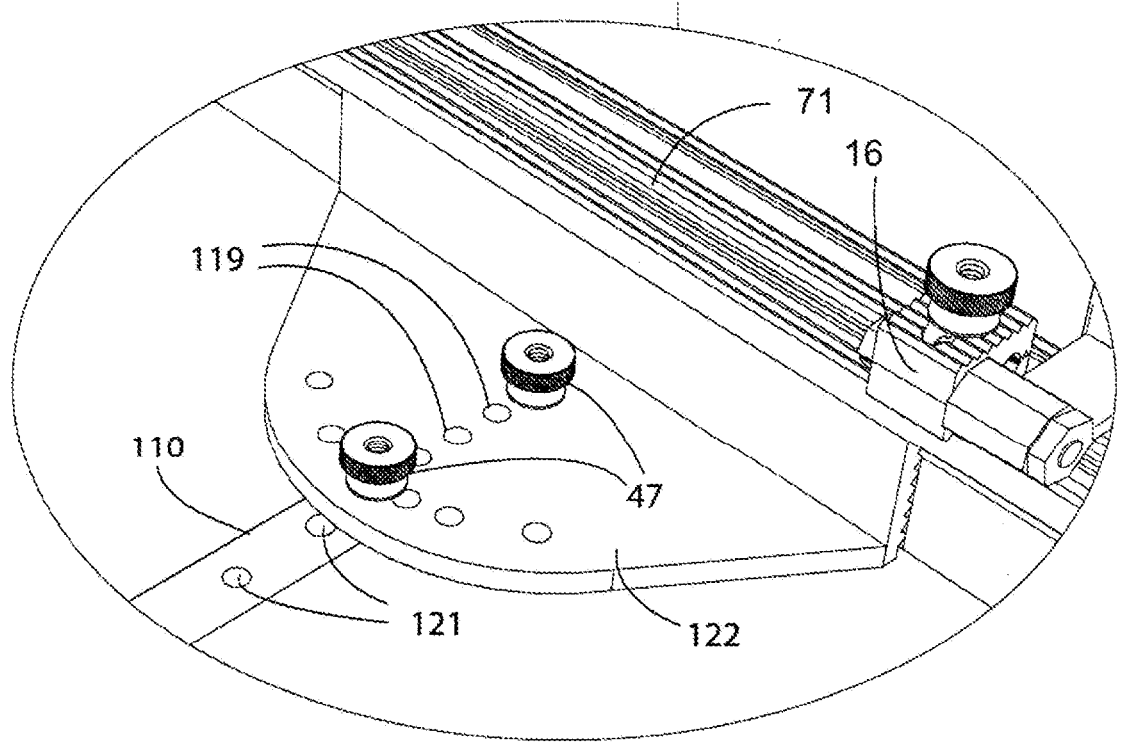

FIG. 41B is an enlargement of FIG. 41A.

FIG. 42A shows a pocket hole drill guide secured to a miter gauge bar with a toggle clamp also attached to the miter bar positioned on a table saw. The clamp pad presses the drill guide against the workpiece which is in contact with an extrusion fitted with a flip stop.

FIG. 42B is an enlargement of the drill guide block shown in FIG. 42A.

FIG. 42C is an enlargement of the flip stop shown in FIG. 42A.

FIG. 42D is an end view of the drill guide block shown in FIG. 42A.

FIG. 42E and FIG. 42F are end views of the drill guide block bottom and back shown in FIG. 42D.

Figure 43:
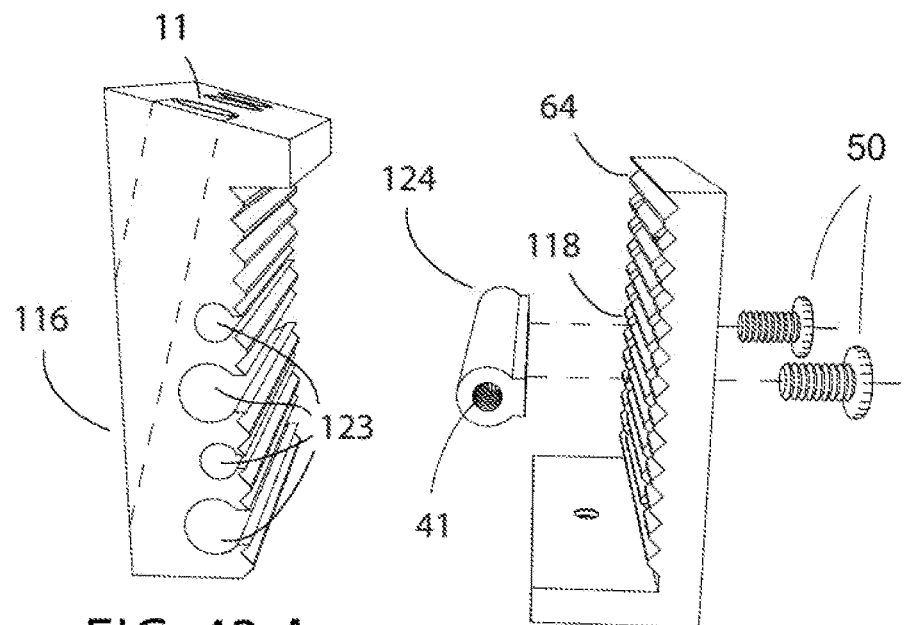
Figure 43:
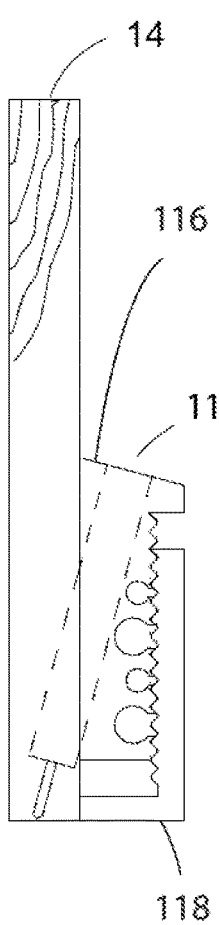
Figure 43:
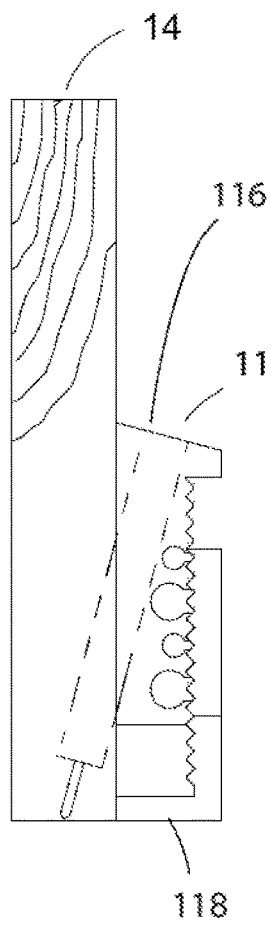
Figure 43:
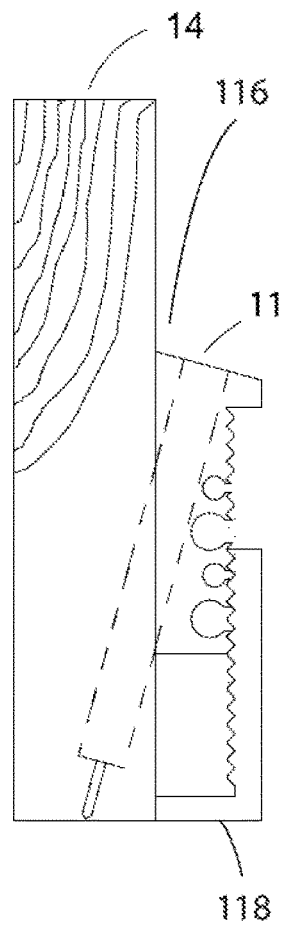

FIG. 43A is an exploded view of the drill guide block.

FIG. 43B illustrates the drill guide block adjusted for drilling ¾ " material, for example.

FIG. 43C illustrates the drill guide block adjusted for drilling 1⅛" material, for example.

FIG. 43D illustrates the drill guide block adjusted for drilling 1½" material, for example.

Figure 44:
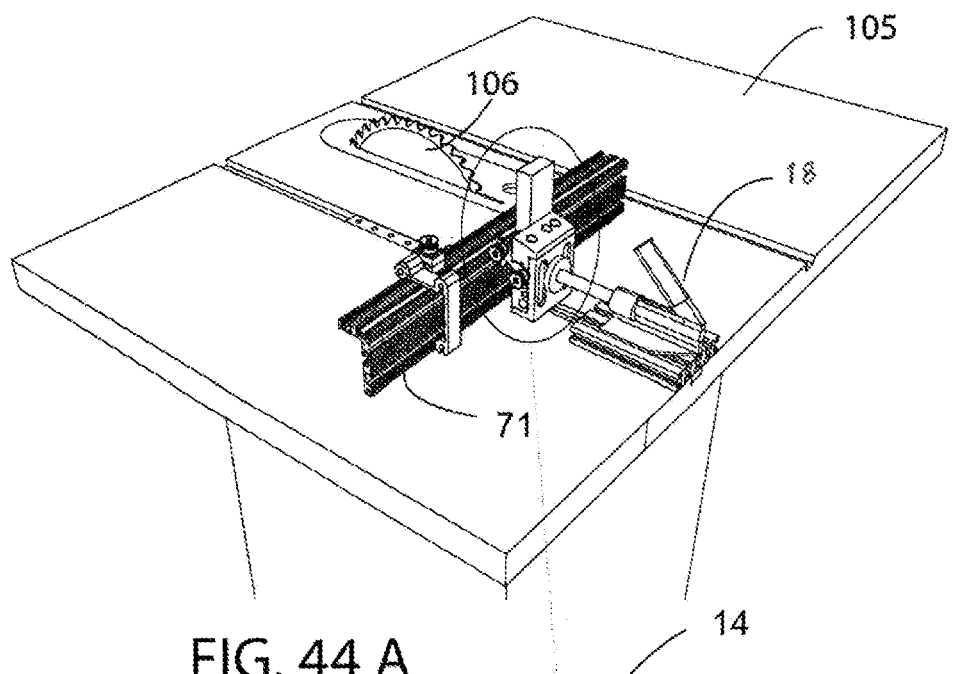
Figure 44:
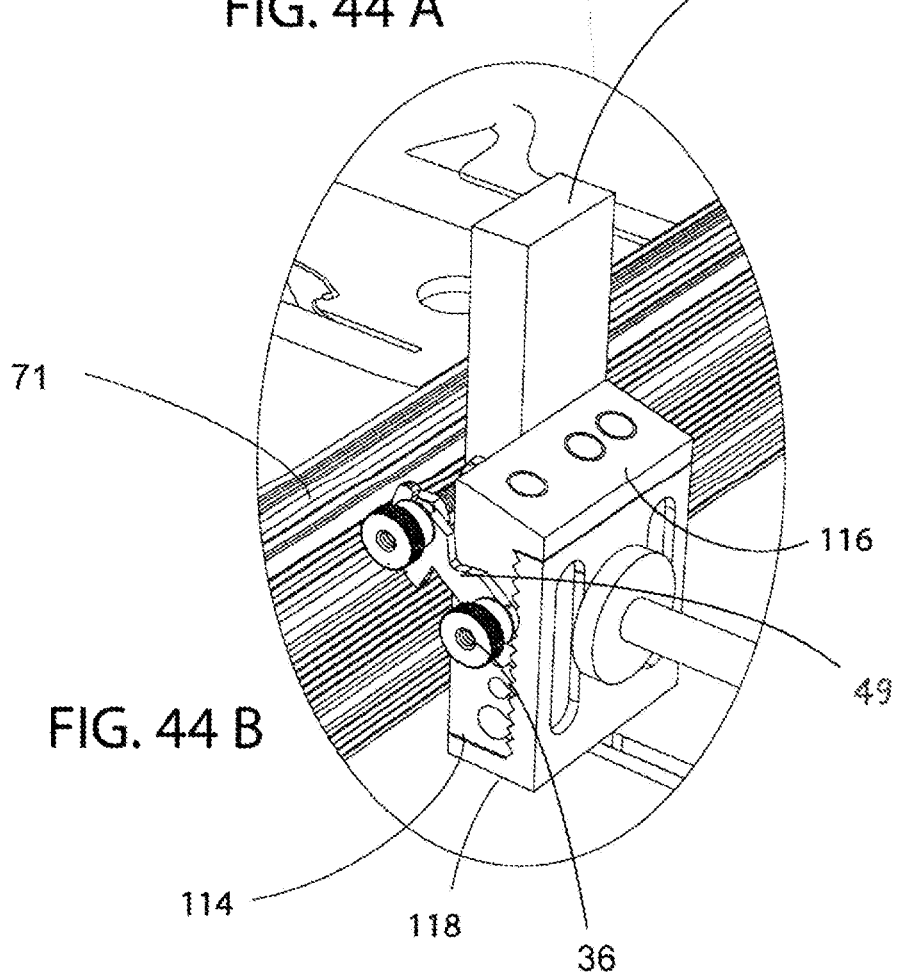

FIG. 44A shows a pocket hole drill guide secured to a miter gauge bar with a toggle clamp also attached to the miter bar positioned on a table saw. The clamp pad presses the drill guide against the workpiece which is in contact with an extrusion fitted with a flip stop. A flip stop on the side of the drill guide locates the position of the workpiece.

FIG. 44B is an enlargement of FIG. 44A.

FIG. 45A is a perspective view of FIG. 44A shown from the back of the table saw.

FIG. 45B is an enlargement of FIG. 45A.

FIG. 45C is a perspective view of FIG. 45B showing the stop bolt touching the workpiece.

FIG. 45D is an exploded view of the flip stop arm and the adjustable bolts and locking thumb screws.

Figure 46:
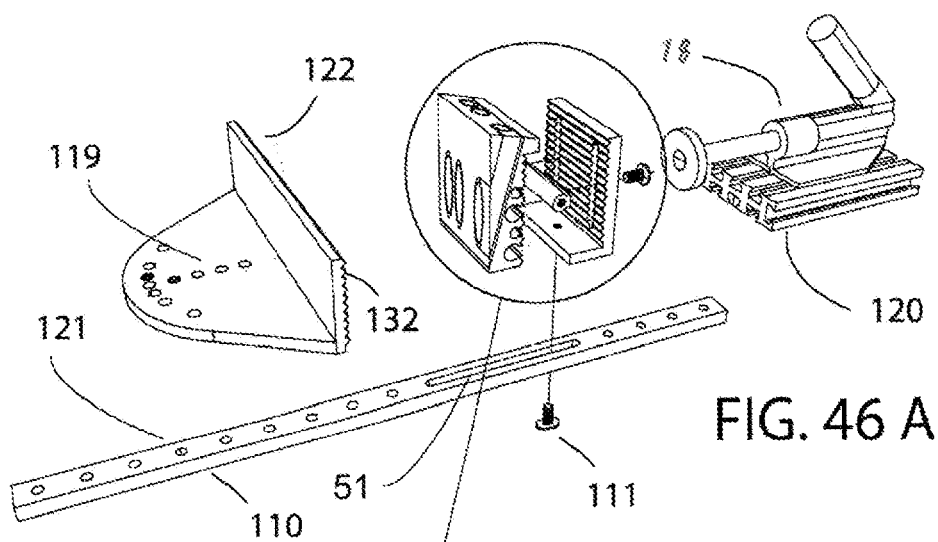
Figure 46:
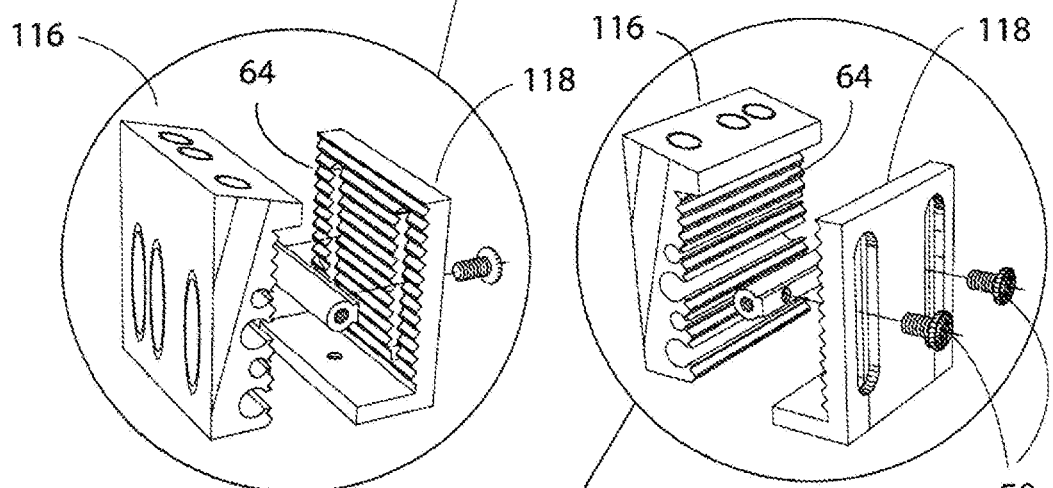
Figure 46:
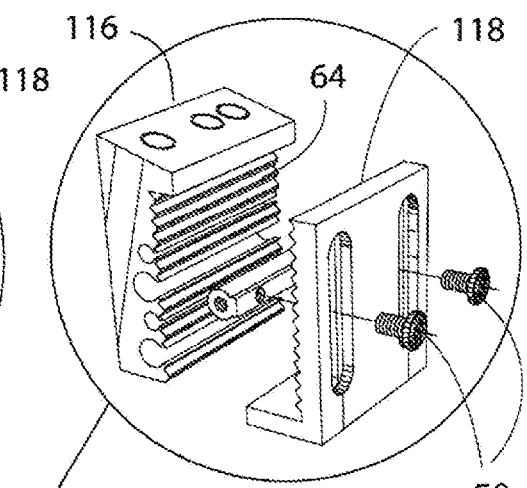
Figure 46:
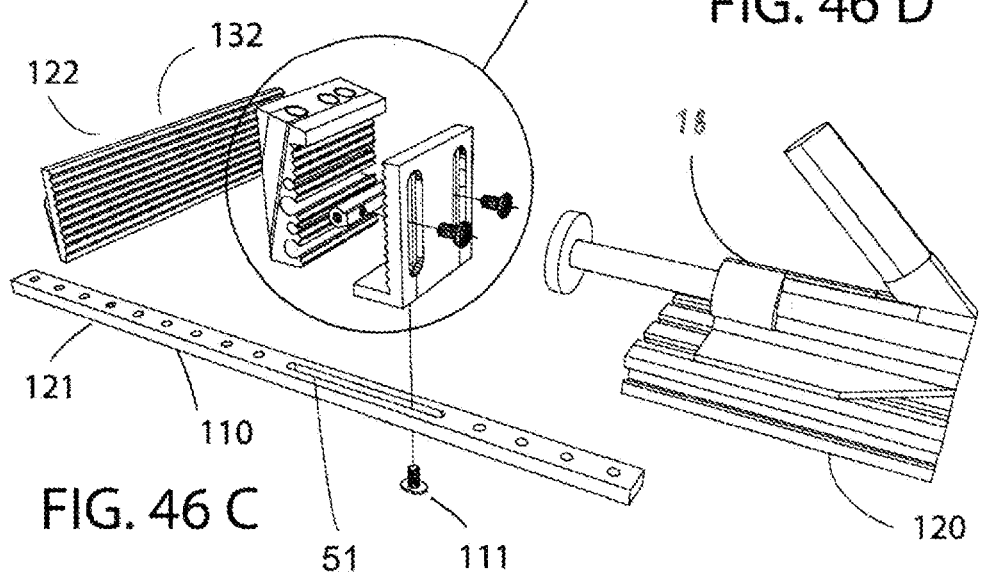

FIG. 46A is an exploded view of the miter gauge and drill guide block shown from the perspective of the back side of the table saw.

FIG. 46B is an enlargement of FIG. 46A.

FIG. 46C is an exploded view of the miter gauge and drill guide block shown from the perspective of the front side of the table saw.

FIG. 46D is an enlargement of FIG. 46C.

Figure 47:
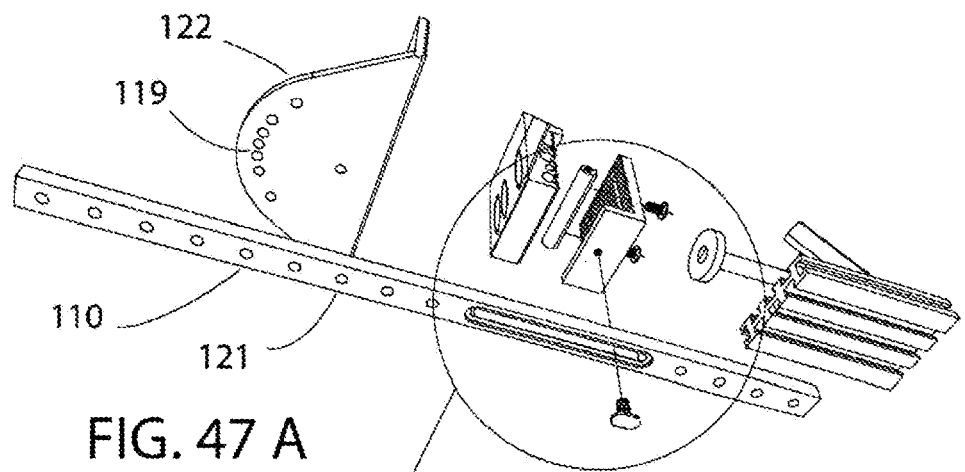
Figure 47:
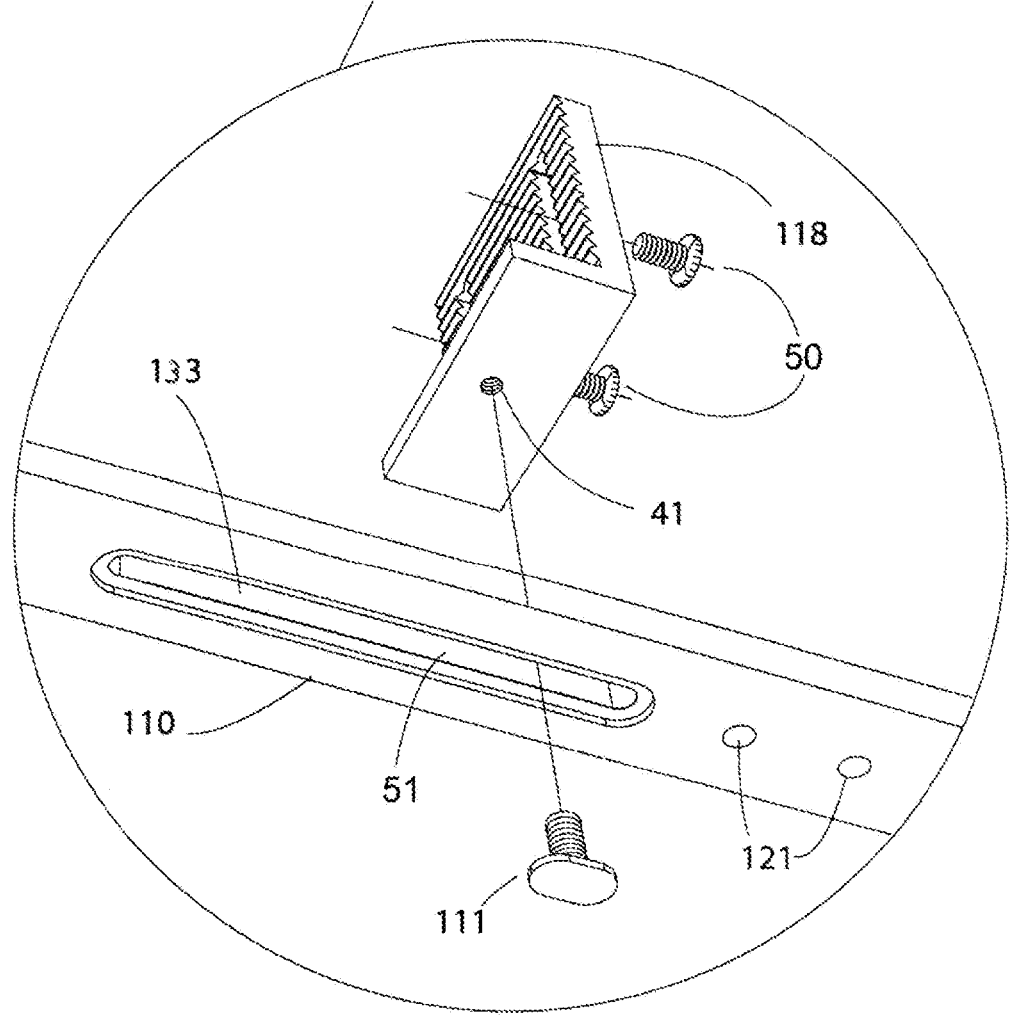

FIG. 47A is an exploded view of the miter gauge and drill guide block shown from the perspective of the bottom of the table saw.

FIG. 47B is an enlargement of FIG. 47A. The drill guide block is secured to the miter bar with a toilet bolt which is located in a slot in the middle of the miter bar. A groove in the bottom of the miter bar captures the head of the toilet bolt.

Figure 48:
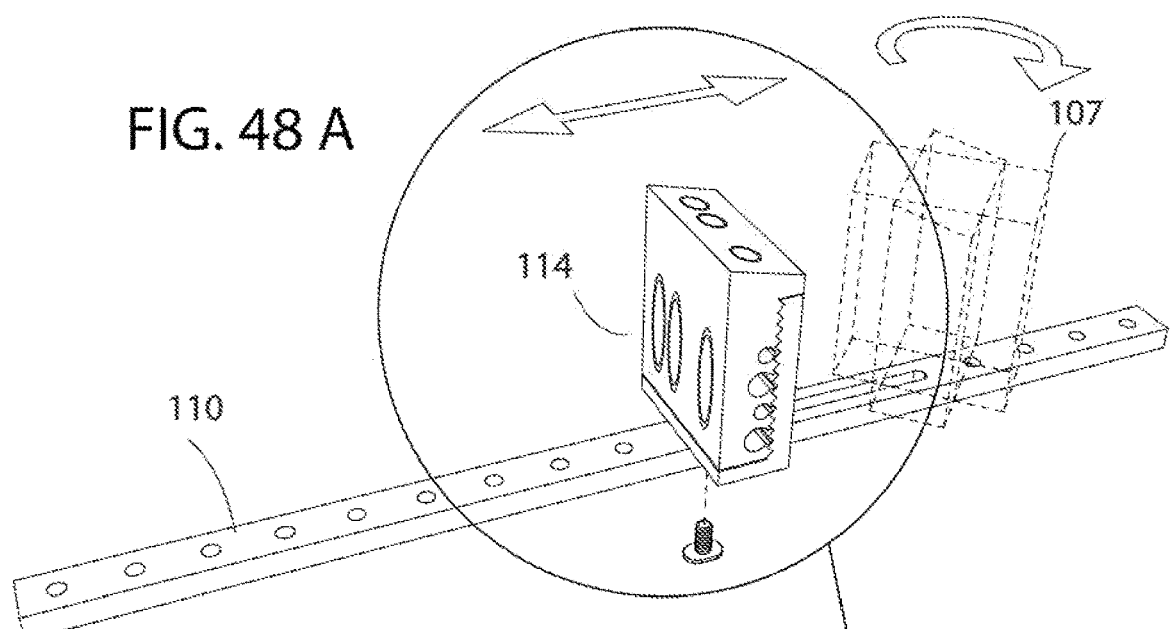
Figure 48:
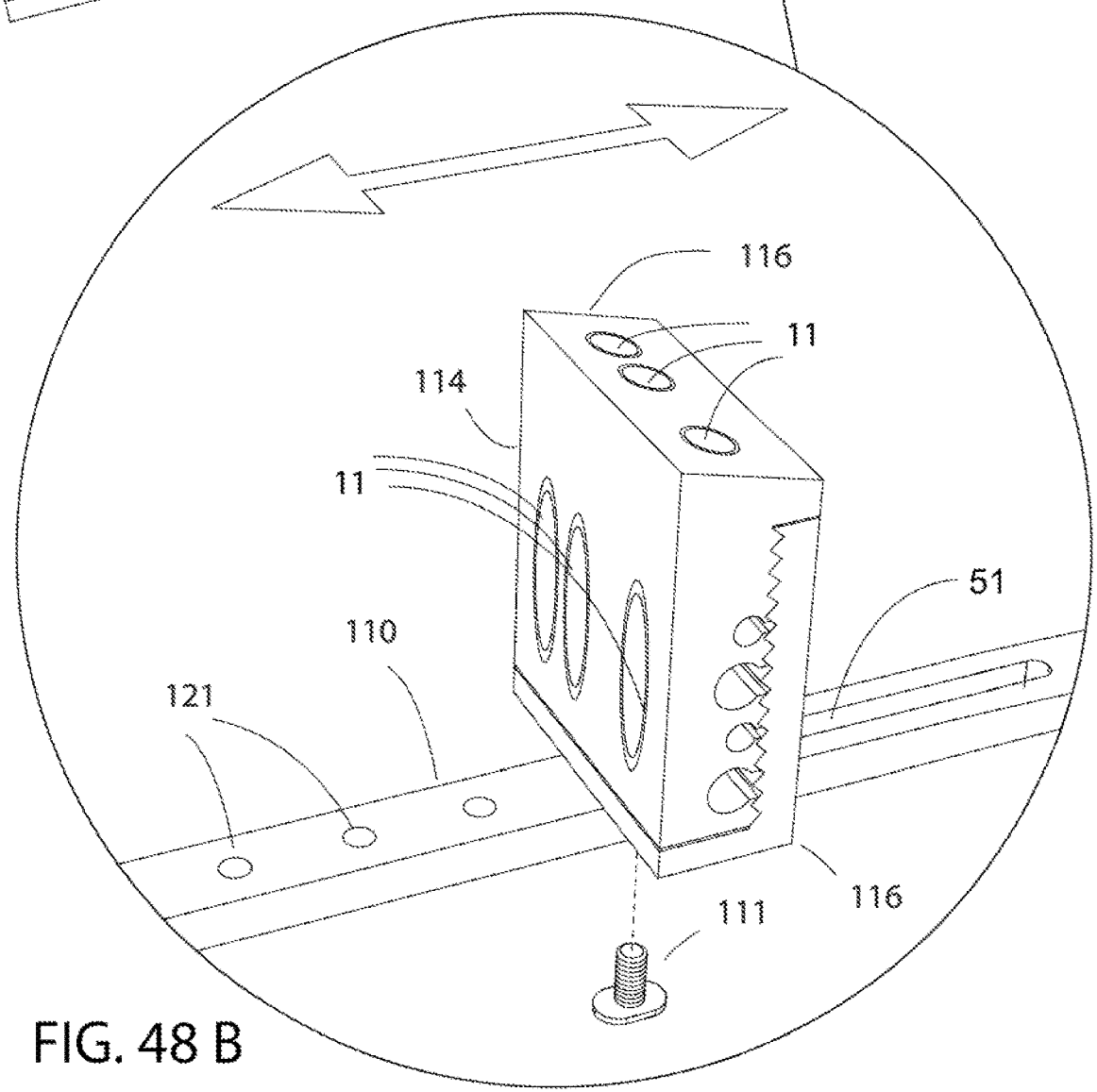

FIG. 48A is a perspective view of the drill guide block secured to the miter bar with a toilet bolt which is located in a slot in the middle of the mite bar. The slot allows the drill guide to rotate and move forward and backward on the miter bar.

FIG. 48B is an enlargement of FIG. 48A.

FIG. 49A is a perspective view of the drill guide block secured to the miter bar with a toilet bolt which is located in a slot in the middle of the miter bar. The slot allows the drill guide to move forward and backward on the miter bar. It also allows the drill block to be rotated so the holes can be located on the same side of the workpiece as the clamp. The drill holes can also be located on the opposite side of the clamp as the KREG K4 jig, for example.

FIG. 49B is an enlargement of FIG. 48A.

Figure 50:
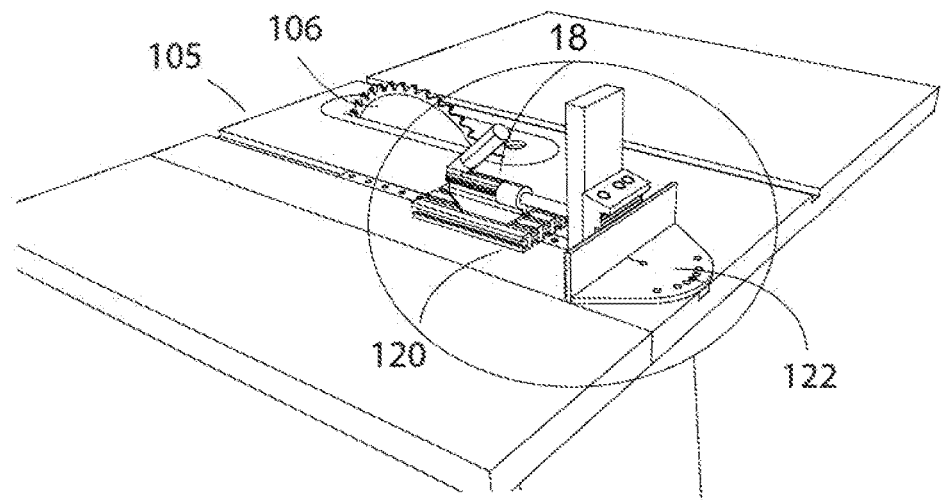
Figure 50:
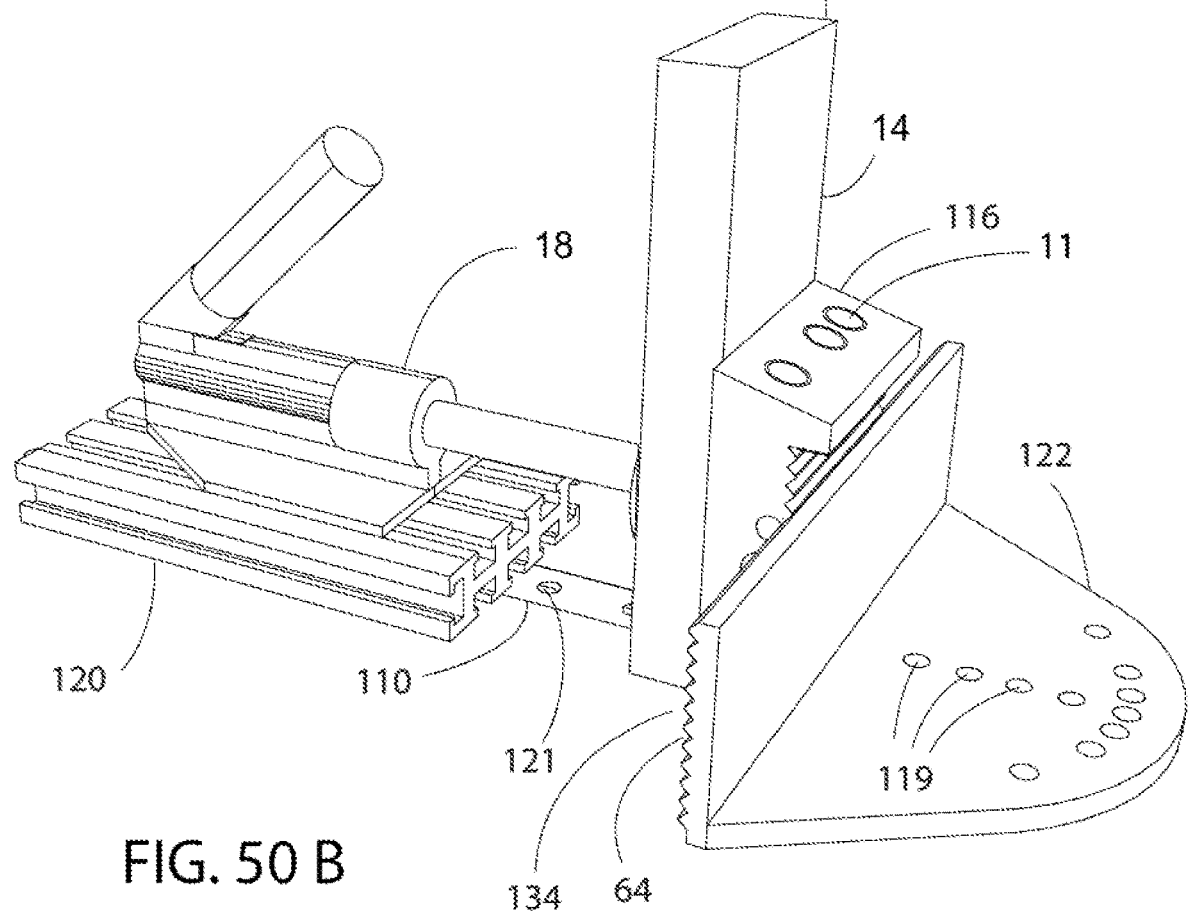

FIG. 50A shows a pocket hole drill guide secured to a miter gauge bar with a toggle clamp also attached to the miter bar positioned on a table saw. The clamp pad presses the workpiece toward the drill guide.

FIG. 50B is an enlargement of FIG. 50A.

Figure 51:
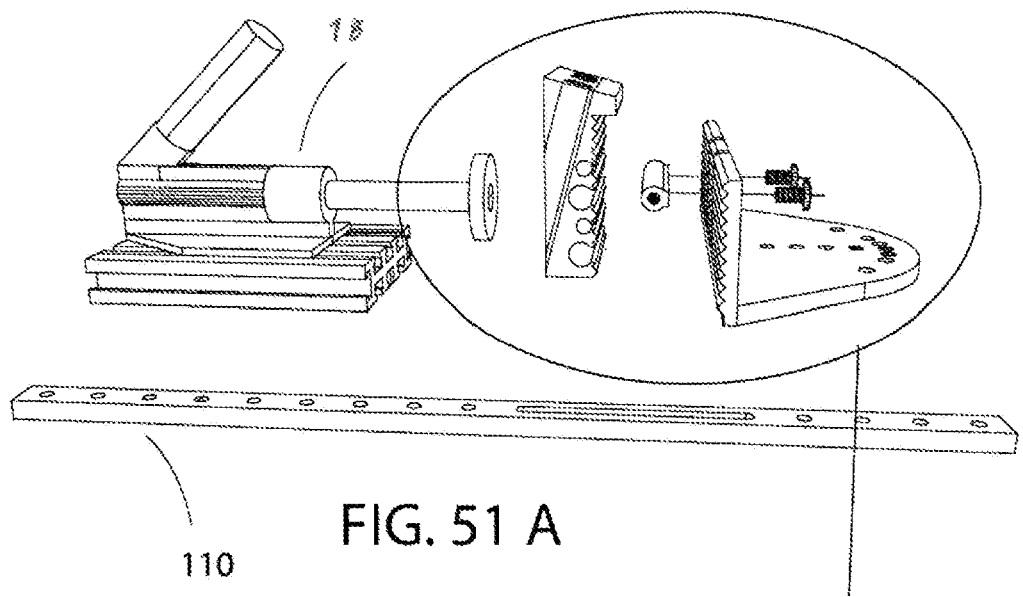
Figure 51:
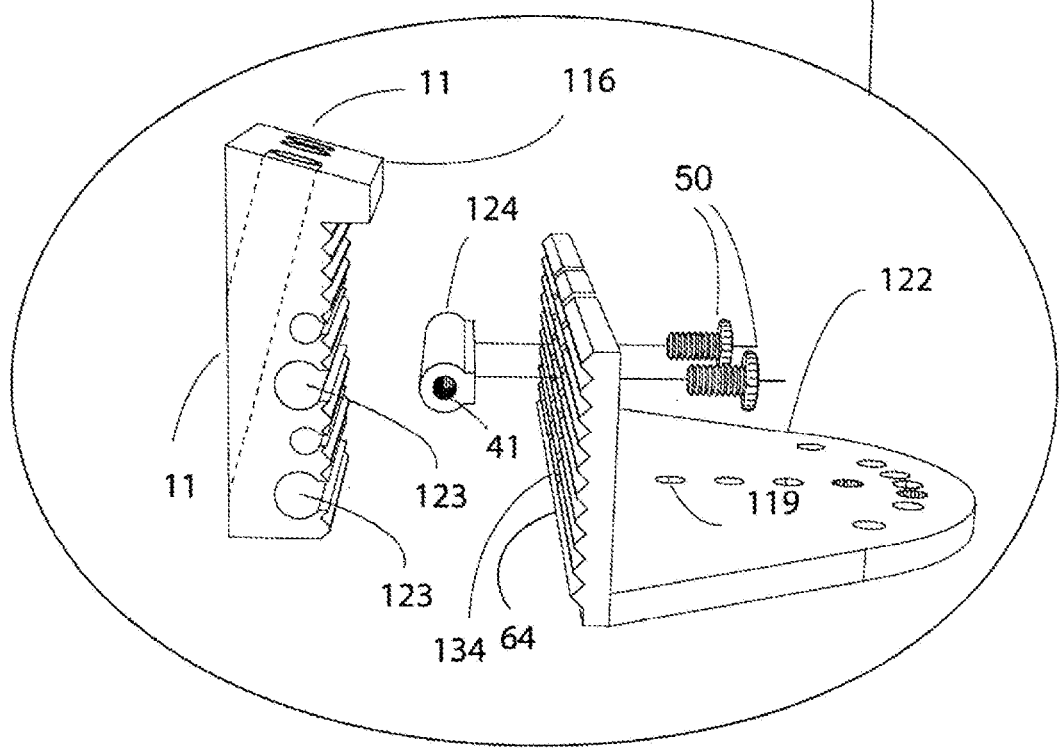

FIG. 51A is an exploded view of FIG. 50A.

FIG. 51B is an enlargement of FIG. 51A.

Figure 52:
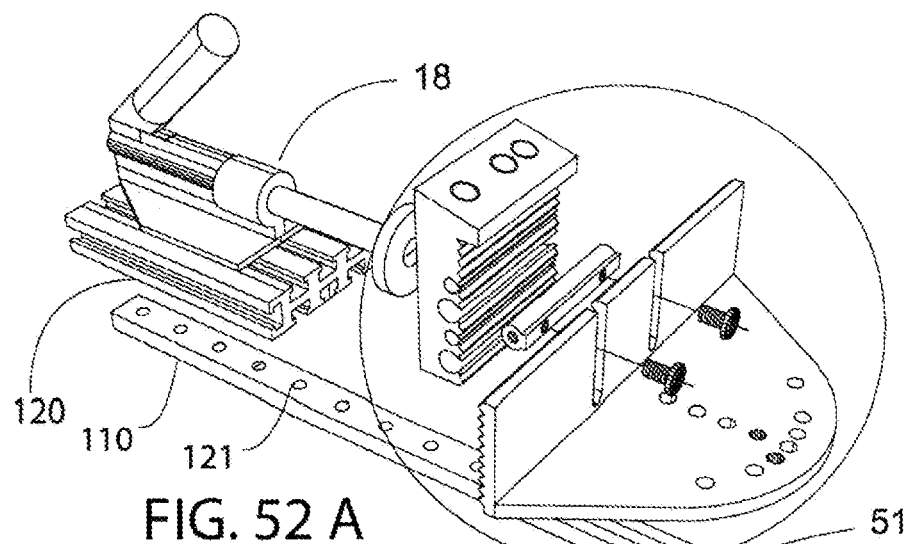
Figure 52:
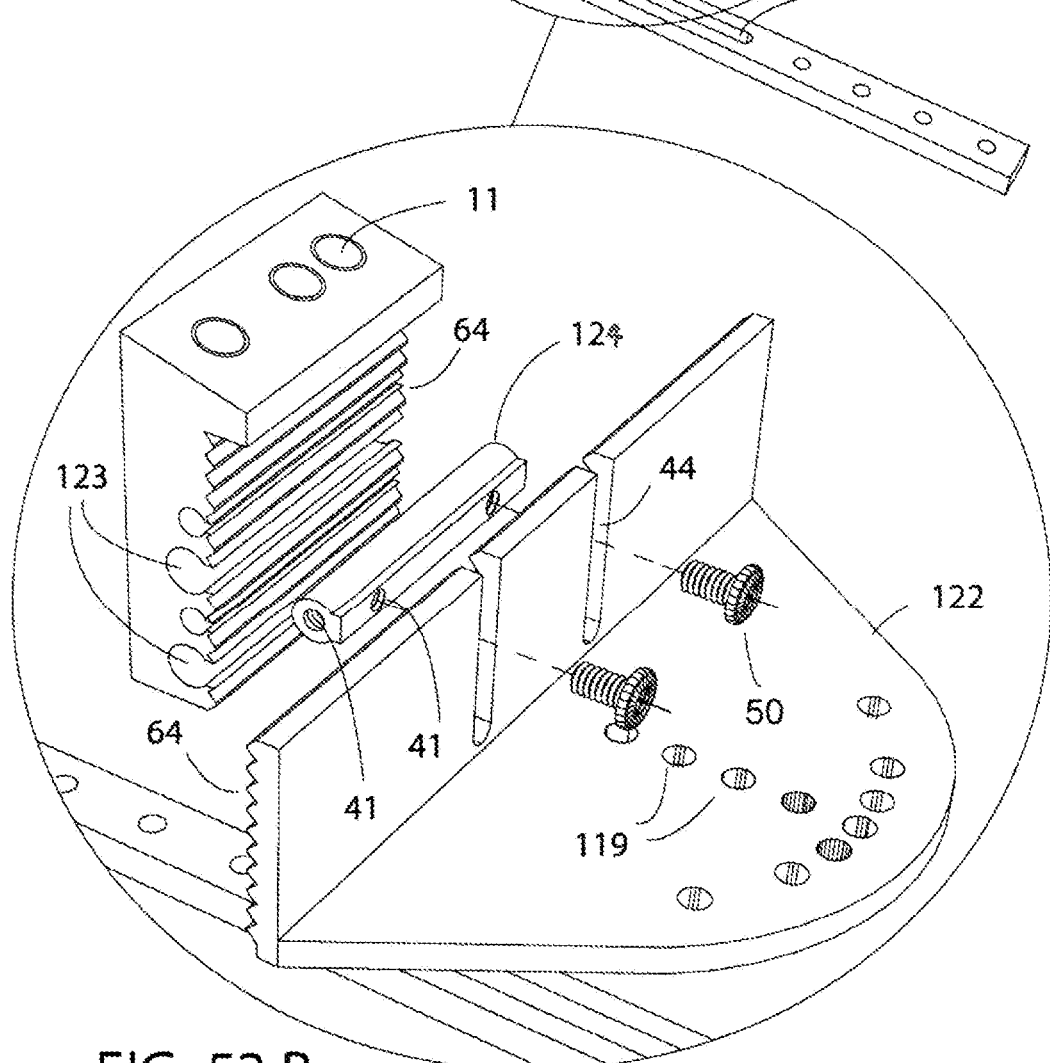

FIG. 52A is a partial exploded perspective view of FIG. 50A.

FIG. 52B is an enlargement of FIG. 52A.

Figure 53:
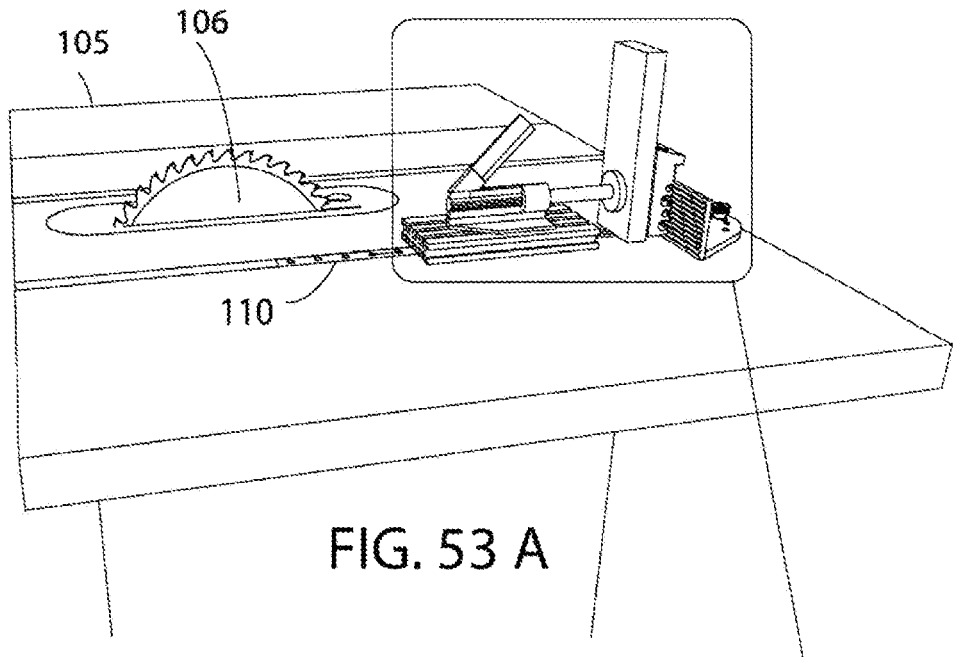
Figure 53:
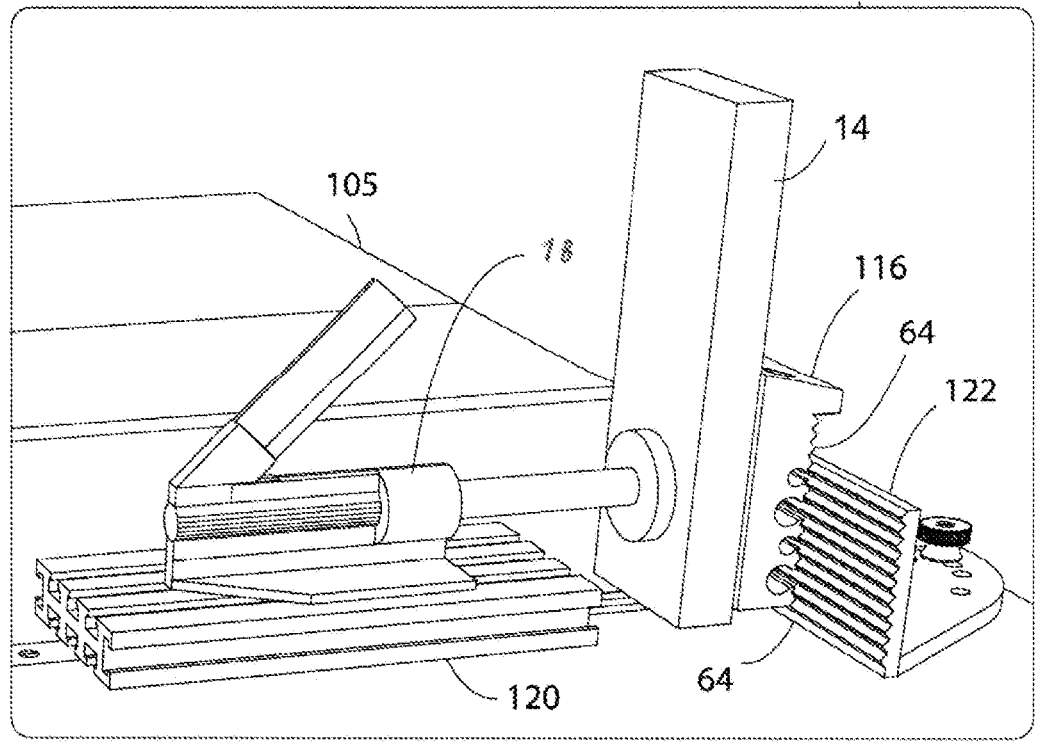

FIG. 53A is a perspective view of FIG. 50A from the back of the saw.

FIG. 53B is an enlargement of FIG. 53A.

Figure 54:
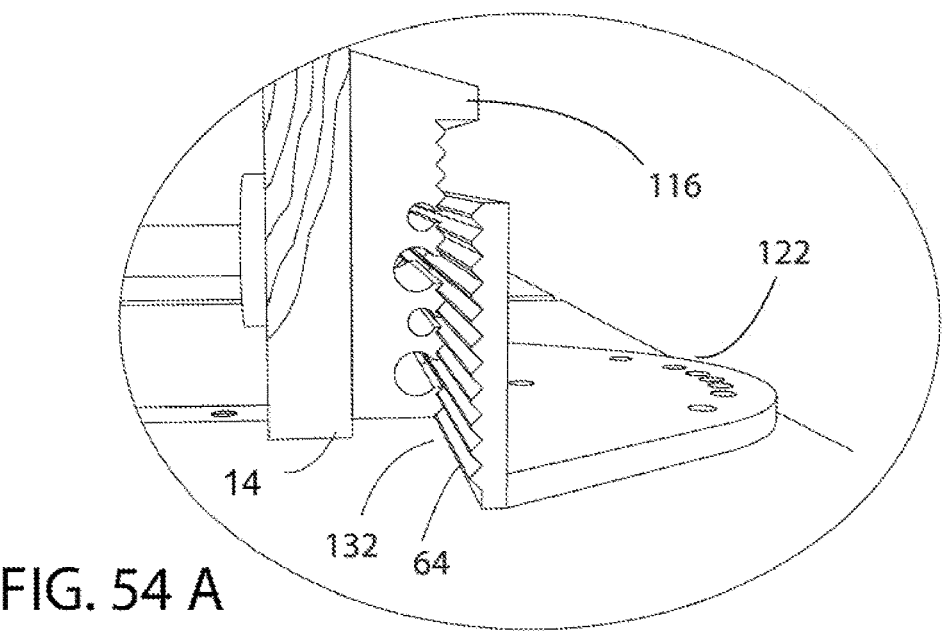

FIG. 54A is a close up view of the drill guide block and the miter head.

FIG. 54B illustrates the drill guide block adjusted for drilling ¾" material, for example.

Figures 54, 54C:
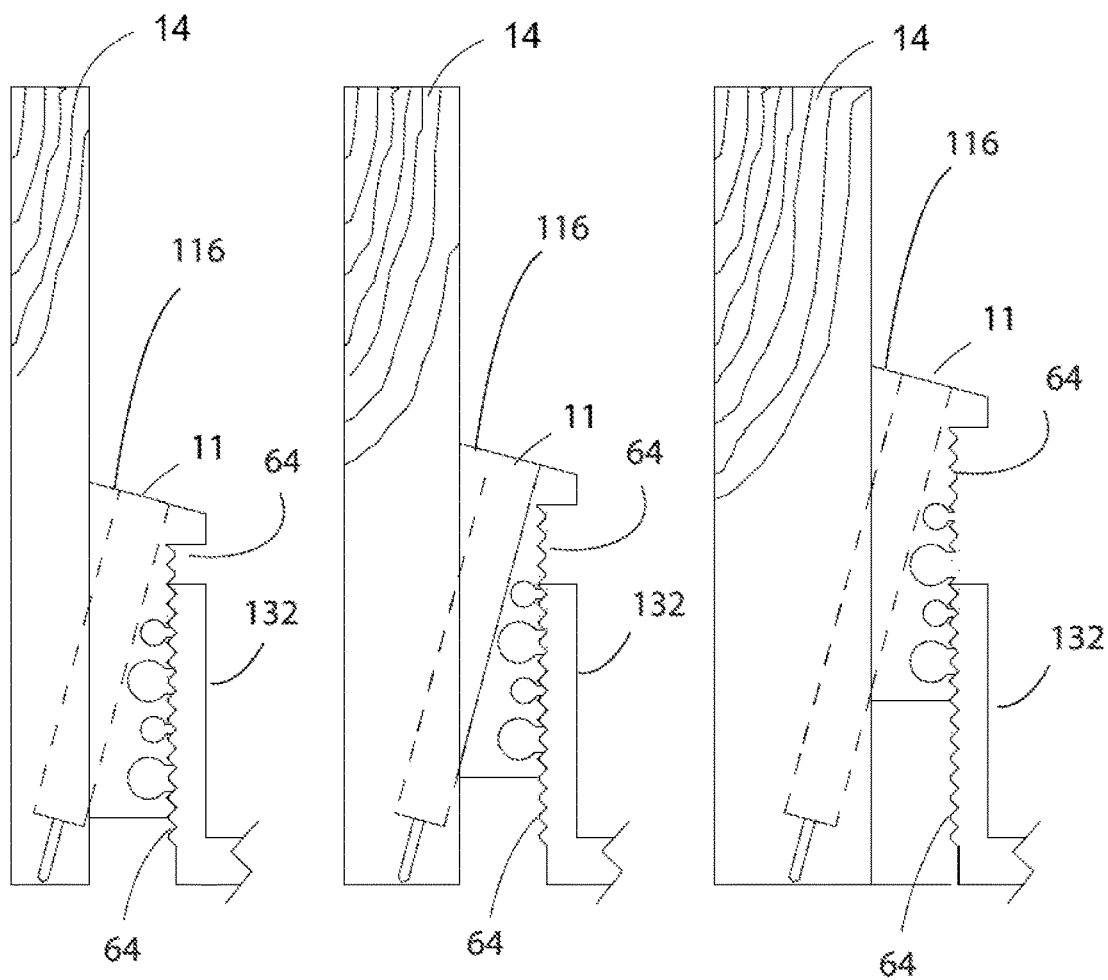

FIG. 54C illustrates the drill guide block adjusted for drilling 1⅛" material, for example.

FIG. 54D illustrates the drill guide block adjusted for drilling 1½" material, for example.

Figure 55:
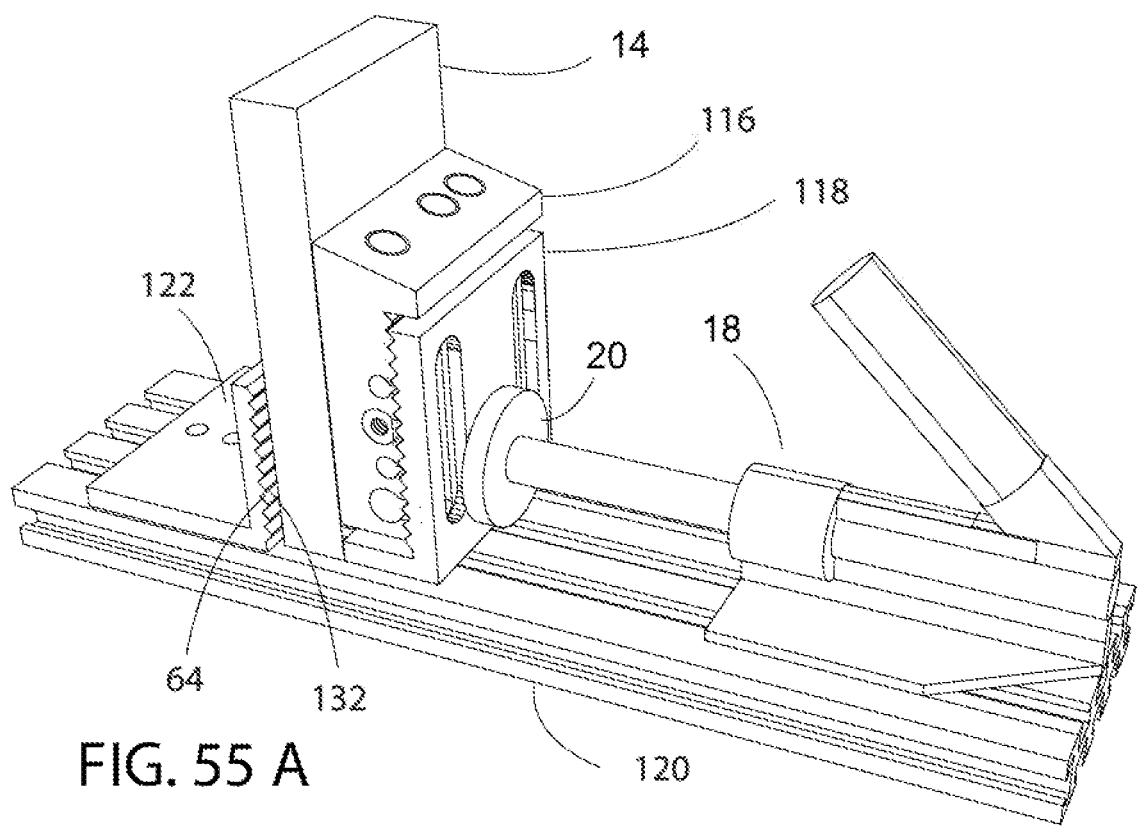
Figure 55:
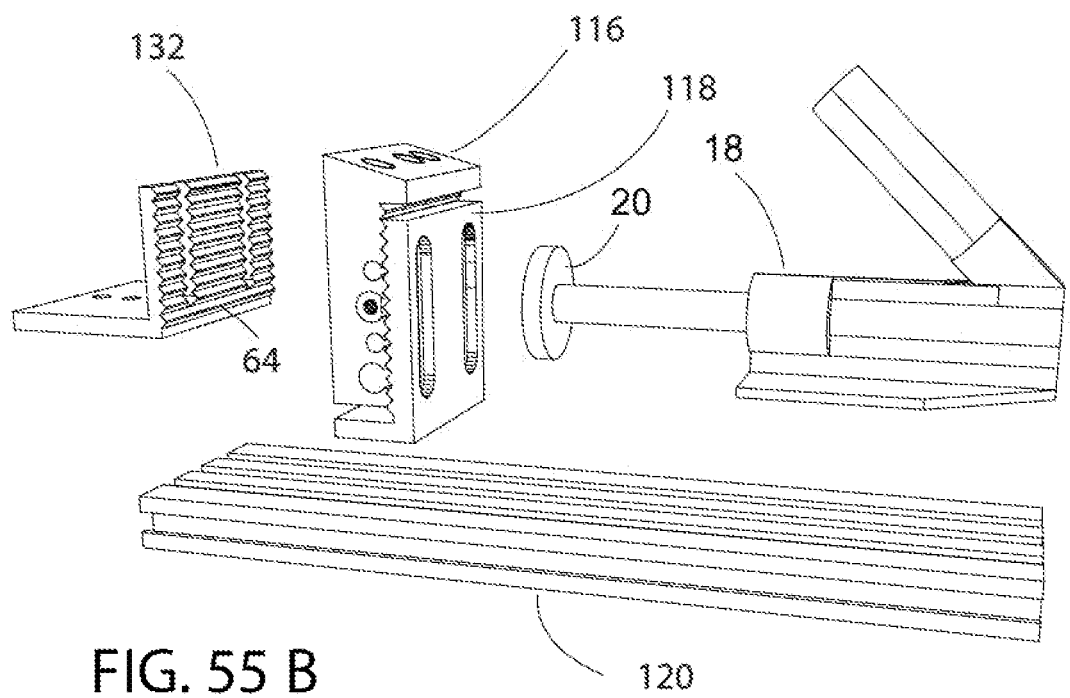

FIG. 55A shows a pocket hole drill guide and toggle clamp secured to an aluminum extrusion with a T-slot. The clamp pad presses the drill guide against the workpiece.

FIG. 55B is an exploded perspective view of FIG. 55A.

FIG. 56A shows a pocket hole drill guide and toggle clamp secured to a wide and thin aluminum extrusion with a T-slot. The clamp pad presses the drill guide against the workpiece.

FIG. 56B is a close up of the wide extrusion T-slot.

FIG. 56C is a perspective view that illustrates a toilet bolt head fits in the T-slot and screws into a flat bolt located in the pocket hole jig spacer.

FIG. 56D is an exploded perspective view of FIG. 56C.

FIG. 57A is a top perspective view of a modified pocket hole jig illustrating the shape of the U-shaped extrusion fitted into the drill guide cavity.

FIG. 57B is an enlargement of the U-shaped extrusion fitted into the drill guide cavity shown in FIG. 57A.

FIG. 57C shows a pocket hole drill guide and toggle clamp secured to a wide and thin aluminum extrusion with a T-slot. The clamp pad presses the drill guide against the workpiece.

FIG. 57D is an enlargement of FIG. 57C.

FIG. 58A is a top perspective view of a modified pocket hole jig illustrating the shape of the U-shaped extrusion fitted into the drill guide cavity. The drill guide is secured to the jig floor through an oblong hole with a toilet bolt.

FIG. 58B is an enlargement of FIG. 58A.

FIG. 58C is an enlargement of the toilet bolt showing an example direction of adjustment.

Figure 59:
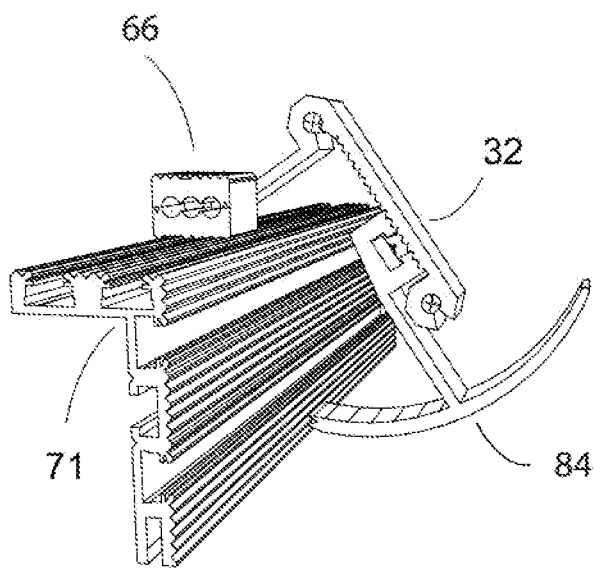
Figure 59:
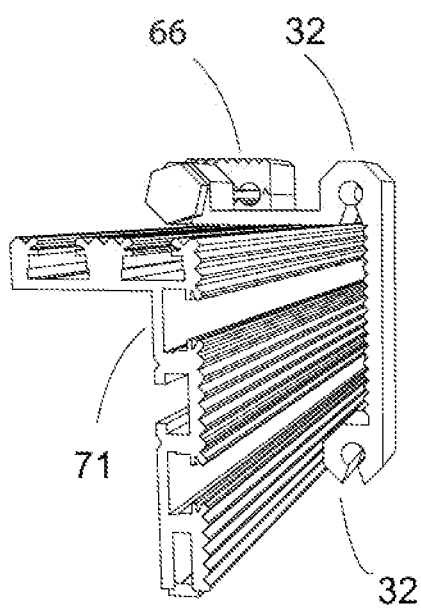
Figure 59:
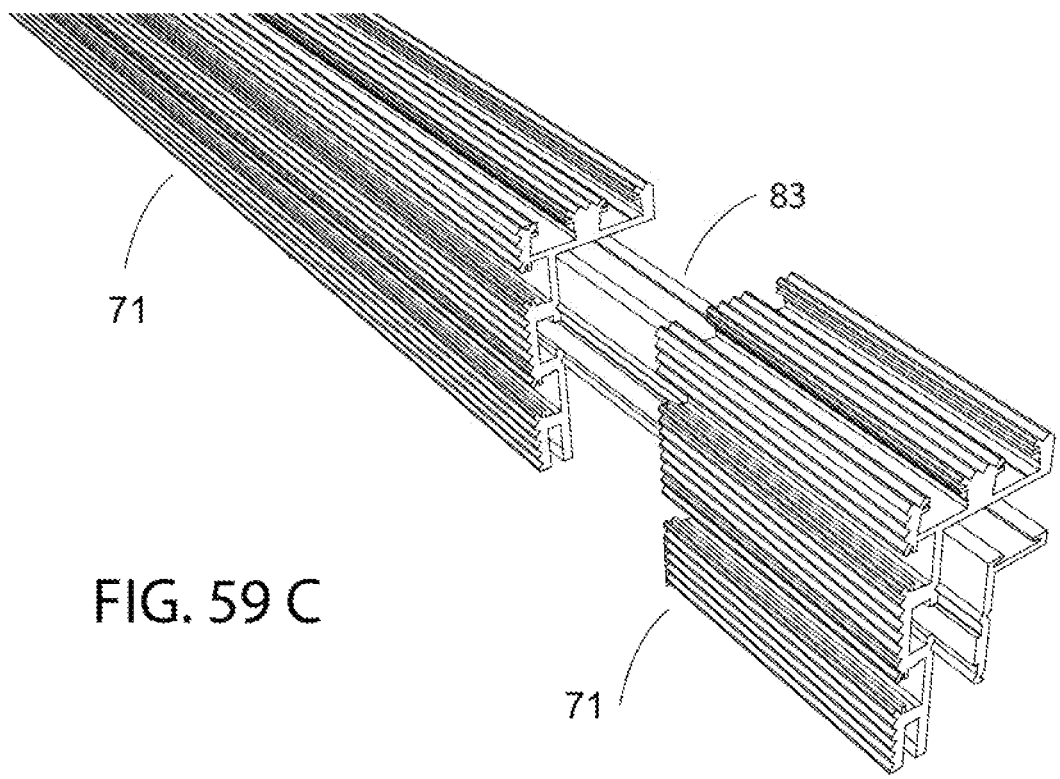

FIG. 59A is an L-shaped track and flip stop with the curve stop bottom accessory in place on the stop arm.

FIG. 59B is the L-shaped flip stop.

FIG. 59C is the L-shaped fine extrusions connected with the connector extrusion.

FIG. 60A is an end view of the L-shaped track and flip stop.

FIG. 60B is the L-shaped fence and the L-shaped extension arm.

FIG. 60C is an enlargement of FIG. 60B.

Figure 61:
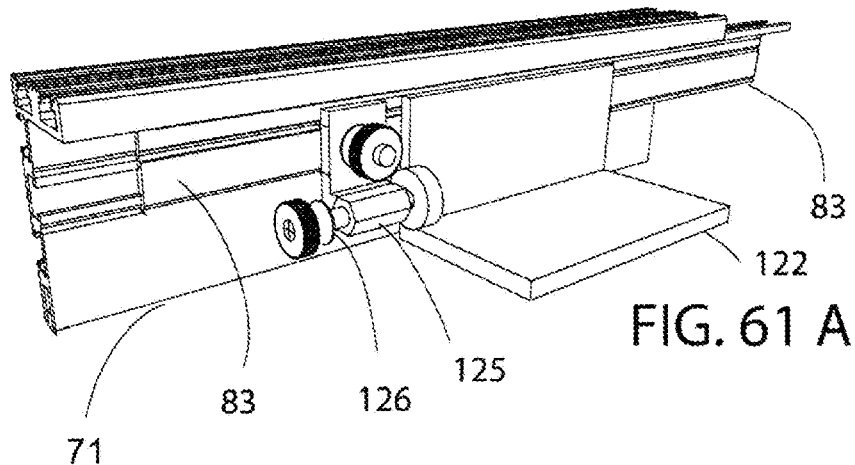
Figure 61:
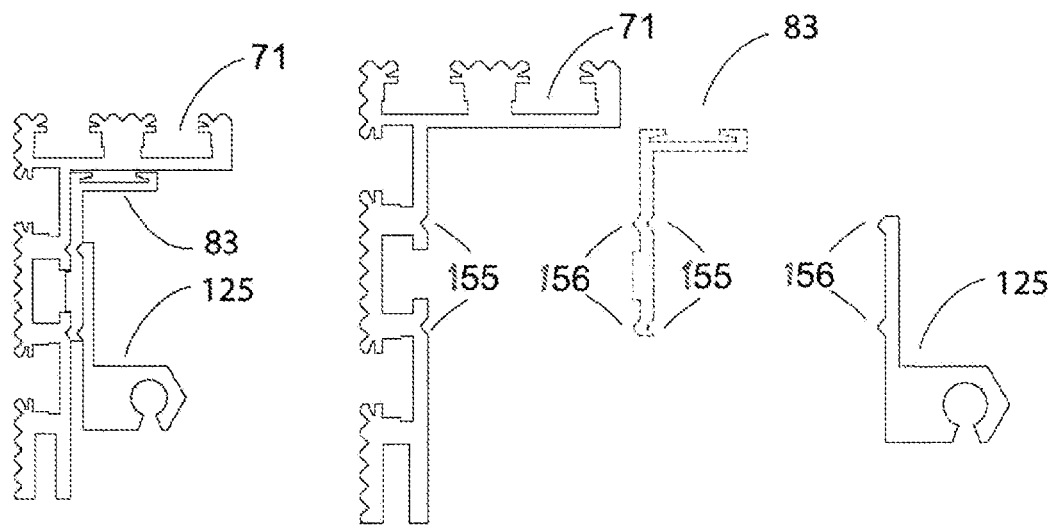
Figure 61:
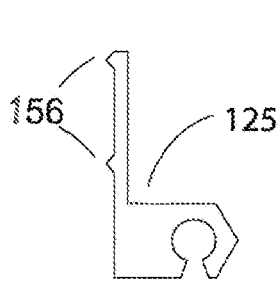
Figure 61:
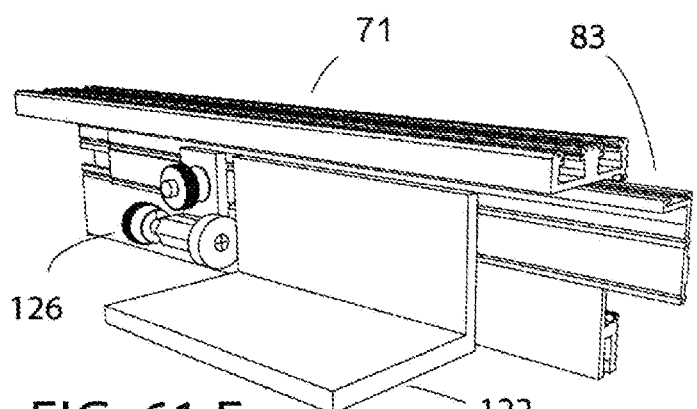

FIG. 61A is a back view of the L-shaped track with an attached micro adjuster.

FIG. 61B is an end view of the L-shaped track.

FIG. 61C is an end view of the L-shaped track and the micro adjuster extrusion.

FIG. 61D is an end view of the micro adjuster extrusion.

FIG. 61E is a perspective view of the micro adjuster in contact with an L-shaped miter gauge extrusion.

FIG. 62A is a perspective view of the miter gauge.

FIG. 62B is an enlargement of the miter gauge bar.

FIG. 62C is an enlargement of the miter gauge scale and magnifier.

Figure 63:
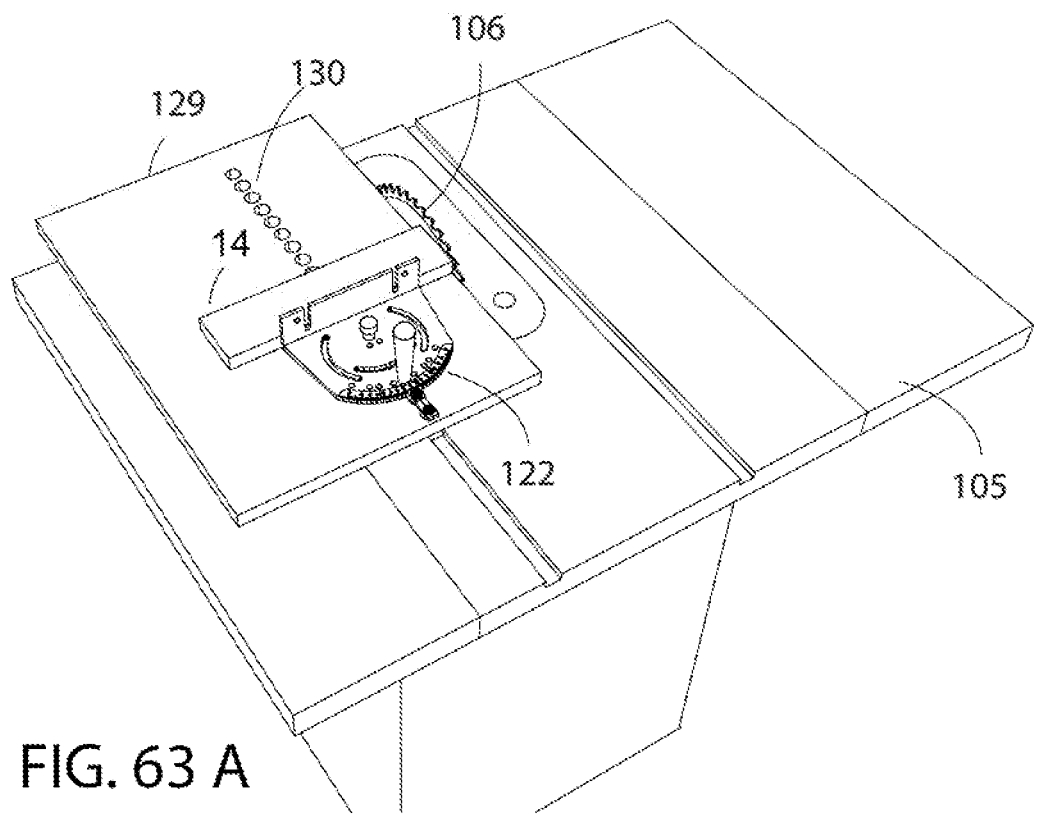
Figure 63:
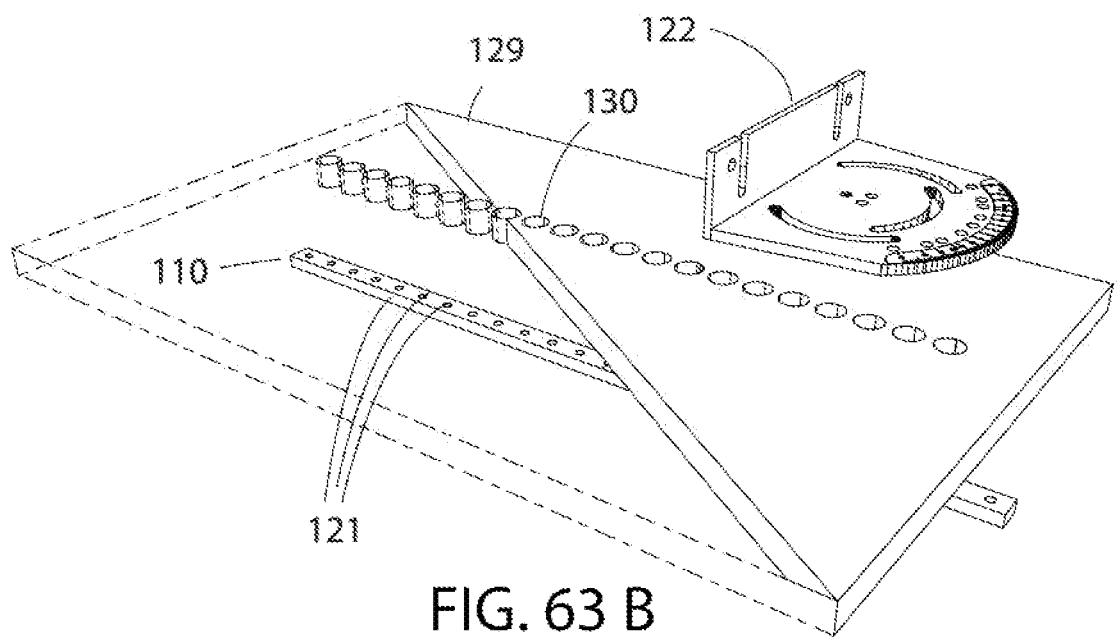

FIG. 63A is a perspective view of the miter gauge attached to a sled on the table saw.

FIG. 63B is an exploded, partial section view of the miter gauge head, bar, and sled sheet material.

Figure 64:
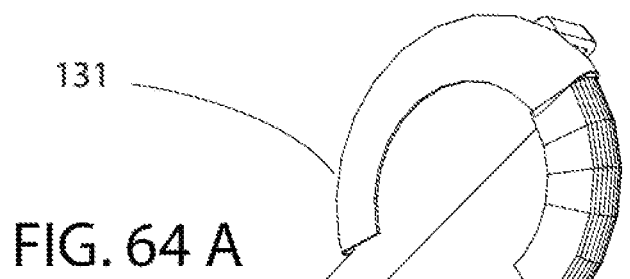
Figure 64:
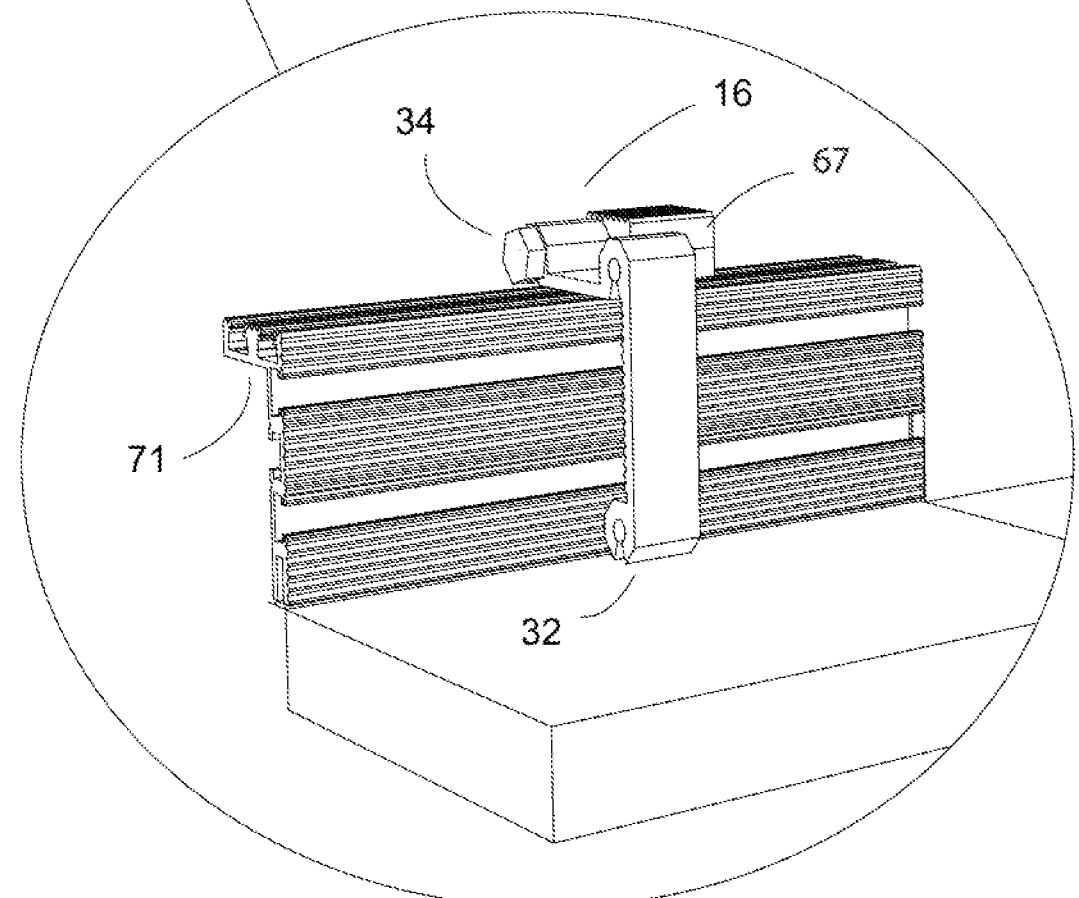

FIG. 64A is a perspective view of the saw, extrusion, and stop.

FIG. 64B is an enlargement of the flip stop and extrusion.

Figure 65:
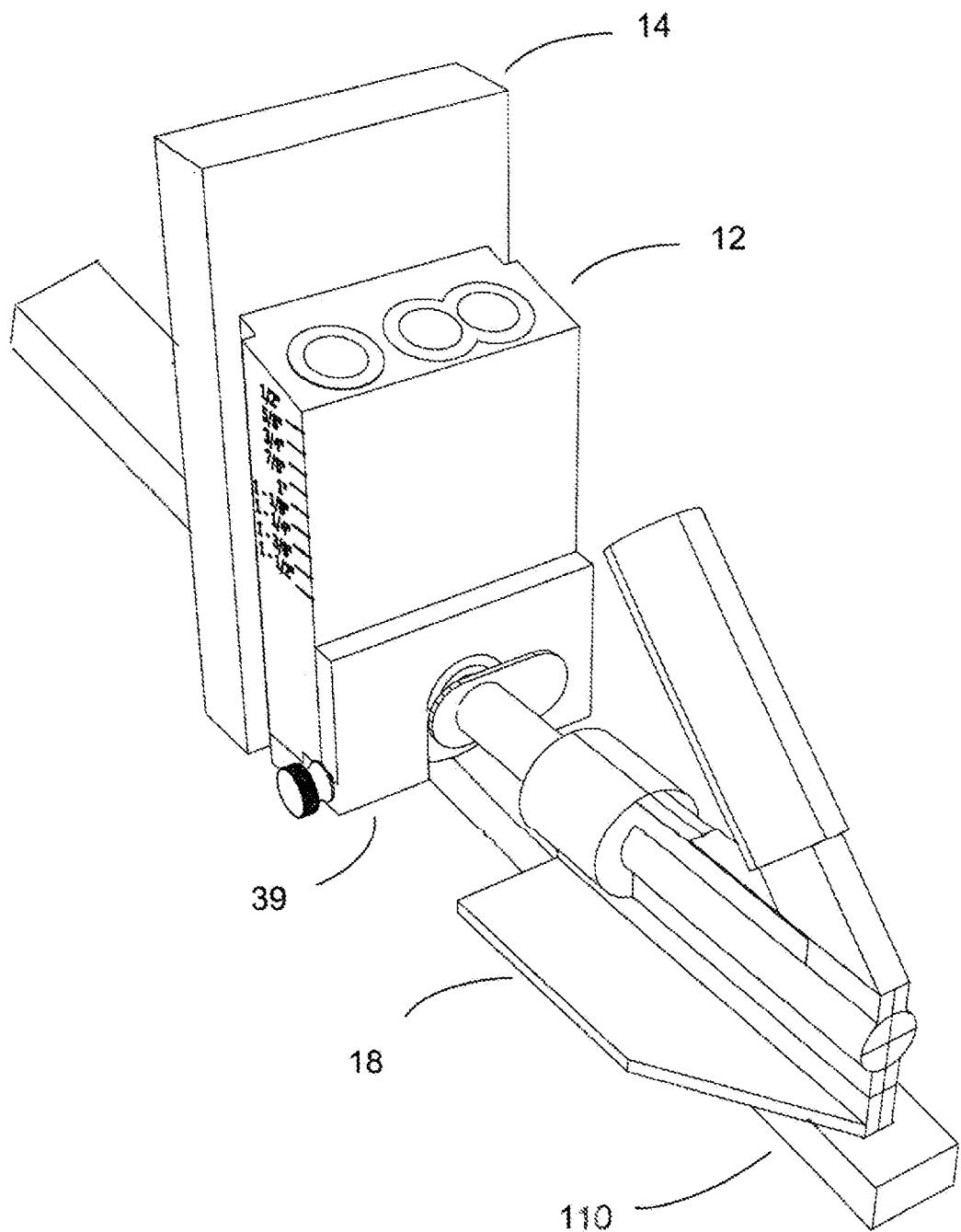

FIG. 65 is a perspective view of a drill guide, a toggle clamp, and an L-shaped adapter plate mounted on a miter gauge.

DETAILED DESCRIPTION OF THE PREFERRED EMBODIMENTS

Embodiments of the invention are illustrated in extensive detail in the accompanying FIGS. 1-65, as set forth above in the description of FIGS. 1-65, and as elaborated below in the detailed description. As shown in FIGS. 1-65, jigs and fixtures for aligning, guiding, and/or holding a workpiece on woodworking machinery during a woodworking operation are described, as well as methods of making, modifying, and using jigs and fixtures. For instance, a modular track and flip stop with a corrugated surface on the top and face of the track as well as a mating corrugated pattern on the bottom and top of the flip stop base are also described. Moreover, a flip stop base that may be created from two identical mating parts that allows the top and bottom to be separated so the bolt can be moved without the need to disassemble the bolt and flip arm assembly is further disclosed. In addition, a modular miter gauge head and bar system for easily making custom jigs, fixtures, and sleds are disclosed.

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the present inventions. In addition, while the various embodiments identify example or preferred hardware (e.g., bolts, thumb screws, etc.) capable of incorporation, given the benefit of this disclosure one skilled in the art will appreciate that a variety of alternatives are available to accomplish the relevant constructions, including both use of off-the-shelf hardware and/or custom specification components.

FIGS. 1 through 8 disclose a holding device, such as for use with the KREG pocket hole drill guide 12 of the KREG K4 pocket hole jig 10. While reference is made throughout to various available devices, for example the KREG K4, given the benefit of this disclosure one skilled in the art will appreciate that the concepts described herein can be adapted in a variety of manners that are within the scope of the inventive concepts. The L-shaped adapter plate 39 holds the pocket hole drill guide 12 at a 180 degree rotation from the usual orientation so that the operator can clamp the workpiece 14 and drill a pocket hole from the same side of the jig. This design avoids the problem of the operator having to reach around a large panel workpiece to be able to operate the clamp, while providing an efficient, interference free jig construction. Notably, the discontinued KREG K3 and the KREG K5 17 pocket hole jigs allowed same-side drilling and clamping but suffered from the above-noted deficiencies, and no device offers the same advantage for the most popular KREG K4 pocket hole jig 10.

Figure 1A:
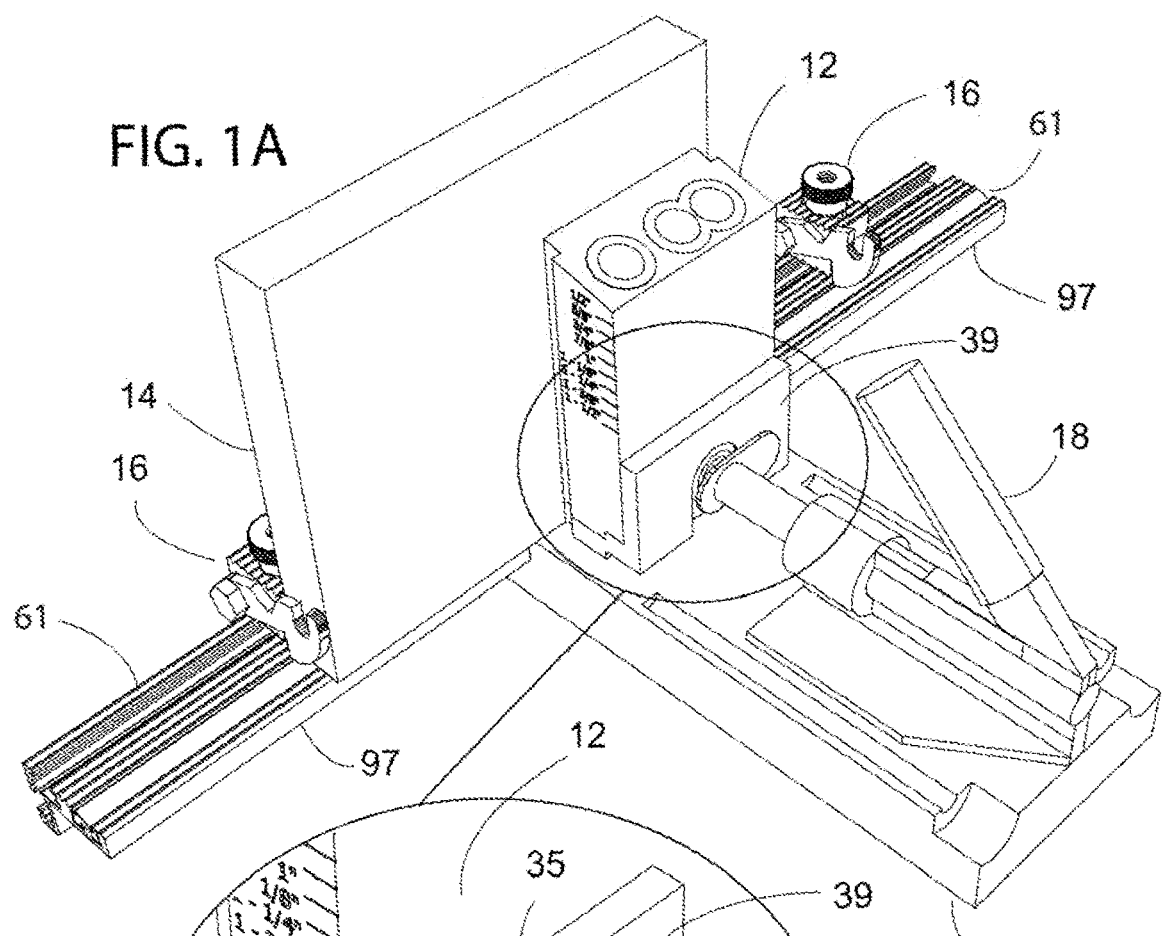
FIG. 1A is a perspective view of a modified pocket hole jig with a track and flip stop system as well as an L-shaped adapter plate which secures the drill guide to the pad of the toggle clamp.

FIG. 1A is a perspective view of a modified KREG K4 pocket hole jig 10 and an L-shaped adapter plate 39 which secures the drill guide to the pad of the toggle clamp 20. The illustration is shown with a panel workpiece 14 positioned for drilling the pocket hole. The drill guide 12 has been removed from the usual holding cavity 95 and has been rotated 180 degrees and is secured to the L-shaped adapter plate 39.

Figure 1B:
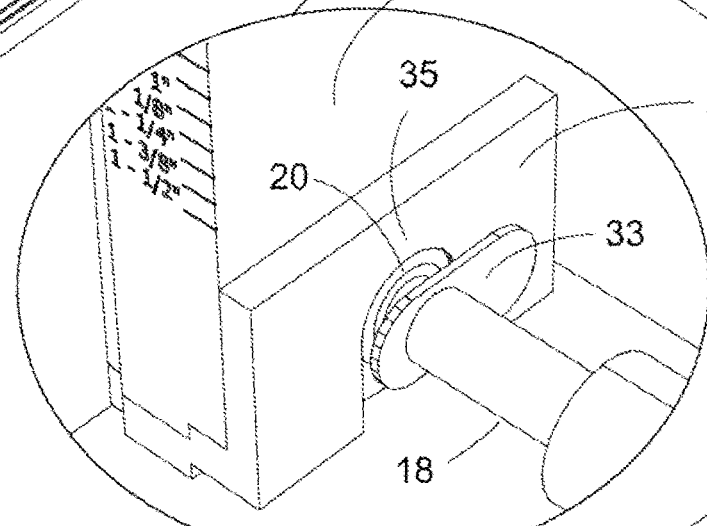
FIG. 1B is an enlarged view of the adapter plate shown in FIG. 1A.
Figure 1C:
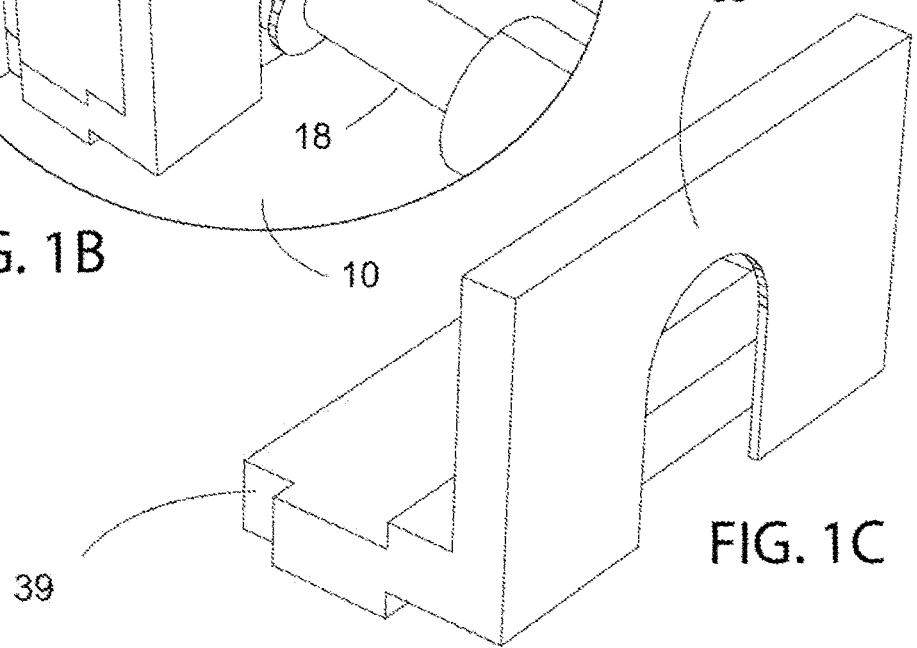
FIG. 1C is an enlarged view of the adapter plate shown in FIG. 1A with the clamp and drill guide removed.
Figure 3:
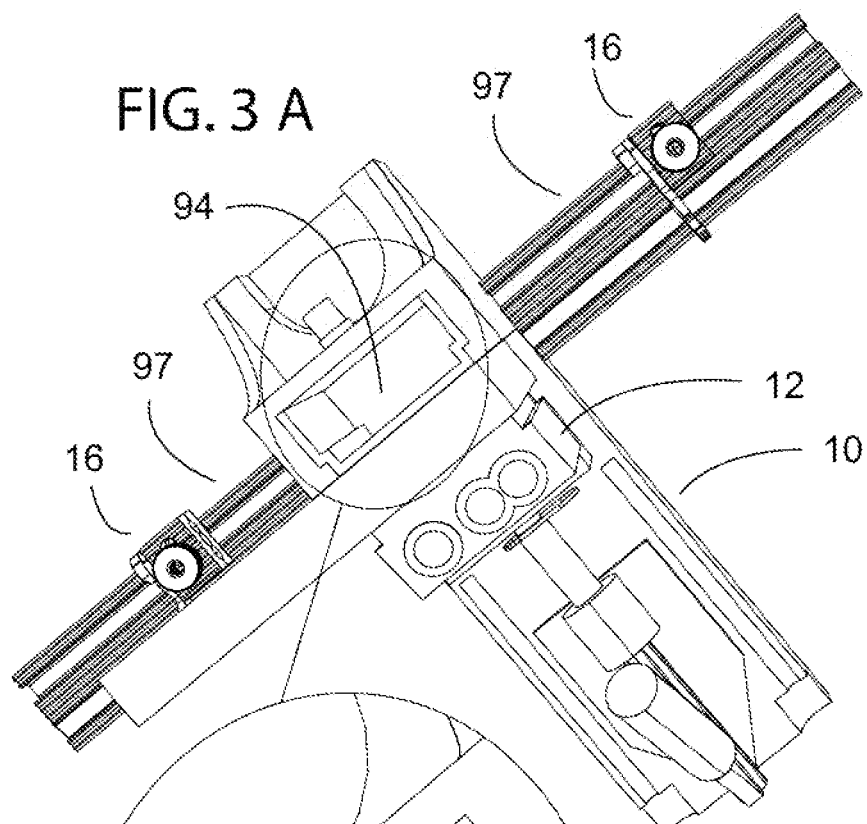
FIG. 3A is a top perspective view of a modified pocket hole jig with a track and flip stop system illustrating the shape of the U-shaped extrusion fitted into the drill guide cavity.
FIG. 3B is an enlargement of the U-shaped extrusion fitted into the drill guide cavity shown in FIG. 3A.
FIG. 3C is a top perspective view of the U-shaped extrusion.
Figure 3:
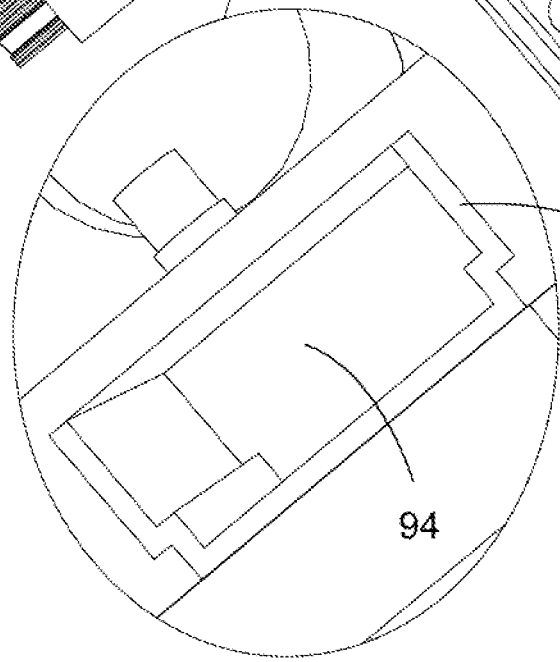
Figure 3:
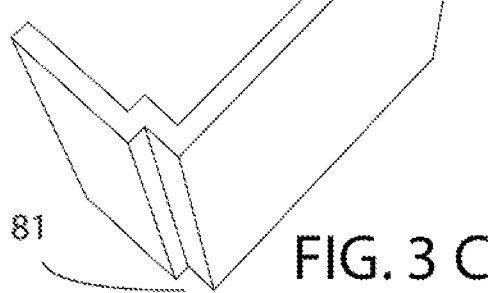
Figure 12:
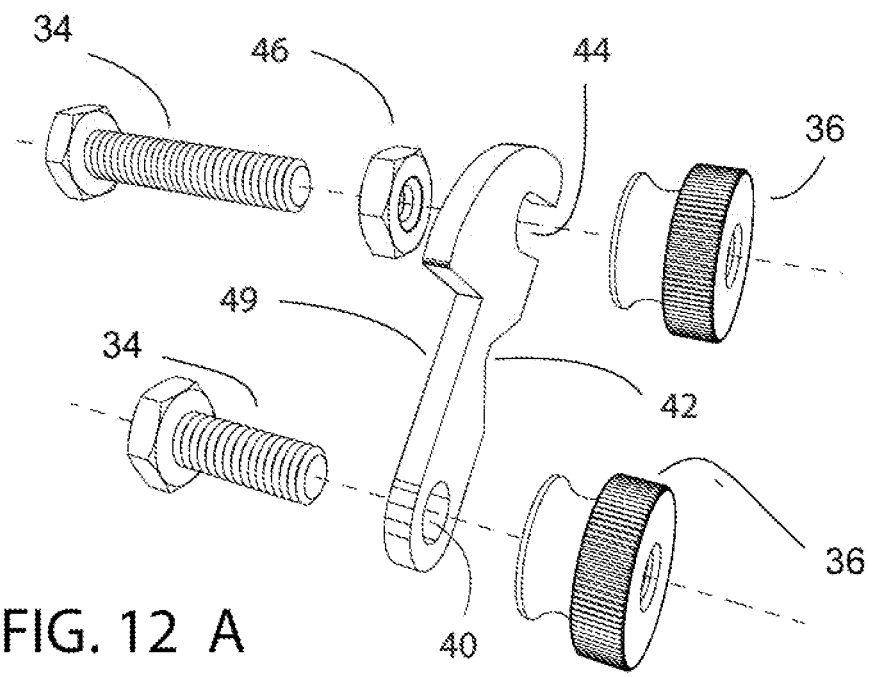
FIG. 12A is an exploded view of the flip stop arm.
FIG. 12B is a quarter inch grid showing the size of the flip stop arm.
FIG. 12C shows the rotation arc of the flip stop arm.
Figure 12:
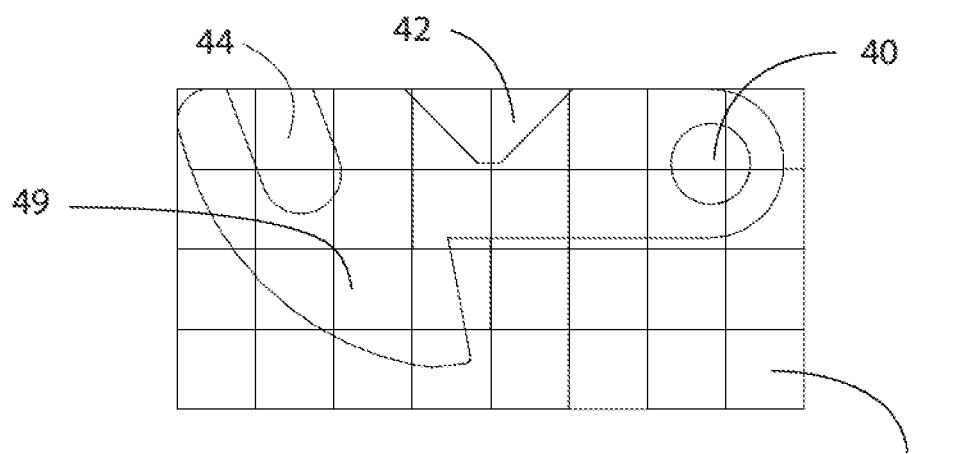
Figure 12:
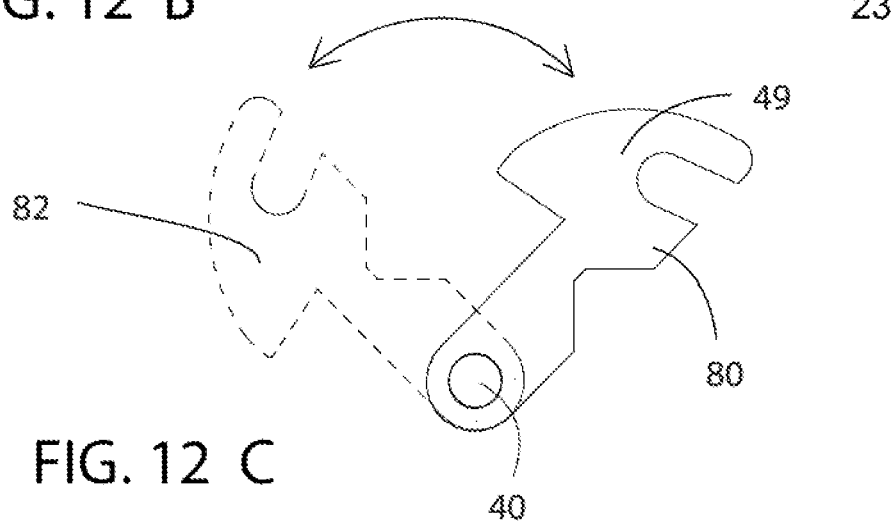
Figure 15:
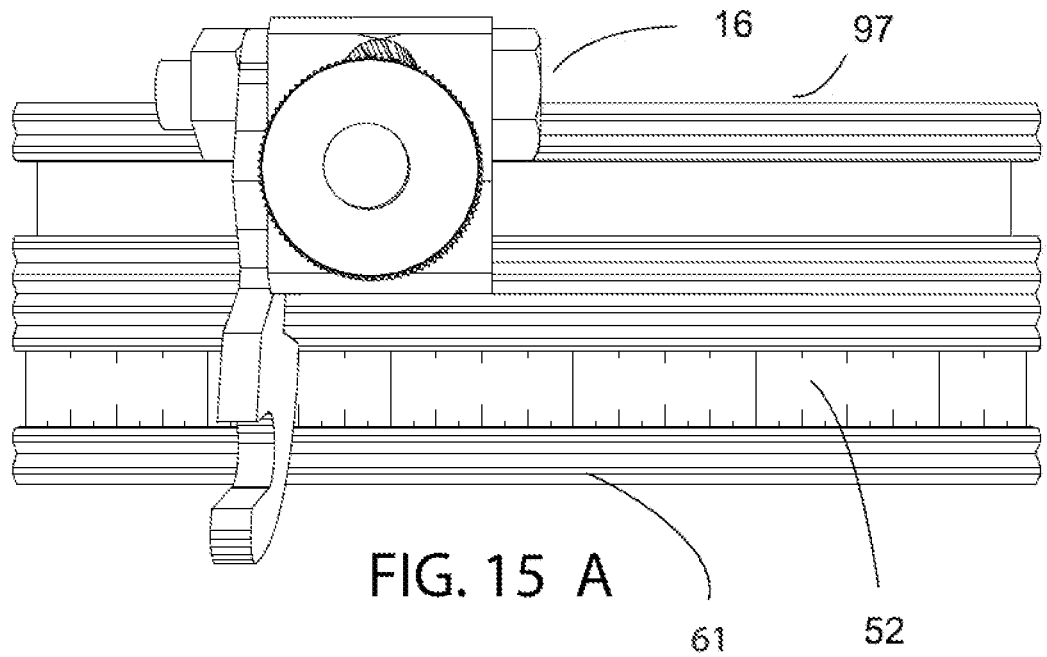
FIG. 15A is a top view of the flip stop arm and the track shown in FIG. 14A.
FIG. 15B is a top perspective view of the flip stop arm and the track shown in FIG. 15A.
Figure 15:
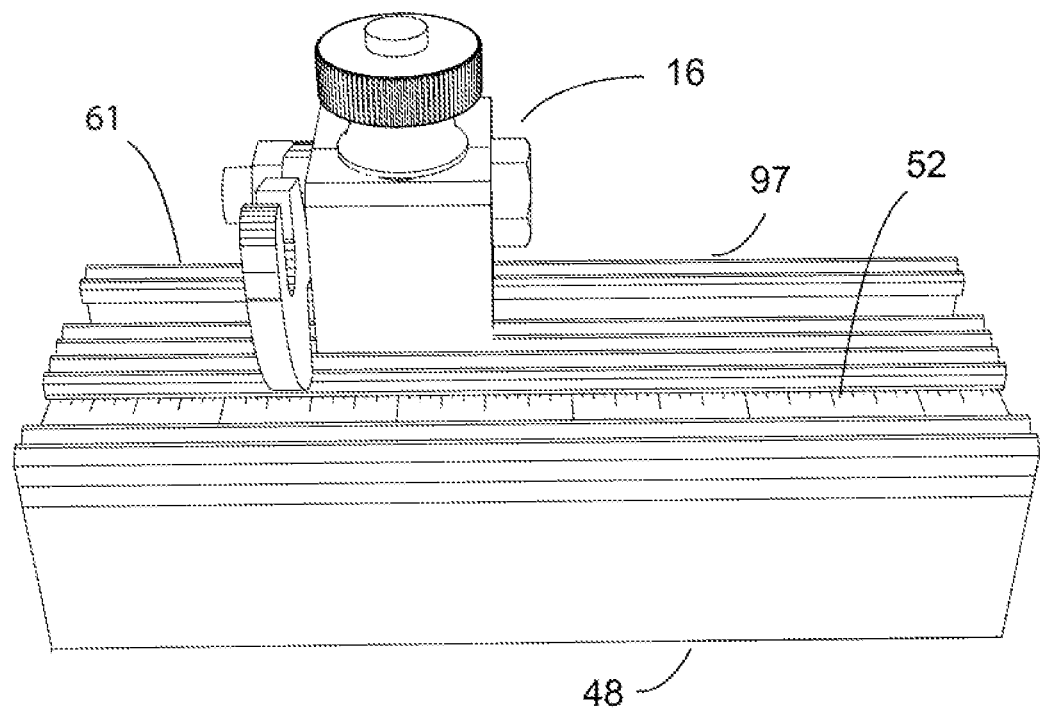
Figure 16:
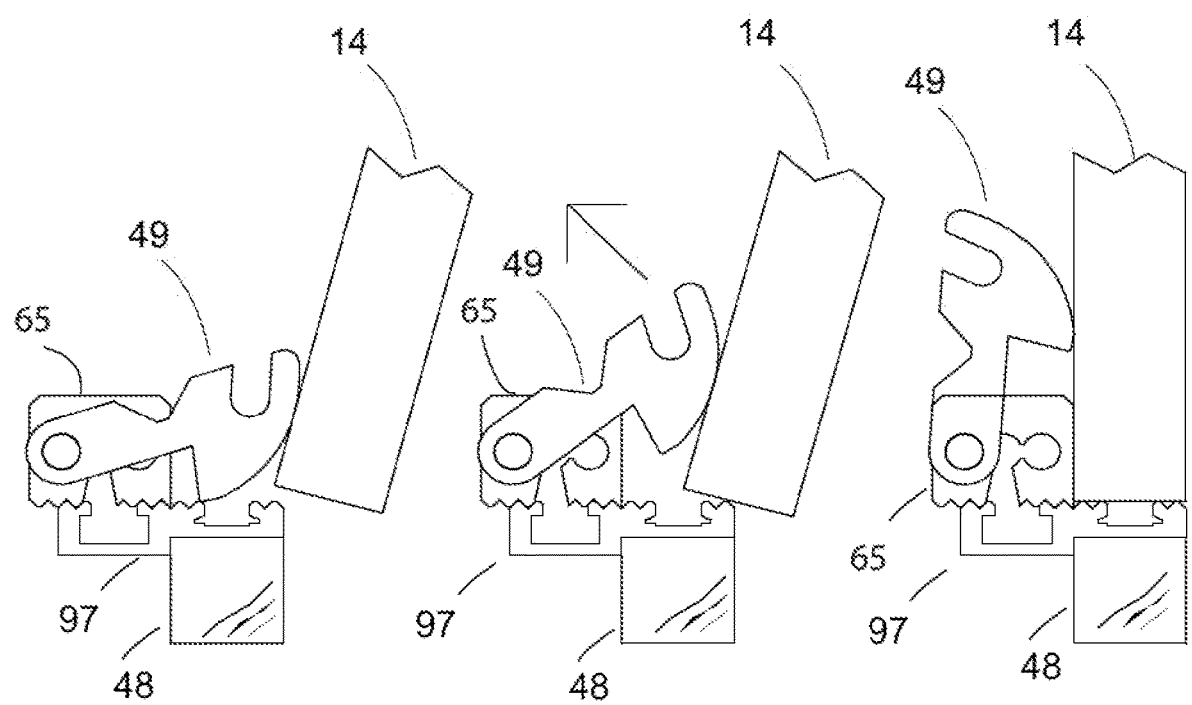
FIG. 16A is an illustration of the flip stop arm in contact with the workpiece as it is moved into the working position.
FIG. 16B shows the rotation arc of the flip stop arm.
Figure 16:
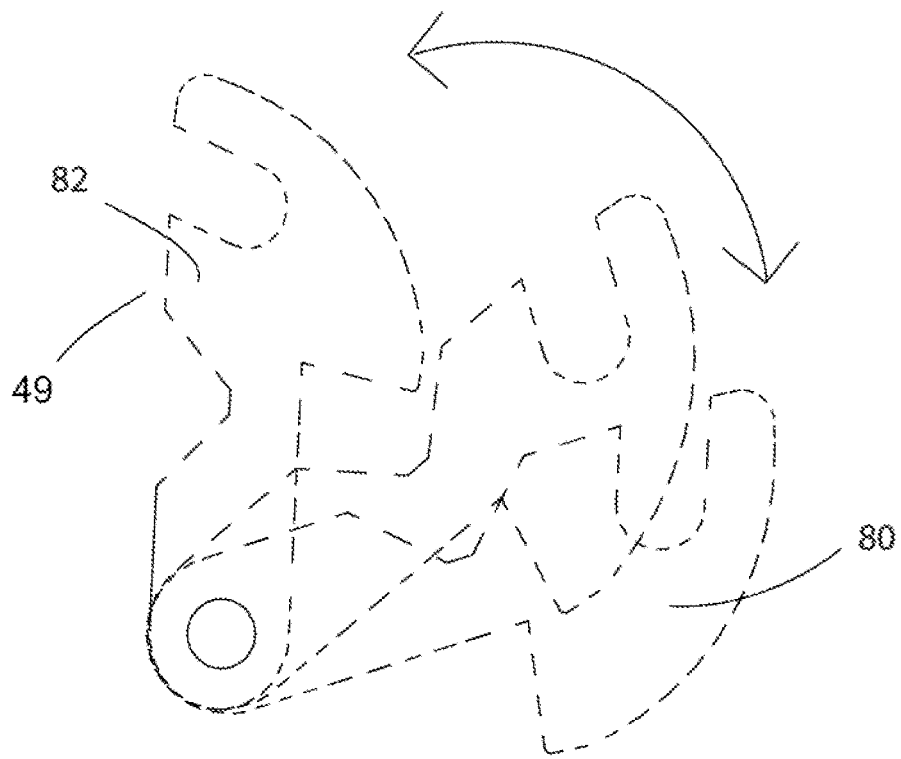
Figure 17:
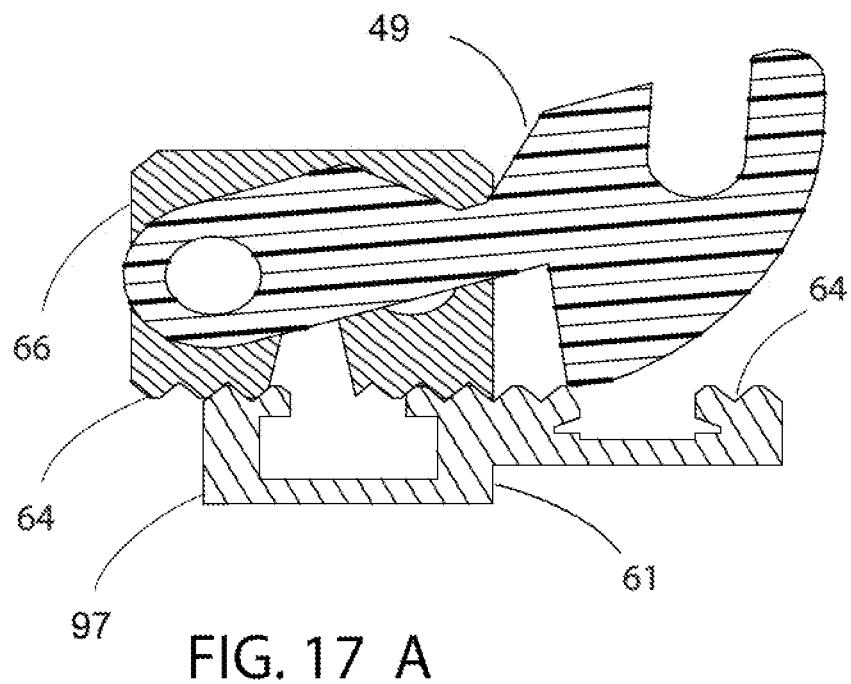
FIG. 17A is a sectional view of the flip stop arm and track.
FIG. 17B is an exploded sectional view of the flip stop arm and track.
Figure 17:
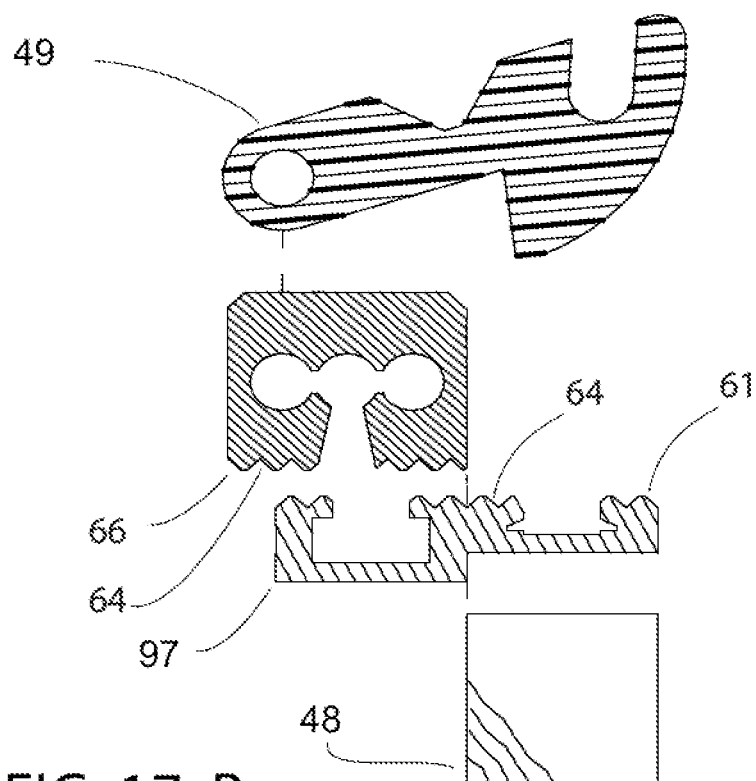

The clamp 18 presses the drill guide 12, which is secured in the L-shaped adapter plate 39 against the workpiece 14 for the purpose of drilling an angled pocket hole. This allows the operator of the KREG K4 10 jig to both clamp and drill the workpiece 14 from the same side rather than having to reach around a panel to engage the clamp 18. FIGS. 1 through 8 illustrate the process of using the rotated drill guide 12 and the L-shaped adapter plate 39. The KREG K4 10 is illustrated with a track 97 and flip stop system 16. The mating surfaces of the T-slot track 97 and the flip stop assembly base 16 have a matching corrugated 64 design for a secured fit. FIG. 1B is an enlarged view of the adapter plate 39 shown with the semicircular cavity or opening 35 which houses the pad of the example clamp 18. The clamp 18 can be a variety of clamping members that provide some form of axial force to urge the adapter plate 39 toward the workpiece, such as a hydraulic ram, screw jack, and the like. FIG. 1C is an enlarged view of the adapter plate 39 shown alone. It illustrates the semicircular cavity 35 which encircles the clamp pad 20. The adapter plate 39 is configured to establish a selective axial coupling with a clamping member, such as the clamp 18. The cavity 35 of the adapter plate 39 allows the adapter plate 39 to be moved transversely to the clamping axis to achieve coupling and uncoupling of the clamp 18 and the adapter plate 39.

FIG. 2A is an exploded view of the KREG K4 pocket hole jig 10 illustrated without the drill guide 12. The dotted line illustrates that the middle of the clamp pad 20 lines up with the middle of the semicircular opening 35 which houses the pad 20 of the clamp 18. The opening of the drill guide cavity 94 is filled by a spacer 45 extrusion made, for example, from plastic or aluminum. Alternatively, for example, the spacer 45 can also be made from two matching halves thus the extrusion would be half the size of the one illustrated. When the spacer 45 is seated into the drill guide cavity 94 a generally continuous surface is established against which a workpiece 14 can rest, which also provides a convenient and economical approach to adapting the KREG K4 pocket hole jig to accommodate features of the inventive concepts.

FIG. 3A is a top perspective view of a modified KREG 4K pocket hole jig 10 with a track 97 and flip stop assembly 16 illustrating the shape of the modified U-shaped extruded spacer 45 fitted into the drill guide cavity 94. FIG. 3C is a top perspective view of the modified U-shaped extrusion 45 featuring a small indentation in the two corners 81 that inter-fit with the form factor of the example pocket hole jig 10. The extrusion 45 can be adapted to accommodate any relevant form factor established by the mating assembly.

FIG. 4A is an exploded perspective view of the KREG K4 pocket hole jig 10 shown from the side of the jig 10 opposite the clamp 18. The drill guide 12 is removed. The dotted line 75 illustrates that the middle of the clamp pad 20 lines up with the middle of the semicircular opening 35 which houses the pad 20 of the clamp 18. FIG. 4C is a perspective view of the L-shaped adapter plate 39 which secures the drill guide 12 to the pad 20 of the toggle clamp 18. This view shows the rounded opening 35 that accepts the top of the round clamp pad 20. In one example, the configuration also includes a flat lock nut 33 for securing the position of the clamp pad 20, such as by being axially offset from the axis of the clamp 18 while helping to sandwich the back portion of the adapter plate 39 between the lock nut 33 and the pad 20. In one example, the lock nut 33 is threaded onto a threaded shaft of the clamp 18; alternatively, the clamp 18 can be modified or customized with a welded or otherwise affixed tab, plate, spacer and the like that achieves the desired stability and positioning.

FIG. 5A is a perspective view of the L-shaped adapter plate 39 which secures the drill guide 12 to the pad 20 of the toggle clamp 18. This view shows the rounded opening 35 that accepts the top of the round clamp pad 20 with a dashed line. FIGS. 5C and 5D are a perspective view of the L-shaped adapter plate 39 which secures the drill guide 12 to the pad 20 of the toggle clamp 18. This view shows the rounded opening 35, which is illustrated with dashed lines from the clamp side. The adapter plate 39 generally defines a base portion and a back portion configured to engage the drill guide 12, with the opening 35 formed in the back portion. The opening 35 in the back portion extends into a cavity (e.g., slot, recess, tabs, channel, etc.) that is generally sized and contoured to receive and axially capture the pad 20 of the clamp 18. The form factor of the cavity can be varied to generally accommodate a cooperating engagement with the form factor of the mating feature of the clamp member.

FIG. 6A is a perspective view shown from the bottom of the jig 10 showing the L-shaped adapter plate 39 which secures the drill guide 39 to the pad 20 of the toggle clamp 18. This view shows the rounded opening that accepts the top of the round clamp pad 20.

FIG. 7A is a perspective view of a modified KREG K4 pocket hole jig 10 with an L-shaped adapter plate 39 which secures the drill guide 12 to the pad 20 of the toggle clamp 18. A threaded thumb screw 47 secures the L-shaped adapter plate 39 to the round clamp pad 20 and keeps it from lifting or rotating when installed with the pocket hole jig 10.

FIG. 8A is a perspective top view of the L-shaped adapter plate 39 which secures the drill guide 12 to the pad of the toggle clamp 20. FIG. 8B shows the two dovetails 59 on the top of the L-shaped adapter plate 39 which fit into the bottom dovetail openings 58 in the bottom of the pocket hole drill guide 12. FIG. 8D is an enlargement of FIG. 8C illustrating the bottom of the drill guide 12. The base portion and/or back portion of the adapter plate 39 can be configured to selectively engage and couple with mating features defined by the drill guide 12.

FIGS. 9 through 17 describe a T-slot based track and stop system featuring a corrugated surface 64 on the mating surface of the track extrusion 61 and the bottom of the stop base 66 and the two-part base 67. The usual practice is to have a bottom of a stop base fit into a T-slot opening of a track. However, the fit is often not accurate causing the flip stop to wiggle on the track, thus decreasing measuring accuracy. As an aluminum extrusion die wears, the sharpness of the extrusion decreases, increasing the likelihood of a loose fit. The locking corrugated surfaces 64 of the corrugated extrusion track 61 and the corrugated stop bases 66 and 67 lock securely with minimal clamping pressure.

FIG. 9A is a perspective view of the example KREG K4 pocket hole jig 10 with a track 97 and a flip stop assembly 16 mounted on the side of the KREG K4 pocket hole jig 10. FIG. 9B is an enlargement of FIG. 9A showing a flip stop arm 49 located in the non-functioning position 82. FIG. 9C is an enlargement of FIG. 9A showing a flip stop arm 49 rotated from the non-functioning position 82 and located in the functioning position 80 with the adjustable bolt 34 in contact with the workpiece 14.

FIGS. 10B and 10C are an enlargement of FIG. 10A showing the flip stop arm 49 positioned with the adjustable bolt 34 against the workpiece 14 so that it is positioned with the center mark on the workpiece board 85 located on the center line mark 28 of the decal 24. The placement of the distal end of the adjustable bolt 34 can be adjusted (e.g., via selective rotation of the adjustable bolt 34, nut 46, and thumb nut 36) to provide for repeated alignment of a workpiece 14 that is positioned to abut the head end face of the adjustable bolt 34.

FIG. 11A is a perspective view of a KREG K4 pocket hole jig 10 with a track 97 and flip stop arm 49 secured to the side of the KREG K4 pocket hole jig 10. FIG. 11B is an enlargement of FIG. 11A showing a short piece of track 97 and the V-shaped opening 42 in the flip stop arm 49. It illustrates how the corner of the track 97 fits into the V-shaped opening 42 in the flip stop arm 49 when the flip stop arm 49 is in a functioning position 80. FIG. 11C is an end partial section view of the flip stop arm 49, the track 97, and the support board 48 which defines the working height of the track 97. The top of the T-slot extrusion track 97 can be substantially parallel and coplanar with the floor (i.e., generally the surface that supports the workpiece 14) of the KREG K4 pocket hole jig 10. FIG. 11C is a sectional end view of the stop arm 49, and it illustrates how the corner of the track 97 fits into the V-shaped opening 42 in the flip stop arm 49.

FIG. 12A is an exploded view of the flip stop arm 49, the adjustable and securing bolts 34, the nut 46, and the tightening thumb nuts 36. The securing bolt 34 fits through the hole 40 in the bottom of the flip arm 49. The adjustable bolt 34 fits into the notch 44 at the opposite side of the flip stop arm 49. FIG. 12B is a quarter inch grid 23 showing the size of the flip stop arm 49, hole 40, V-notch 42, and slot 44 in one example design construction. FIG. 12C illustrates the rotational arc of the flip stop arm 49. The engaged active functioning position 80 is illustrated with a solid line. The standby non-functioning position 82 is illustrated with a dashed line.

FIG. 13A is a perspective view of another example KREG K4 pocket hole jig 10 with a track 97 and flip stop assembly 16 mounted on the side of the jig 10. The support board 48 positions the top of the track 97 to be aligned with the floor of the KREG K4 pocket hole jig 10. FIG. 13B is an exploded view of the measuring system shown in FIG. 13A illustrating the flip stop arm 49, corrugated flip stop base 65, the track 97 with a corrugated surface 61, a ruler 52, and the support board 48. The hardware for the measuring system can comprise standard bolts 34, nut 46, and a thumb nut 36 hardware, or can be of specialized construction or design to accommodate application specific requirements (e.g., unique thread engagement or adjustability, theft securing features, etc.). In use, the head of the securing bolt 34 is captured in the track 97 and extends through the stop base 66, such as through a vertical slot that allows for additional adjustability of the relative positioning between the stop base 66 and the track 97. The thumb nut 36 is threaded to the securing bolt 34 to clamp the mating corrugated surfaces 64 of the corrugated extrusion track 61 and the corrugated stop base 66. A separate bolt 34 can be used to secure the rotatable flip stop arm 49 to the stop base 66. For instance, the bolt 34 can extend through an opening in the flip stop arm 49 and extend through one of several transverse passages formed laterally through the stop base 66, and be engaged by a nut 46 that helps capture the flip stop arm 49 to the stop base 66.

FIG. 14B is a perspective view of the flip stop assembly 16 and the track 97 shown in FIG. 14A. It illustrates the track 97 and stop base 66 corrugations 64. FIG. 14C is an end view of the flip stop assembly 16 and the track 97 that further illustrates the track 61 and stop base 66 corrugations 64. FIGS. 15A and 15B illustrate top and front perspective views of the flip stop assembly 16 positioned along a width of the track 97.

FIG. 16A is an illustration of the stop arm 49 in contact with the workpiece 14 as it is moved into the working position. As the workpiece 14 is moved into position against the flip stop base 65 the flip stop arm 49 is elevated out of the way. FIG. 16B shows the rotational arc of the flip stop arm 49 moving from the active, functioning position 80 to the stand-by, non-functioning position 82.

FIG. 17A is a sectional end view of the flip stop arm 49 and the track 97. The corrugations 64 on the bottom of the corrugated flip stop base 66 contact the corrugations 64 on the top of the track 97 to mate and slideably interlock the pieces together with no rotation of the parts. When the stop base 66 and track 97 are urged together, the corrugations 64 inhibit left-right movement as viewed in the orientation of FIG. 17A, as well as sliding movement along the track 97 as depicted as in-out of the page. FIG. 17B is an exploded sectional view of FIG. 17A.

Figure 18:
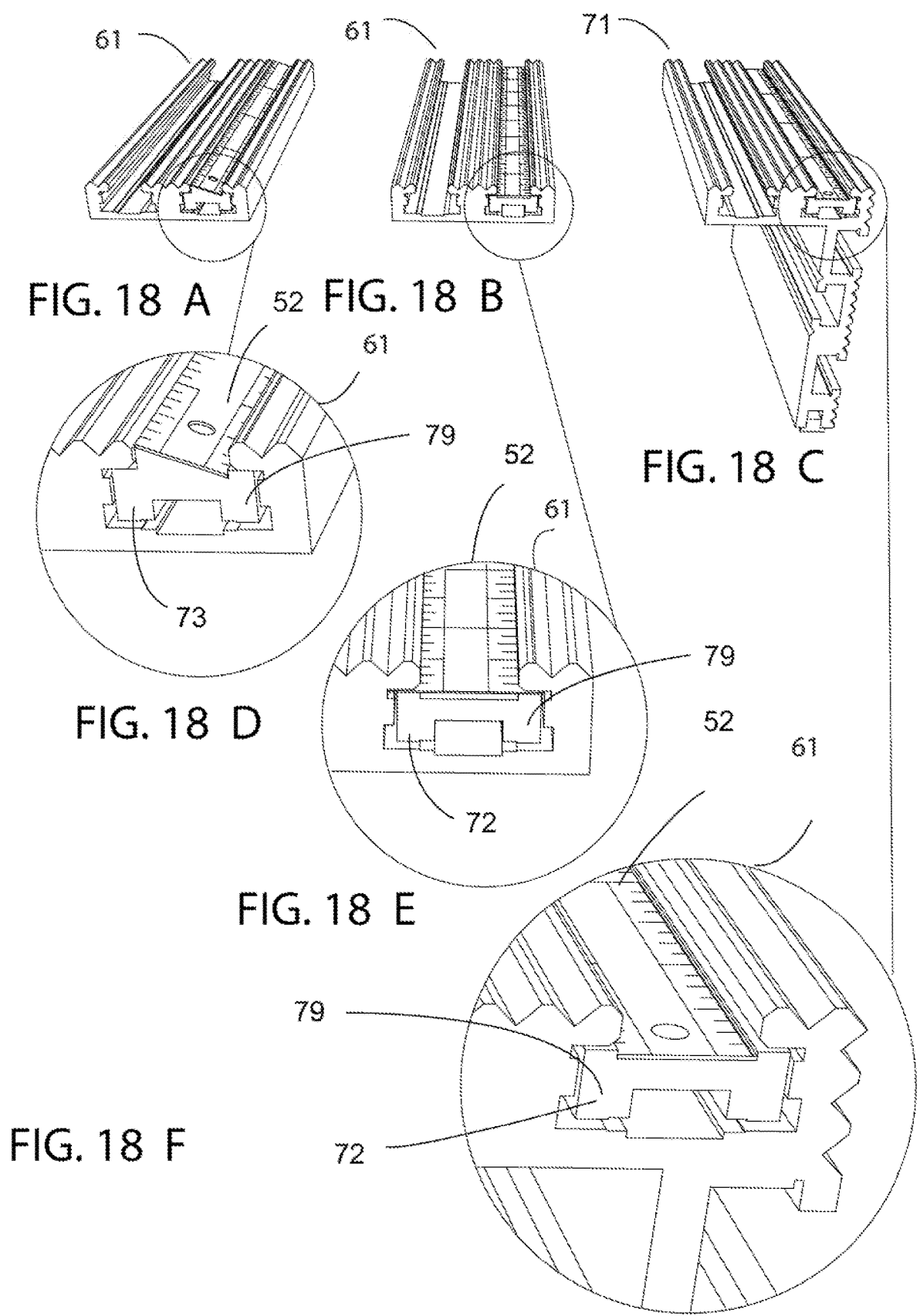
FIG. 18A is a double track with an angled inside track ruler extrusion.
FIG. 18B is a double track with a rectangular inside track ruler extrusion. The ruler is located between the extrusion and the T-slot opening.
FIG. 18C is a double track with a rectangular inside track ruler extrusion. The ruler is located inside a groove in the inside extrusion.
FIG. 18D is a double track with an angled inside track ruler extrusion.
FIG. 18E is a double track with a rectangular inside track ruler extrusion. The ruler is located between the extrusion and the T-slot opening.
FIG. 18F is a double track with a rectangular inside track ruler extrusion. The ruler is located inside a groove in the inside extrusion.

FIGS. 18 and 19 are designs for a movable and lockable ruler 52 designed to fit inside a T-slot track extrusion 97 and the T-slot opening 79. When using a T-slot track 97 to make and use jigs and fixtures, it is preferable to have a mechanism for adjusting and securing a ruler 52 to aid in the accurate location of jigs, fixtures, stationary stops, or flip stop assemblies 16.

FIG. 18A is a double T-slot track 97 extrusion. It has a corrugated surface 61 with an angled inside track ruler extrusion 73. FIG. 18D is an enlargement of the illustration of an angled inside track ruler extrusion 73 shown in FIG. 18A. The angled inside track ruler extrusion 73 is sized to slide into a T-slot opening 79 of a corrugated extrusion 61 or a standard T-slot extrusion 97. The example stick-on (e.g., adhesive backed placard) ruler 52 fits on the angled surface of the inside extrusion 73. FIG. 18B is an illustration of a double T-slot track extrusion 97 with a rectangular inside track ruler extrusion 72. FIG. 18E is an enlargement of illustration FIG. 18B. The ruler 52 is located between the extrusion 72 and the T-slot opening 79. FIGS. 18C and 18F illustrate an example double track with a rectangular inside track ruler extrusion 72 with a ruler 52 located inside a T-slot opening 79.

FIG. 19A is a single corrugated track extrusion 61, and a rectangular inside track ruler extrusion 72. The ruler 52 is located between the extrusion 61 and the T-slot opening 79. FIG. 19B is a single corrugated track extrusion 61 and an angled inside track ruler extrusion 73. FIG. 19C is an enlargement of FIG. 19A. FIG. 19D is a perspective view of FIG. 19A. FIG. 19E is a perspective view of the rulers 52 shown in various positions in relationship to the inside rectangular extrusion 72 and inside angled extrusion 73.

Figure 21:
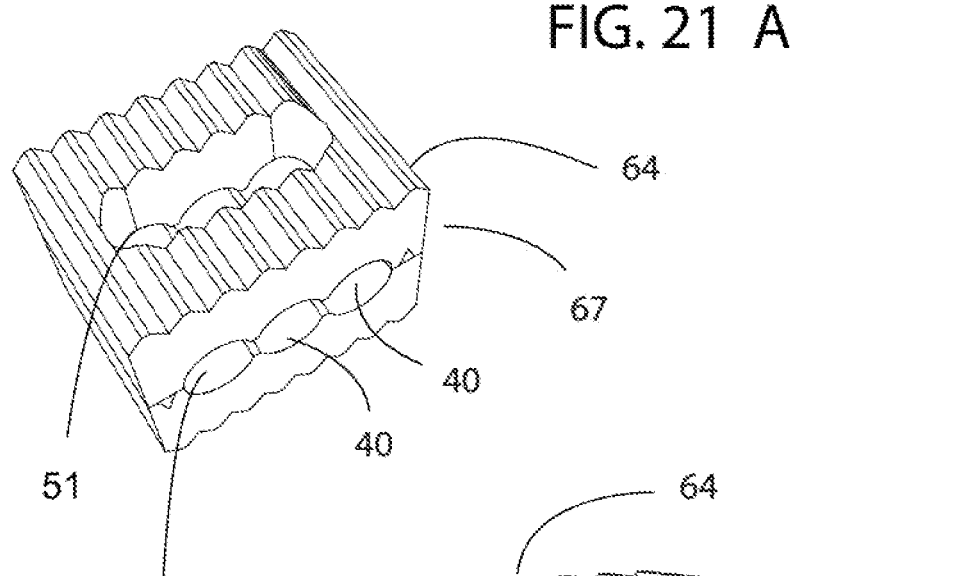
FIG. 21A is a perspective view of the two part stop block made from two identical parts which fit together.
FIG. 21B is an exploded view of FIG. 20A illustrating the two part stop block made from two identical parts which fit together.
FIG. 21C is a side view of the block half.
Figure 21:
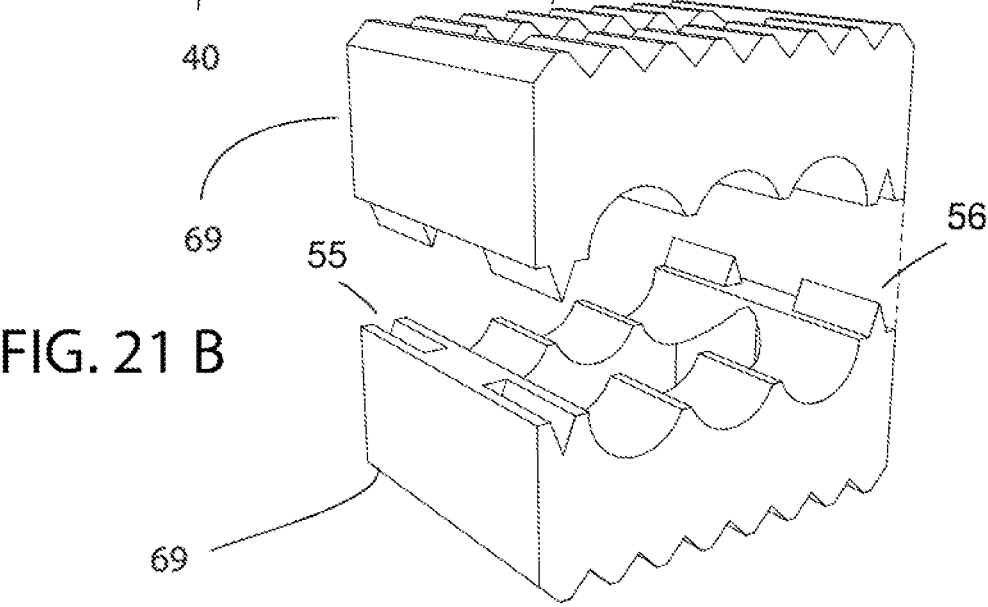
Figure 21:
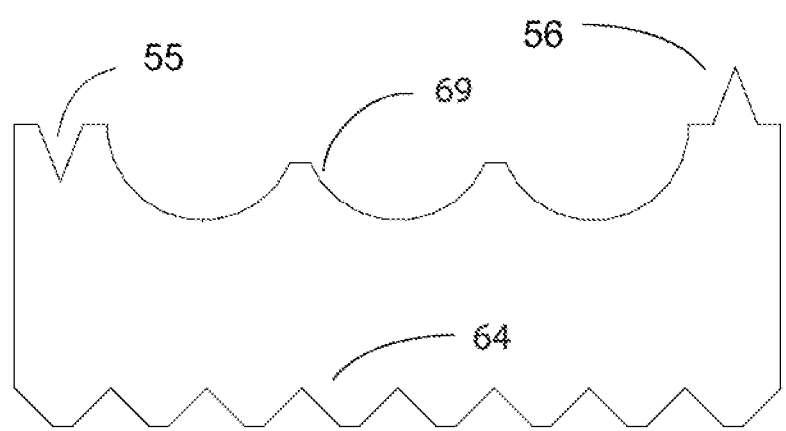
Figure 22:
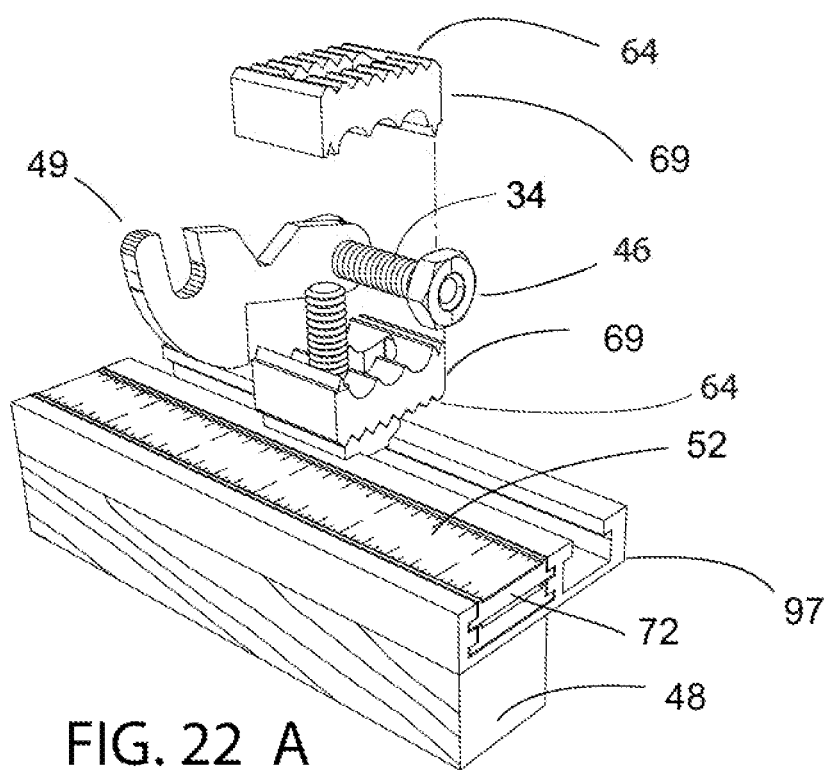
FIG. 22A is an exploded view of the flip stop illustrating the two part stop block made, in one example, from two identical parts which fit together.
FIG. 22B is an exploded perspective view of the two part stop block made from two identical parts which fit together. The flip stop arm and bolt can be changed and rotated in a variety of positions without loosening the bolt on the track or the flip stop arm.
Figure 22:
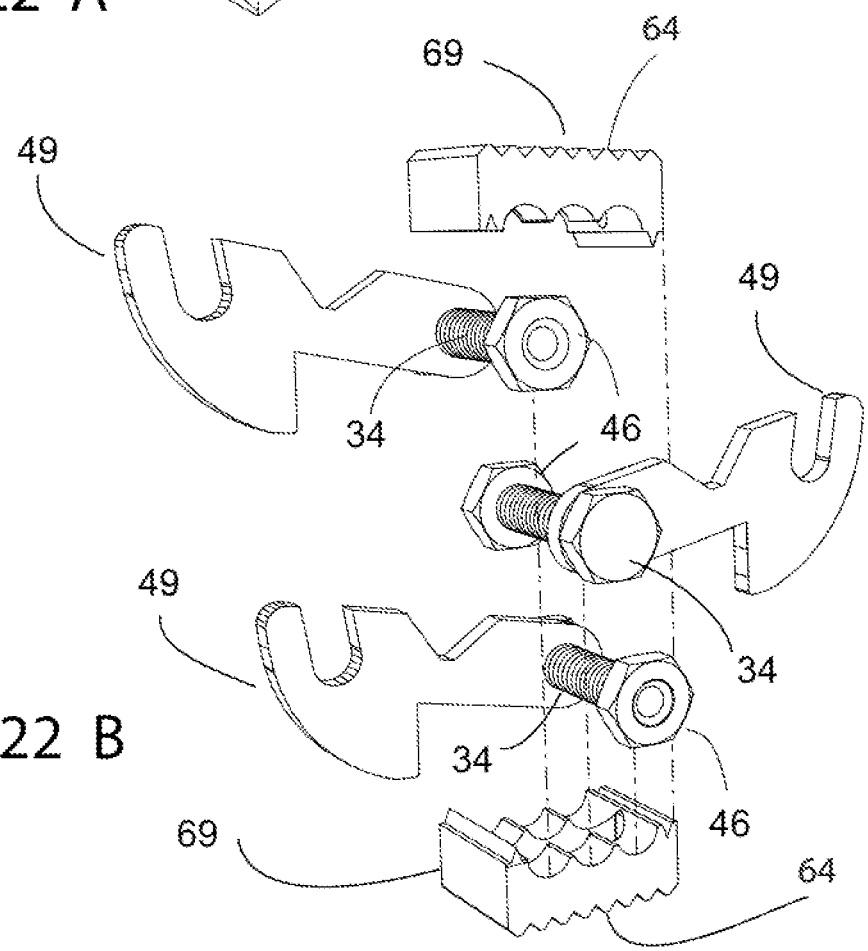
Figure 25:
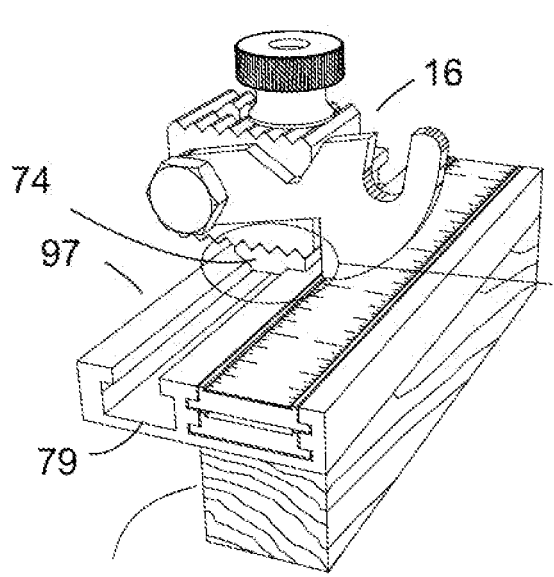
FIG. 25A is a perspective view of a track and stop and two inside track extrusions which can be used as a ruler extrusion and a connecter extrusion. The corrugated stop bottom rests on a base adapter that has a shaped bottom that fits into the T-slot of a track.
FIG. 25B is an enlargement of FIG. 25A showing the corrugated top of the base adapter and the shaped bottom that fits into the T-slot.
FIG. 25C illustrates options for positioning the stop block base in relationship to the T-slot in the track.
FIG. 25D is an enlargement of FIG. 25C illustrating the shaped bottom of the base adapter that fits into the T-slot.
FIG. 25E is an enlargement of FIG. 25D illustrating the shaped bottom corner of the base adapter that fits into the T-slot.
Figure 25:
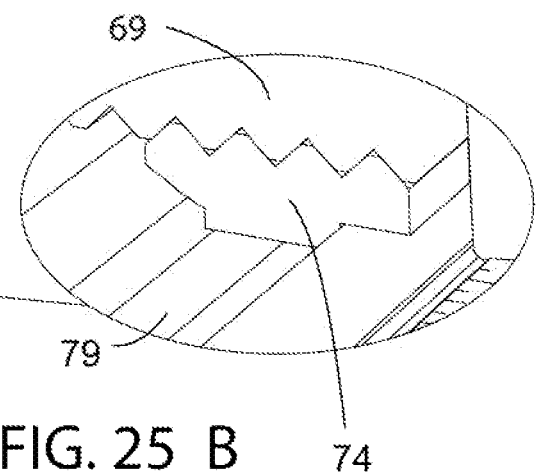
Figure 25:
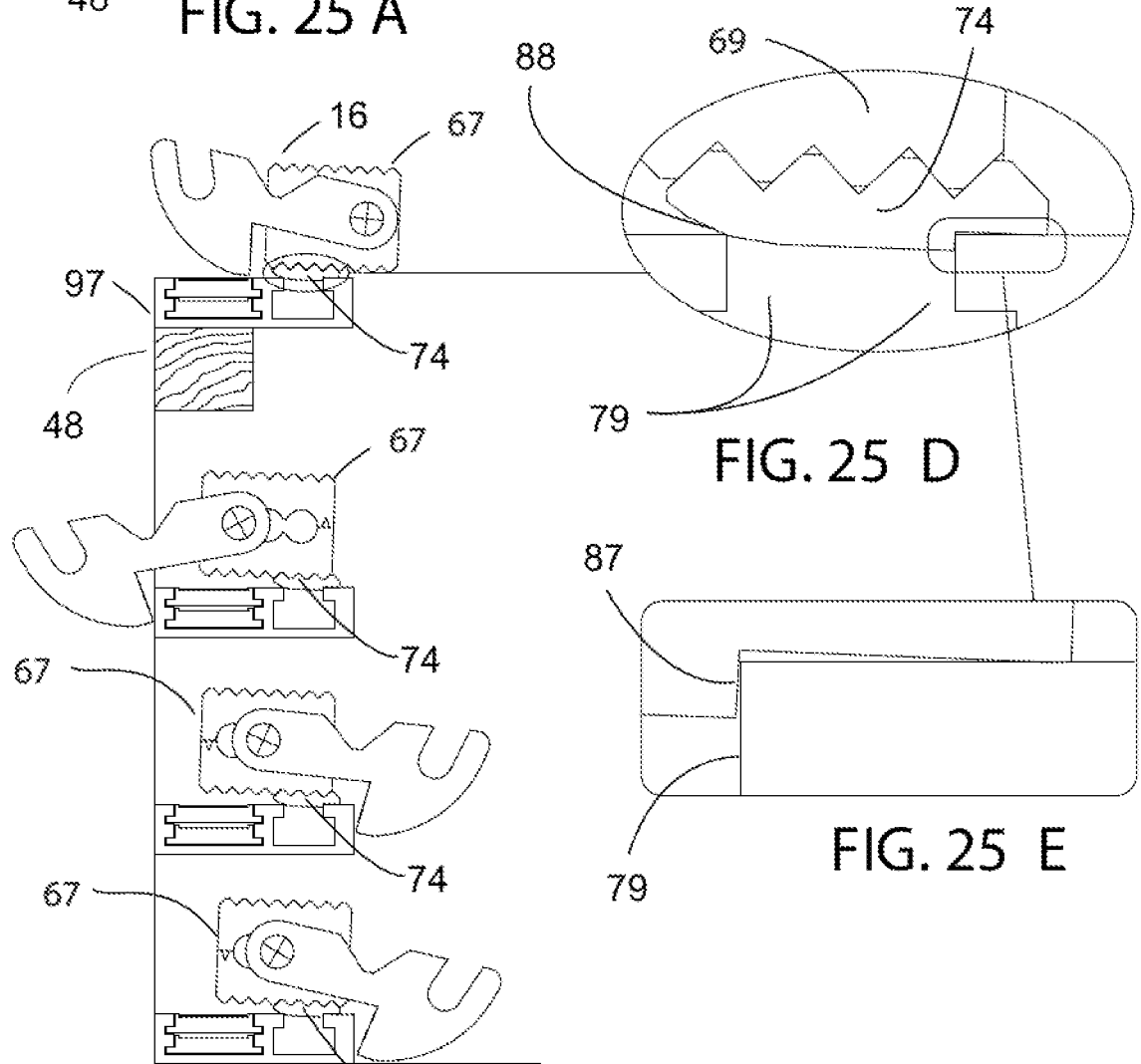
Figure 25:
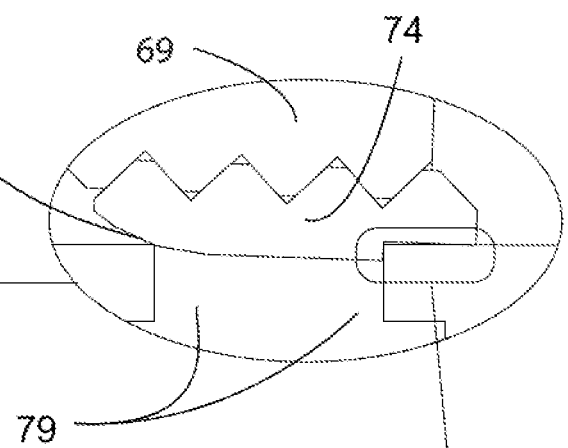
Figure 25:
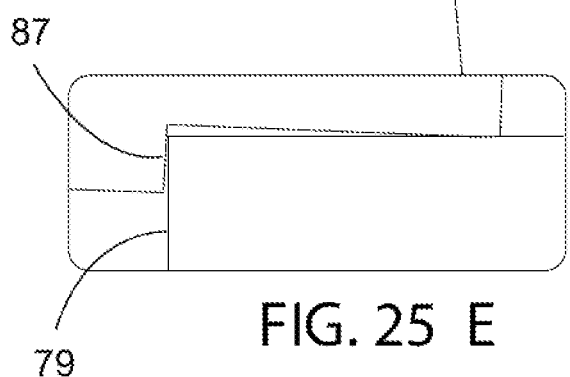
Figure 27:
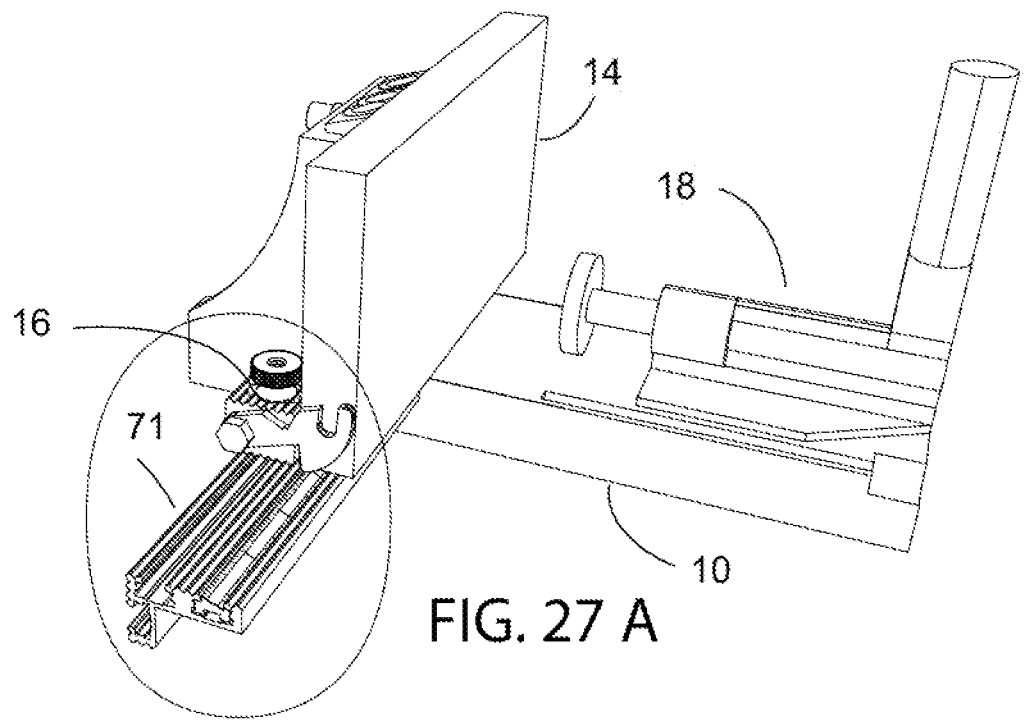
FIG. 27A is a perspective view of the pocket hole jig fitted with an L-shaped extrusion with two T-slots on the long leg which is mounted parallel to the floor of the pocket hole jig.
FIG. 27B is an enlargement of FIG. 27A.
Figure 27:
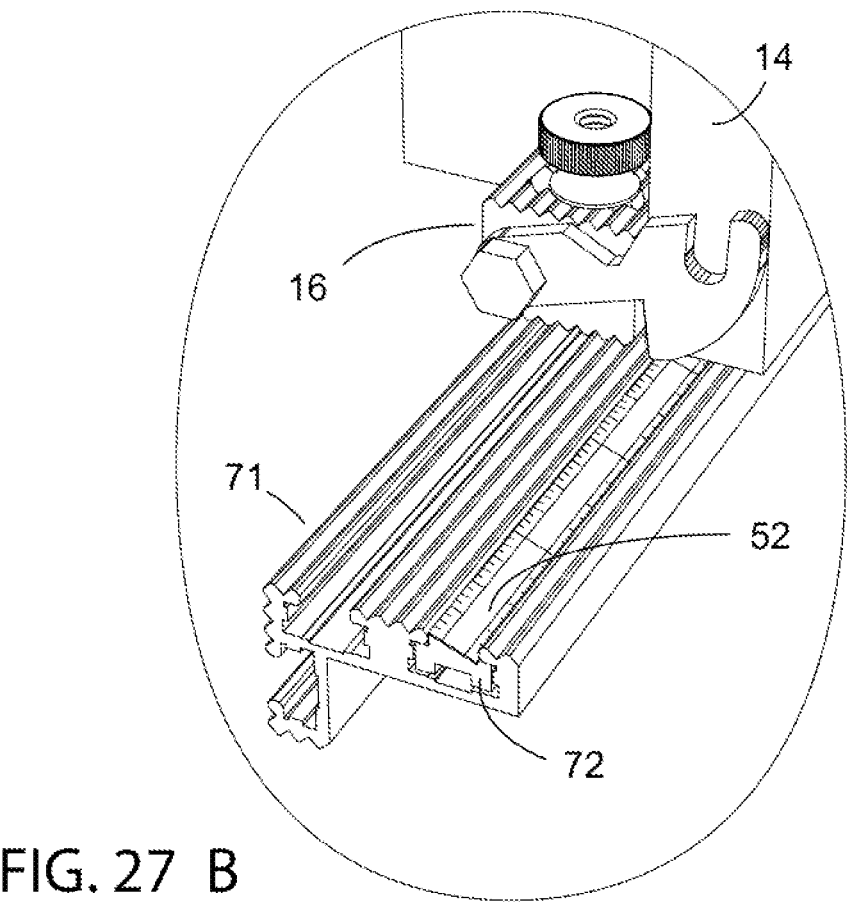
Figure 29:
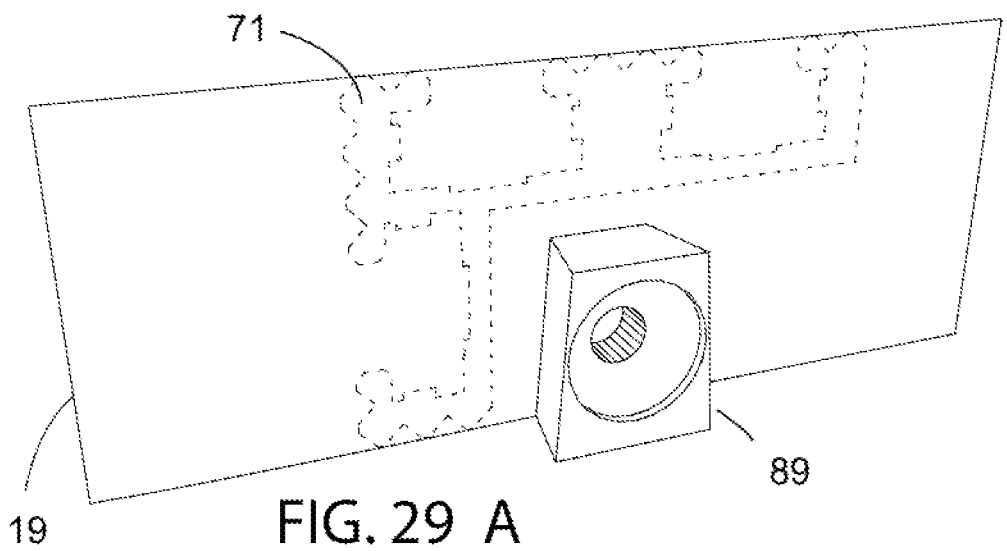
FIG. 29A is an enlargement of FIG. 28B illustrating the dovetail hook attached to the side of the pocket hole jig.
FIG. 29B illustrates the dovetailed hook with solid lines and the rectangular shape of a connector in dotted lines.
FIG. 29C illustrates the dovetailed hook with dotted lines and the rectangular shape of a connector in solid lines.
Figure 29:
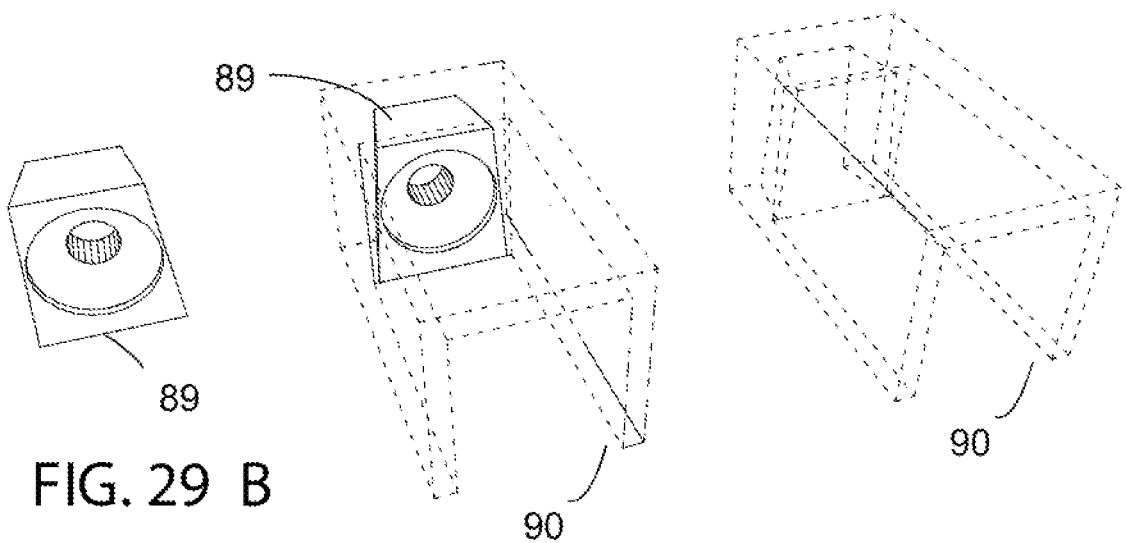
Figure 29:
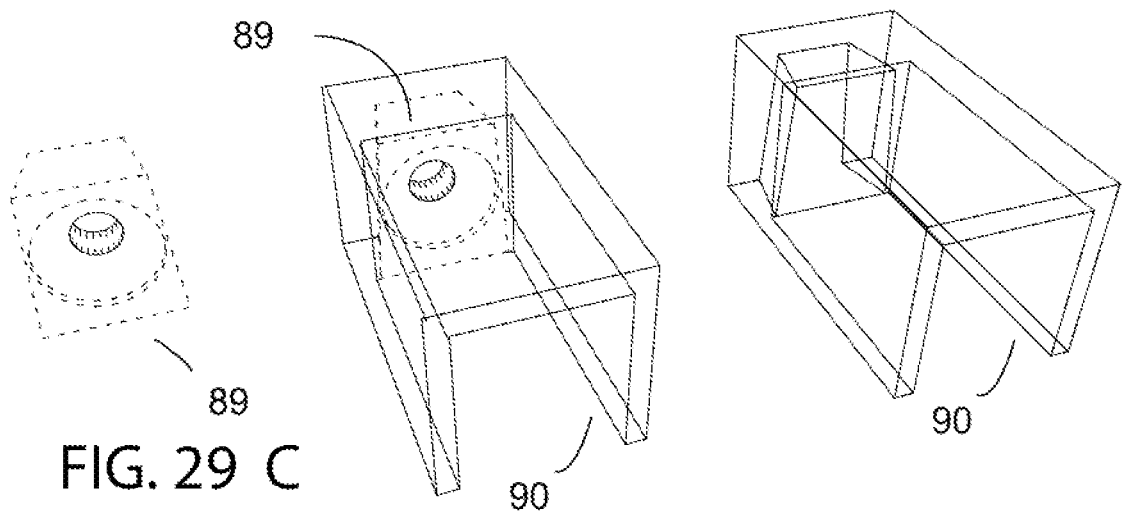
Figure 31:
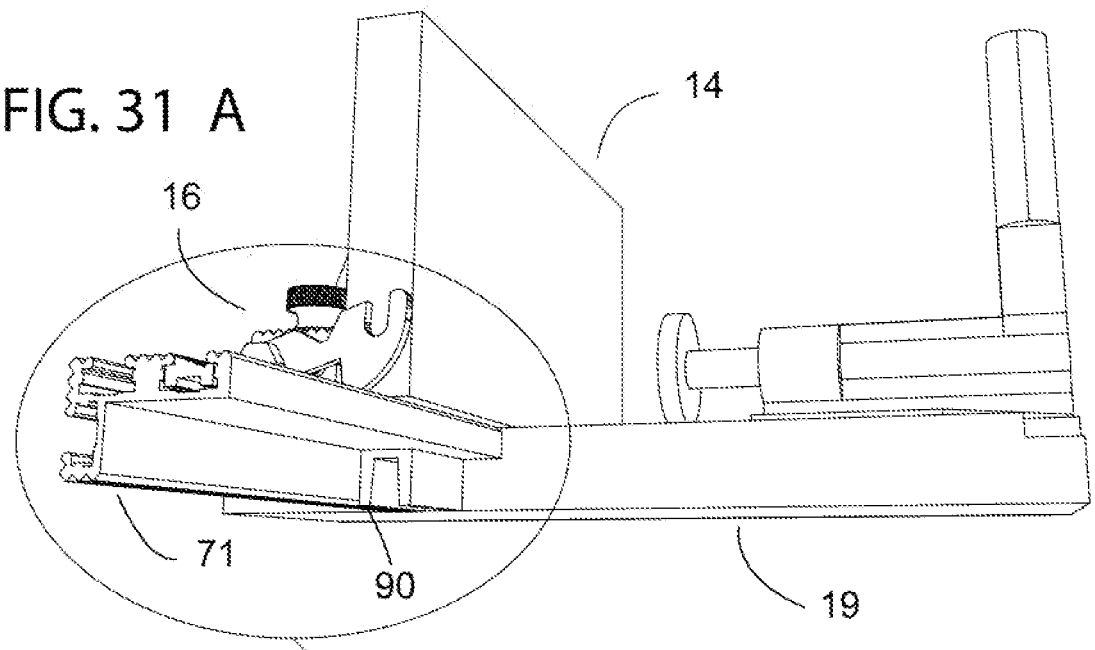
FIG. 31A is shows the rectangular shaped connector attached to the side of a pocket hole jig with the L-shaped extrusion attached to the top and side of the connector.
FIG. 31B is an enlargement of FIG. 31A.
Figure 31:
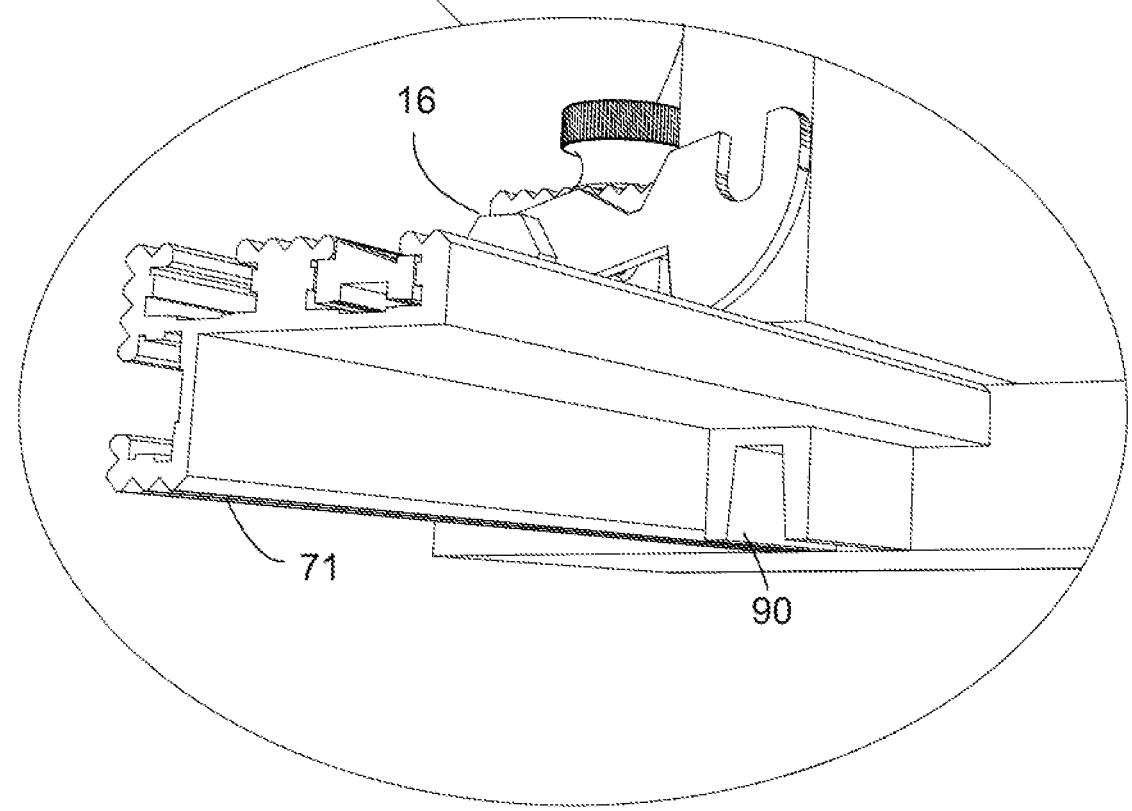

FIGS. 20 to 22 illustrate a two-piece flip stop arm base of the invention that offers the user a variety of flip stop arm positions and requires no tools for adjustment because any combination of uses is tightened in place with a thumb nut 36.

FIG. 20A is a perspective view of an example KREG K4 pocket hole jig 10 with a corrugated surface track 61 with a corrugated surface flip stop assembly 16. FIG. 20C is an exploded view of FIG. 20A illustrating the two part stop base 67 made from two identical parts which fit together. An angled T-slot insert ruler extrusion 73 is designed to slide inside the T-slot of the extrusion 97. The ruler 52 is secured to the top of the T-slot insert ruler extrusion 73. The T-slot insert ruler extrusion 73 is adjustable inside the track 97 and is secured in place with a set screw 63. The flip stop base 67 attaches to the track 97 with a bolt 34 and provides a foundation for the rotation point hole for attaching the flip stop arm 49 with a bolt 34. The exploded view illustrates that the two-part stop base 67 is made from two identical parts which are configured to fit together when rotated 180 degrees.

FIG. 21A is a perspective view of the two part stop base 67 made from two identical parts which fit together to form the two-piece corrugated flip stop base 67. The mated halves form three holes 40 in the middle of the stop base 67 that are configured to accept a bolt 34 for fastening the flip stop arm 49. The three attachment holes 40 allow the flip stop arm 49 to be secured in multiple locations in relationship to the track 97. The outside surface of each half 69 features a corrugated surface 64. An oblong slot 51 in the middle of each half 69 allows the stop base 67 to be locked into various positions on the track 97 with the bolt 34 and thumb nut 36. FIG. 21B is an exploded view of FIG. 21A illustrating the two-part stop base 67 made from two identical parts 69 which fit together to form the corrugated stop base 67. The base halves 69 mate together when positioned to align and engage the V-ridges 56 with the V-grooves 55. The outside surface of each part 69 is corrugated 64. FIG. 21C is an end view of the block half 69 illustrating the V-ridge 56 and the V-groove 55 which fit together and prevent the parts 69 from moving or rotating in relationship to each other.

FIG. 22A is an exploded view of the flip stop assembly 16 illustrating the stop base 67 made from two identical parts 69 which fit together. The two identical parts 69 are secured with a bolt 34 and thumb nut 36 and can be separated without the use of tools. The flip stop arm 49 and the securing bolt 34 and nut 46 can be changed and rotated in a variety of positions without loosening the bolt 34 and nut 46 of the flip stop arm 49. FIG. 22B is an exploded perspective view of the two part stop base 67, again made from two identical parts 69 which fit together. The flip stop arm 49 and bolt 34 can be changed and rotated in a variety of positions without loosening the bolt 34 on the track 97 or the flip stop arm 49. The two-piece corrugated flip stop base 67 is connected to the standard T-slot track 97 with a corrugated base adaptor 74.

FIGS. 23 to 26 illustrate a corrugated base adaptor 74 that allows the corrugated flip stop arm two-part stop base 67 to be used to connect the flip stop assembly 16 to any of the popular T-slot tracks. FIG. 23A is perspective view of an example KREG K4 pocket hole jig 10 with a track 97 and flip stop assembly 16. The track 97 is designed to accept two identical rectangular T-slot insert ruler extrusions 72. FIG. 23B is an enlargement of FIG. 23A illustrating a T-slot extrusion 97. FIG. 23C is a perspective view of FIG. 23A illustrating the track 97 and the flip stop assembly 16. The corrugated base adaptor 74 fits between the bottom of the two-piece corrugated flip stop base 67 and the track 97. The ruler 52 is secured to a movable rectangular T-slot insert ruler extrusion 72.

FIG. 24A is an exploded view of FIG. 23C. The two flip stop base 69 halves are aligned with each other. The compact flip stop assembly 16 is useful for pocket hole measuring jigs, the drill press, and other specialty jigs and fixtures. The corrugated surface 64 of the flip stop base 67 mates with a corrugated extrusion 61. The corrugated base adaptor 74 is a connector between the stop assembly 16 with a corrugated surface 64 and the standard T-slot extrusion opening 79 in the T-slot track 97. FIG. 24B is a section end view of FIG. 24A that illustrates the relative positioning and functionality of the corrugated base adaptor 74 which is used to connect the flip stop assembly 16 to a T-slot track 97. FIG. 24C illustrates an exploded view of the assembly of FIG. 24B.

FIG. 25A is a perspective view of a track 97 and flip stop assembly 16. The corrugated base adaptor 74 is situated between the bottom of the corrugated half of the stop base 69 and the T-slot track opening 79. FIG. 25B is an enlargement of FIG. 25A showing the corrugations 64 on the top of the corrugated base adaptor 74 and the bottom that fits into the T-slot opening 79. FIG. 25D is an end view of FIGS. 25A and 25C illustrating the relationship between the bottom of the corrugated base adaptor 74 and the T-slot opening 79. One side 88 of the bottom of the corrugated base adapter 74 is curved. The opposite side 87 of the bottom of the corrugated base adapter 74 is a squared or abrupt corner shown in FIG. 25E. FIG. 25C illustrates options for positioning the two piece flip stop block base 67 in relationship to the T-slot in the track 97.

FIG. 26A is a perspective view of the corrugated base adaptor 74. The bottom angled, curved side 88 of the base adaptor 74 is opposite the bottom angled corner side 87 of the base adaptor 74. FIG. 26B is an end view of the corrugated base adaptor 74 that illustrates the relationship with the T-slot 79. The bottom angled corner side 87 of the base adapter 74 contacts the T-slot opening 79. FIG. 26C is an end view of the base adaptor 74 that illustrates the relationship with the T-slot 79 and the radius of the curved side 88 that adjusts the extrusion to lock tightly in the T-slot 79. FIG. 26D is a top view of the base adaptor 74. FIG. 26E is an end view of the base adaptor 74. In general, the base adaptor 74 defines a form factor including both an arcuate, curved portion 88 and a notched portion 87 that engage the T-slot 79. In operation, the angled corner side 87 and the curved portion 88 coordinate to ensure that the base adaptor 74 is firmly engaged and seated in the T-slot 79, such as by the base adaptor 74 slightly rotating into the T-slot 79 providing a snug engagement. The contours further allow the base adaptor 74 to accommodate slots of varying width, such as the result of varying design dimensions or as the result of wear (e.g., die wear during the manufacturing process or T-slot 79 wear during use) while maintaining firm engagement.

FIGS. 27 to 31 illustrate an application using the corrugated track 71 and the flip stop assembly 16 for a clip-on measuring stop system for the example KREG K4 pocket hole jig 10. In this embodiment, the example L-shaped track 71 measures 1 inch on the short leg of the L and 1.5 inches on the long leg of the L. In this example, the short leg of the L extrusion is 1 inch because the KREG K4 pocket hole jig 10 floor is 1 inch in height from the work bench surface.

FIG. 27A is a perspective view of the KREG K4 pocket hole jig 10 fitted with an L-shaped corrugated extrusion 71. The extrusion 71 has two T-slots on the long leg which is mounted generally parallel to the floor of the KREG K4 pocket hole jig 10. The length of the long leg is 1.5 inches. The short leg of the L-shaped track has one T-slot and is 1 inch in length. The height of the floor of the KREG K4 pocket hole jig 10 is 1 inch. A workpiece 14 is in contact with the flip stop arm 49 of the flip stop assembly 16. FIG. 27B is an enlargement of FIG. 27A featuring the L-shaped corrugated track 71 fitted with the angled T-slot insert ruler extrusion 72 and the attached ruler 52.

FIG. 28A is again an example KREG K4 pocket hole jig 10 with the outline shape of the L-shaped extrusion 71 located on the side of the jig 10. FIG. 28B is an enlargement of FIG. 28A illustrating a dovetailed angled adaptor base 89 attached to the side of the KREG K4 pocket hole jig 10. The track connector base 90 mates with dovetail of the angled adaptor base 89. The position of the L-shaped corrugated track 71 is shown with a solid line. The angled adaptor base 89 is shown in a solid line and the mating track connector base 90 is illustrated with a dashed line. FIG. 28C shows a piece of the L-shaped extrusion 71 fitting over the track connector base 90 which is illustrated with a dashed line. The track 71 can be made from extruded plastic and connected to the injection molded dovetailed angled adaptor base 89 with an adhesive or by using sonic welding, for example. FIG. 28D is an exploded view of FIG. 28C shown from the opposite side of FIG. 28C.

FIG. 29A is an enlargement of FIG. 28B illustrating the dovetailed angled adaptor base 89. FIG. 29B illustrates the dovetailed angled adaptor base 89 with solid lines and the rectangular track connector base 90 in dashed lines. FIG. 29C illustrates the dovetailed angled adaptor base 89 with dashed lines and the rectangular track connector base 90 in solid lines.

FIG. 30A is a KREG K4 pocket hole jig 10 with the shape of the L-shaped extrusion 71 located on the side of jig 10. Inside the L-shaped extrusion 71 is a dovetailed angled adaptor base 89. FIG. 30B is an enlargement of FIG. 30A showing the dashed outline of the L-shaped corrugated track 71. The angled adaptor base 89 is secured to the KREG K4 pocket hole jig 10. FIG. 30C is a perspective view showing the bottom of the dovetail angled adaptor base 89. FIG. 30D illustrates the inside of the rectangular-shaped track connector base 90 showing an angled cavity that is sized to receive the angled adaptor base 89. FIG. 30E illustrates the inside of the rectangular track connector base 90 with the angled adaptor base 89 slid into the mating position. FIGS. 31A and 31B illustrate the rectangular shaped connector base 90 attached to the side of a pocket hole jig 10 with the L-shaped extrusion 71 attached to the top and side of the connector base 90.

Figure 32:
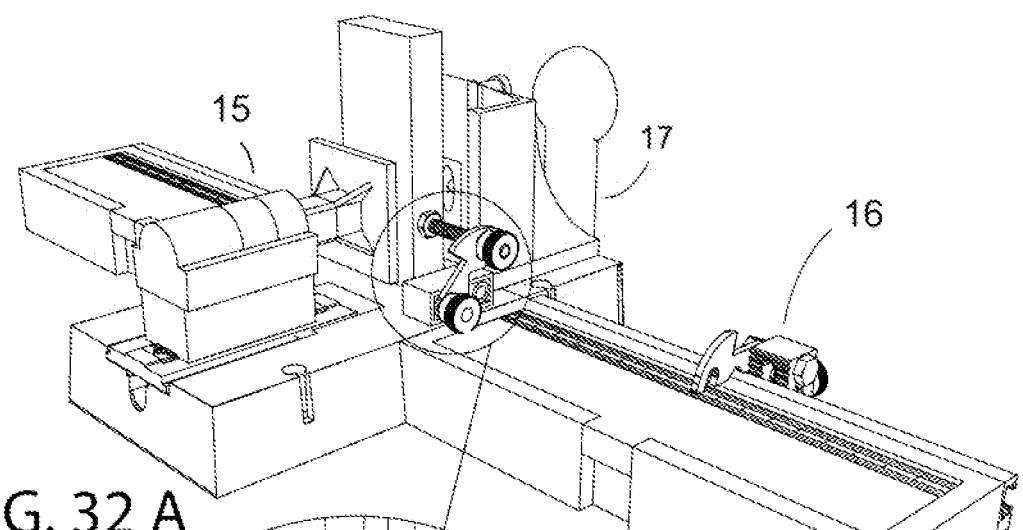
FIG. 32A is a pocket hole jig, such as a KREG K5 pocket hole jig, shown with the L-shaped flip stop attached to the removable depth stop.
FIG. 32B is an enlargement of FIG. 32A.
FIG. 32C is a partial exploded view of FIG. 32B.
Figure 32:
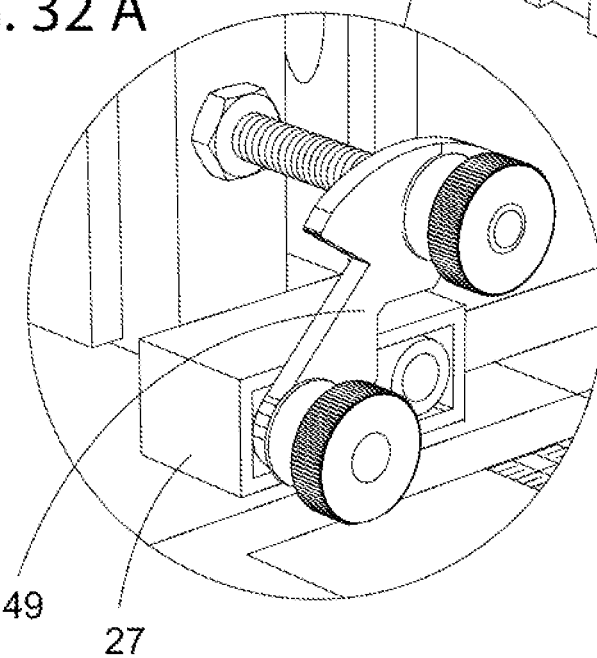
Figure 32:
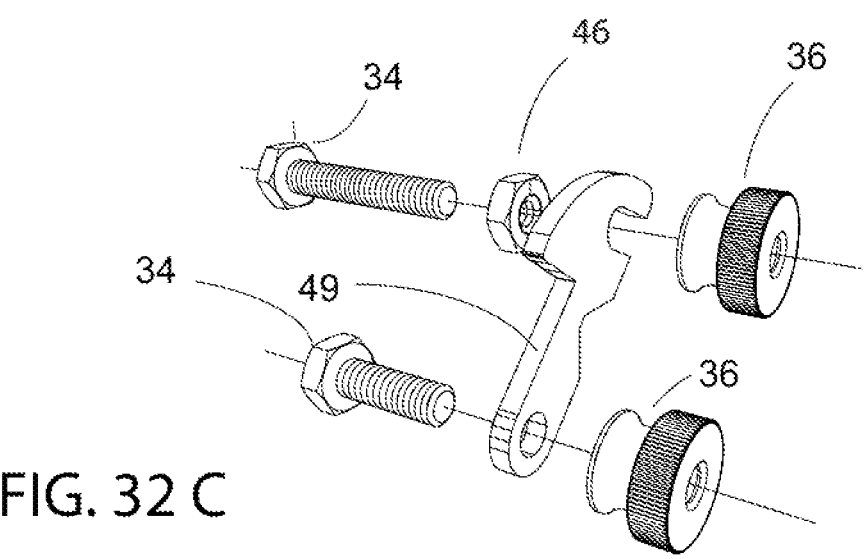
Figure 33:
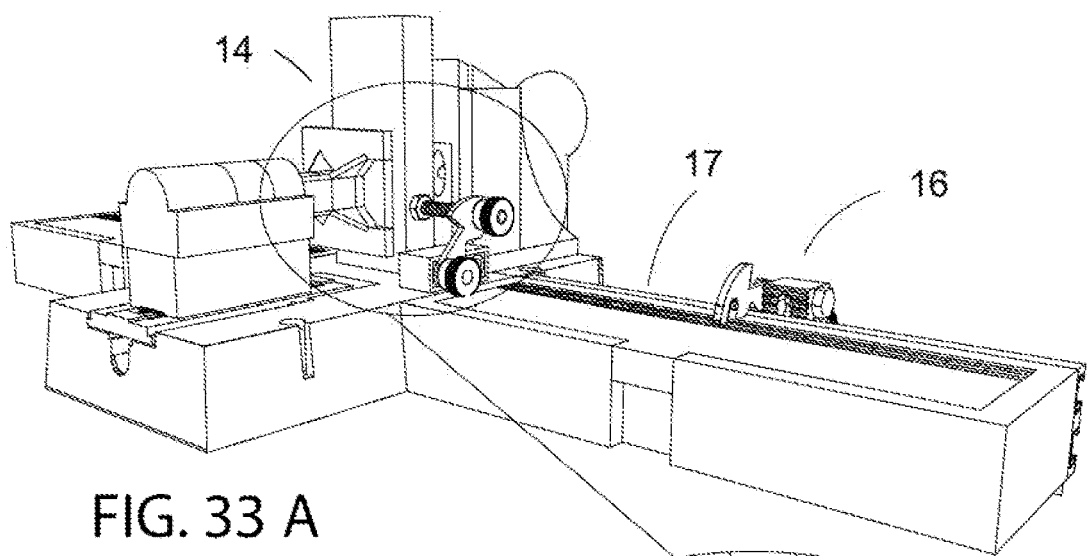
FIG. 33A is a pocket hole jig, such as a KREG K5 pocket hole jig, shown with the L-shaped flip stop attached to the removable depth stop with the workplace clamped with the square-shaped clamp pad.
FIG. 33B is an enlargement of FIG. 32A showing with dotted lines material that could be removed from the clamp pad which would allow the L-shaped flip stop to rotate out of the way.
FIG. 33C is an enlargement of FIG. 33B.
Figure 33:
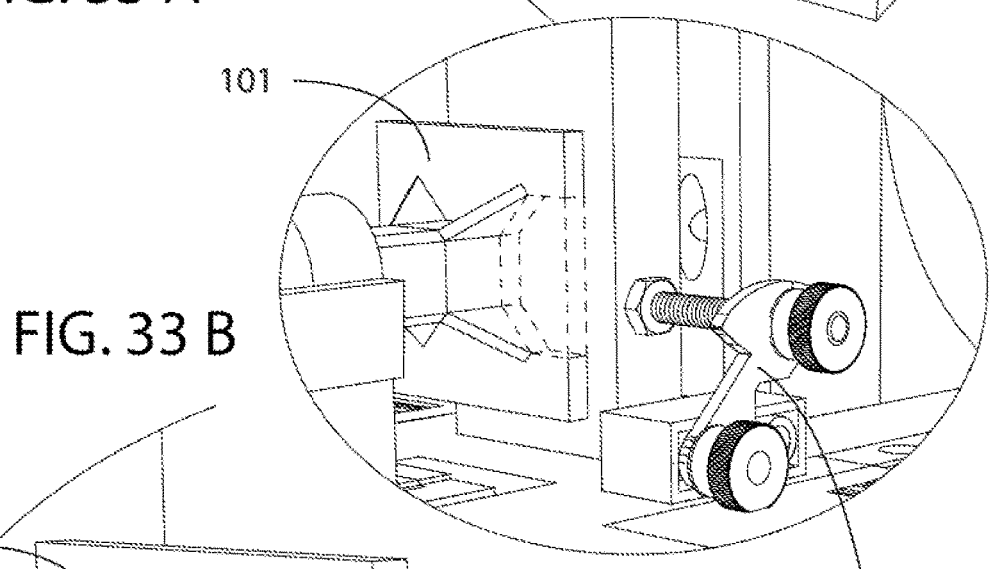
Figure 33:
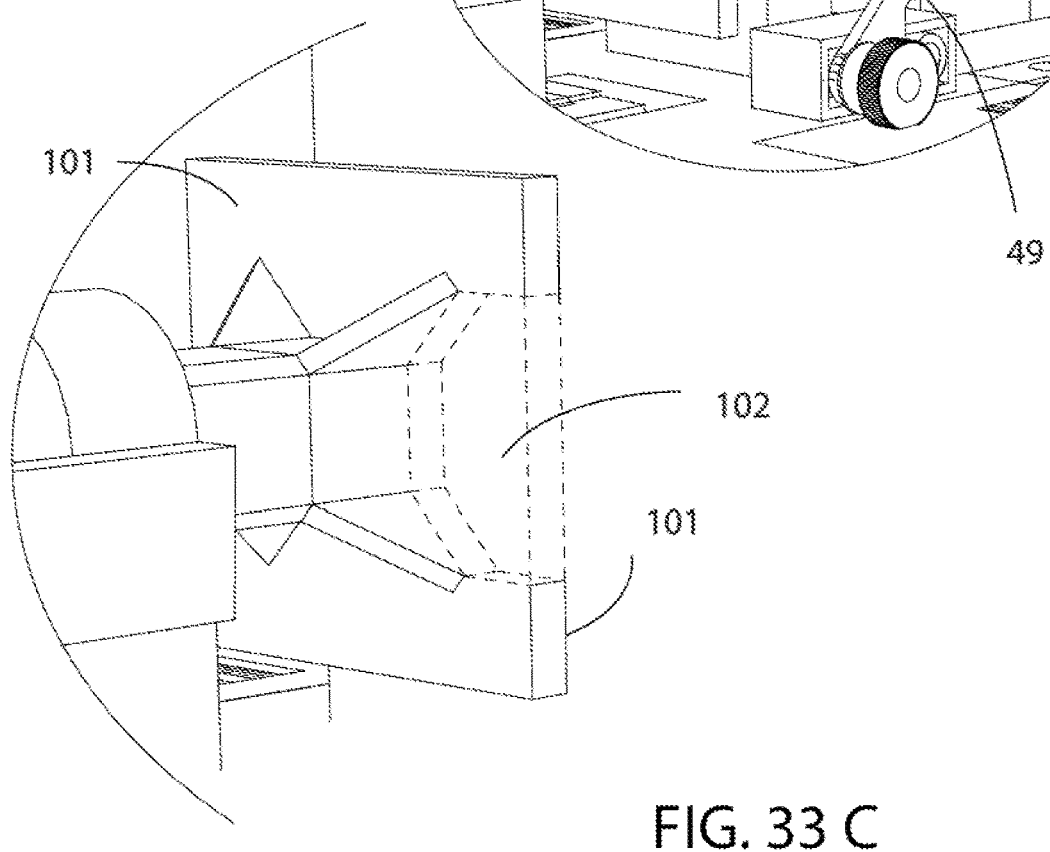
Figure 34:
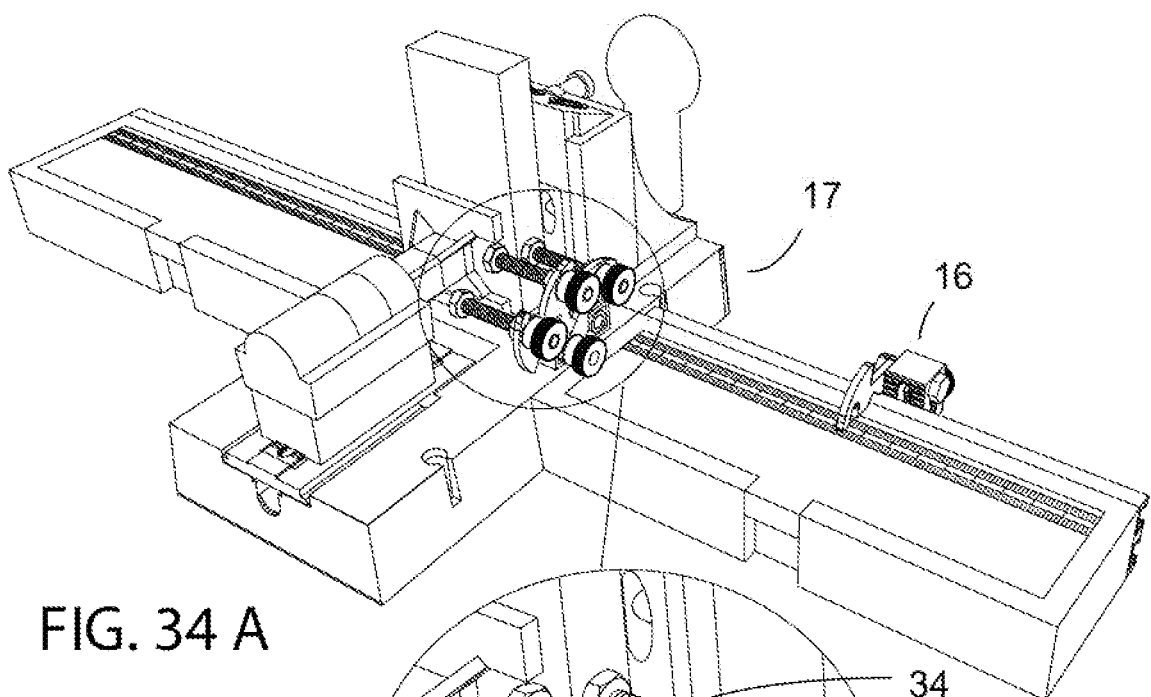
FIG. 34A is a pocket hole jig, such as a KREG K5 pocket hole jig, shown with the L-shaped flip stop attached to the removable depth stop and the three possible positions of the flip stop arm.
FIG. 34B is an enlargement of FIG. 34A.
FIG. 34C is a partial perspective exploded view of FIG. 34B with the flip stop arm illustrated with dotted lines.
FIG. 34D is an illustration of the flip stop arm rotation.
Figure 34:
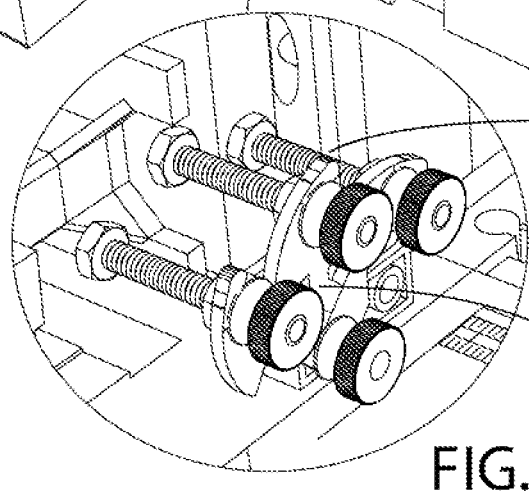
Figure 34:
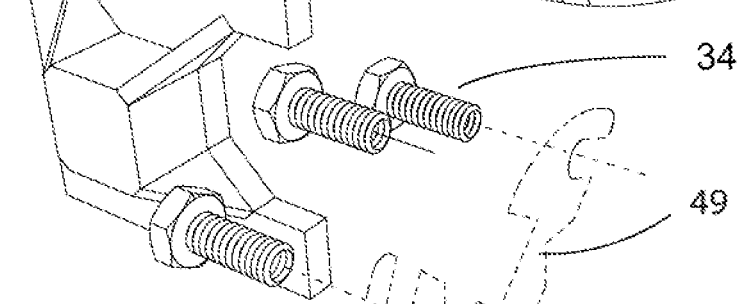
Figure 34:
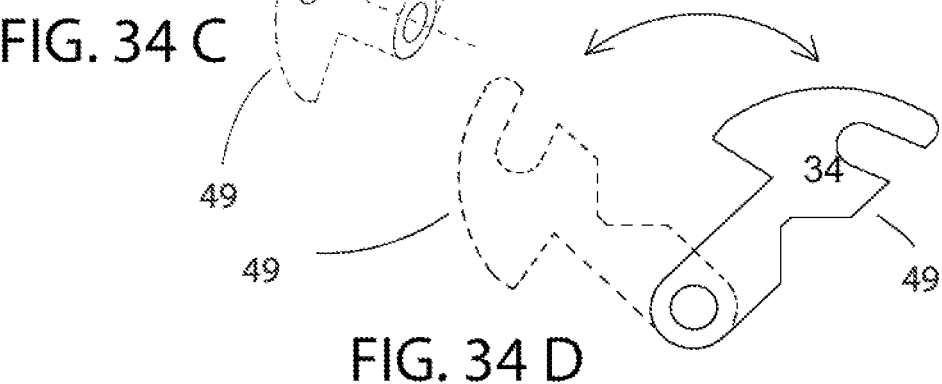
Figure 35:
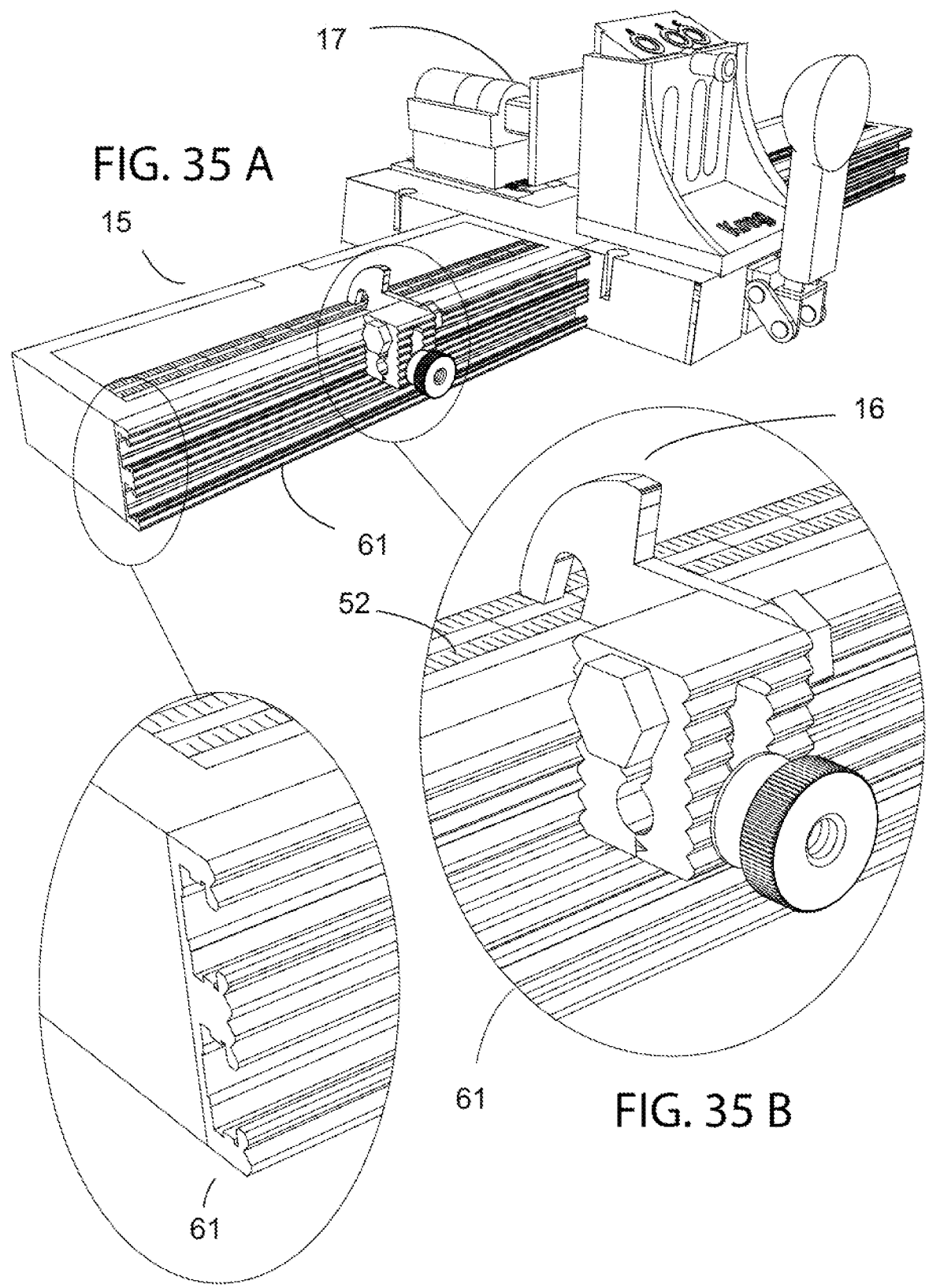
FIG. 35A is a pocket hole jig, such as a KREG K5 pocket hole jig, shown with the L-shaped flip stop attached to the double T-slot attached to a storage box on the side of the jig. The perspective is from the back of the jig.
FIG. 35B is an enlargement view of flip stop shown in FIG. 35A.
FIG. 35C is an enlargement view of the double T-slot track shown in FIG. 35A.
Figure 37:
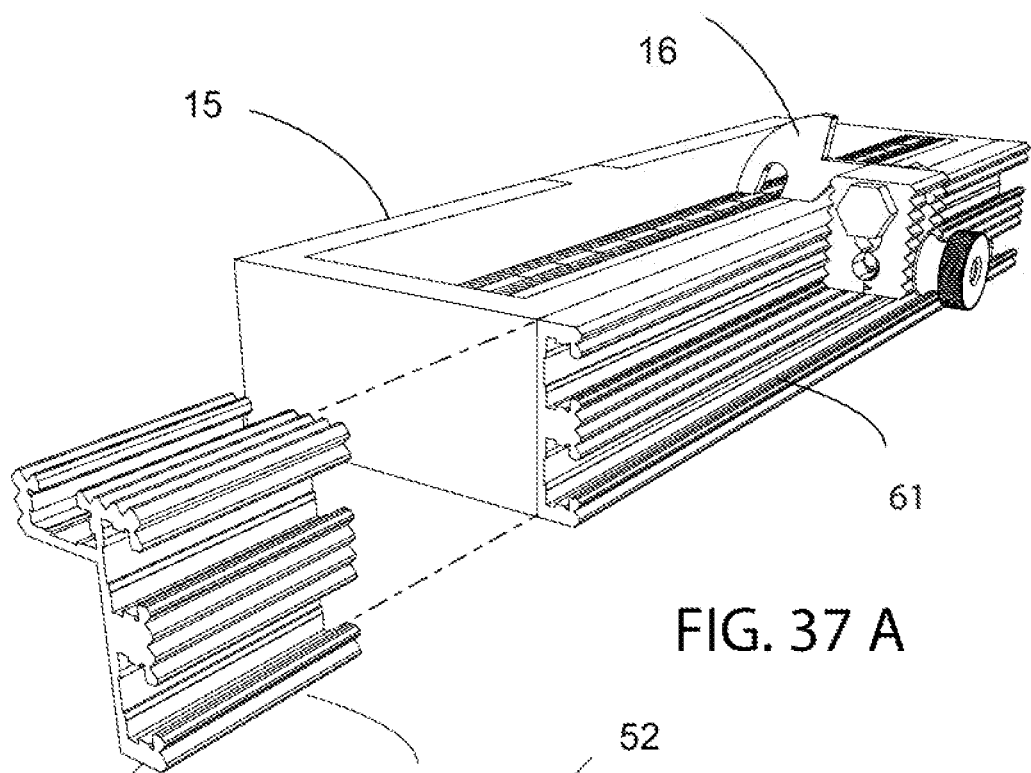
FIG. 37A is an enlargement of a double track shown in FIG. 35A.
FIG. 37B is an enlargement of double track shown in FIG. 35A. It shows an inside extrusion connecting the double T-slot track with the L-shaped extrusion.
Figure 37:
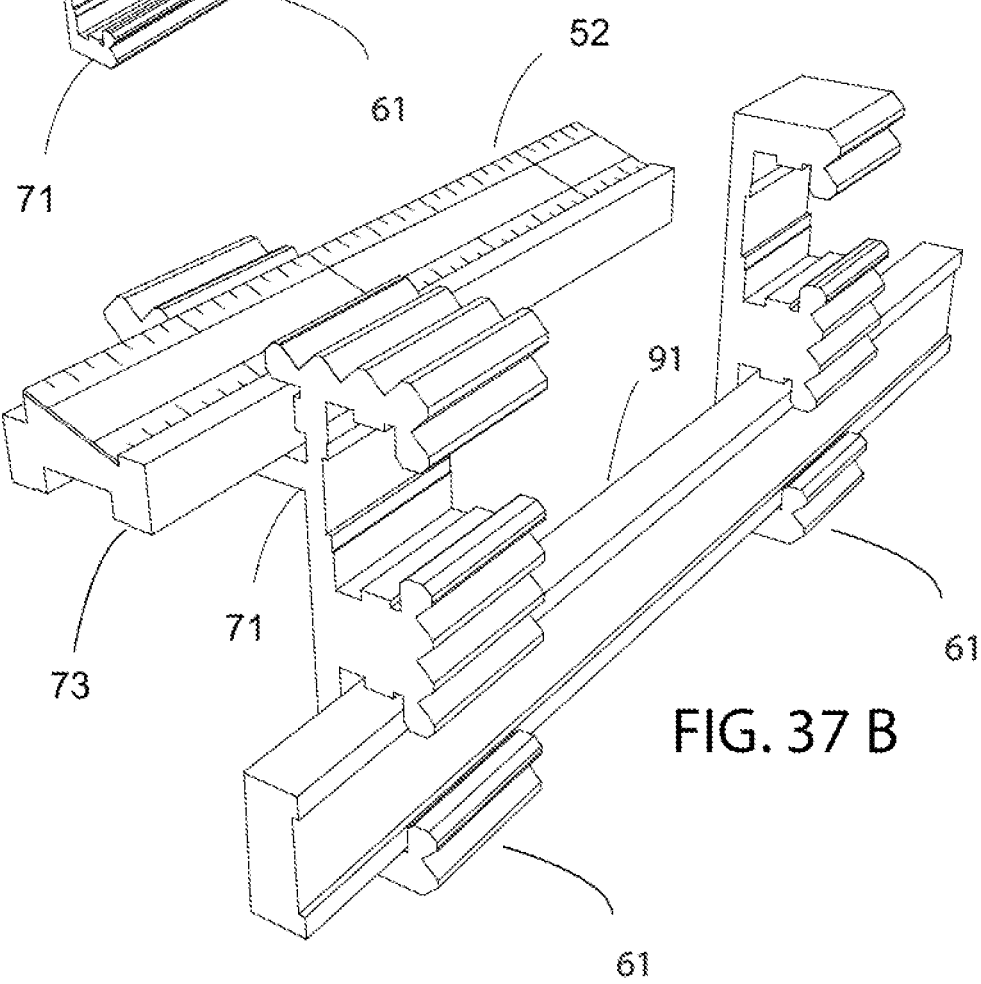
Figure 38:
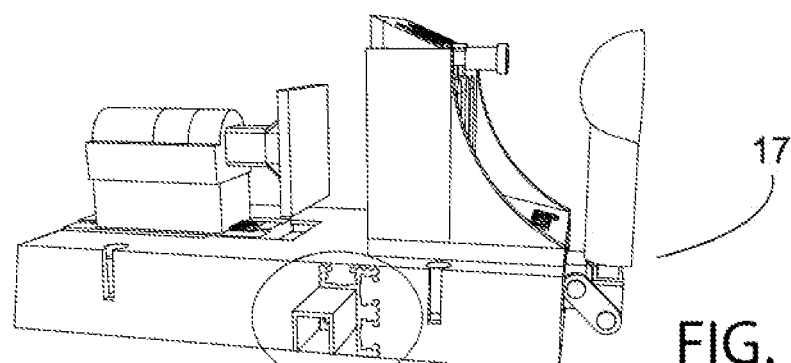
Figure 38:
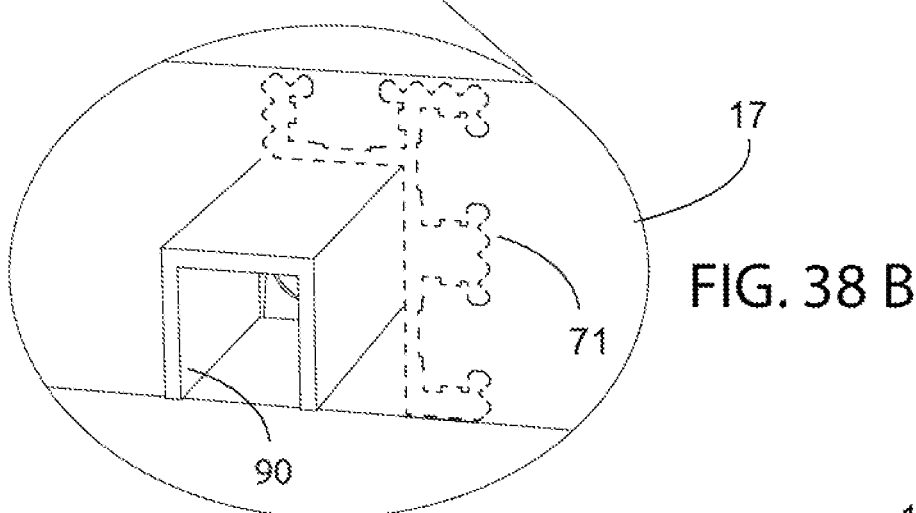
Figure 38:
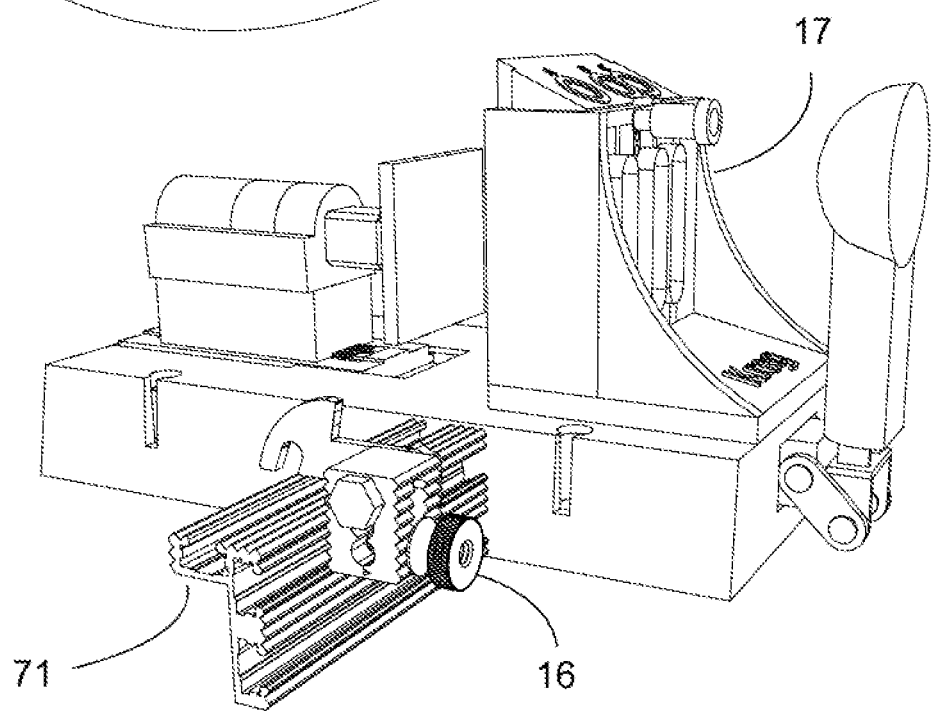

FIGS. 32 to 34 illustrate an application of the invention in the use of adding a flip stop arm to the KREG K4 pocket hole jig 17.

FIG. 32A is an example KREG K5 pocket hole jig 17 shown with the L-shaped flip stop arm 49 attached to the removable stationary stop platform 27. FIG. 32B is an enlargement of FIG. 32A illustrating the rectangular shape of the movable snap-in stationary stop platform 27. The stationary stop platform 27 has two holes for attaching a bolt 34 for locating the position of the workpiece 14. This illustration shows that the flip stop arm 49 can be positioned in one of the two holes in the stationary stop platform 27, thus creating a movable and repeat measuring stop. FIG. 32C is an exploded view of FIG. 32B again illustrating the interaction of the bolts 34, nut 46, and thumb screws 36 and the flip stop arm 49.

FIG. 33A is KREG K5 pocket hole jig 17, shown with the movable snap-in stationary stop platform 27. The stationary stop platform 27 has two holes for attaching a stop bolt 34 for locating the position of the workpiece 14. This illustration shows that the flip stop arm 49 can be positioned in one of the two holes in the stationary stop platform 27, thus creating a movable and repeat measuring stop. Also illustrated is the KREG K5 pocket hole jig clamp 101. In its manufactured configuration, part of the material in the KREG K5 pocket hole jig clamp 101 prevents the flip stop arm 49 from swinging out of the way. The material 102 to be removed is shown with a dashed line. Alternatively, a clamp can be manufactured to accommodate the operation of the flip stop arm 49 illustrated herein. FIG. 33B is an enlargement of FIG. 32A showing the material 102 to be removed or absent from the clamp design with dashed lines. Again, removing this material 102 from the clamp pad of the clamp 101 would allow the L-shaped flip stop arm 49 to rotate out of the way without interference. FIG. 33C is an enlargement view of FIG. 33B illustrating the KREG K5 pocket hole jig clamp 101 and material 102 to be removed or excluded with a dashed line.

FIG. 34A is a KREG K5 pocket hole jig 17 shown with the L-shaped flip stop arm 49 attached to the removable depth stop platform 27. Three possible positions of the flip stop arm 49 are illustrated. FIG. 34B is an enlargement view of FIG. 34A. FIG. 34C is a view of FIG. 34B with the flip stop arm 49 illustrated with dashed lines. FIG. 34D is an illustration of the flip stop arm 49 rotational range of movement. The active position is illustrated with a solid line. And, the disengaged position is illustrated with a dashed line.

FIGS. 35 to 39 illustrate the corrugated extrusion 61, the L-shaped corrugated track 71, the flip stop assembly 16, and the various interactions with the example KREG K5 pocket hole jig 17.

FIG. 35A is a KREG K5 pocket hole jig 17 shown with the flip stop assembly 16 and the double T-slot extrusion 61 attached to a storage box 15 on the side of the jig 17. A ruler 52 is attached to the top of the storage box 15. The perspective is from the clamp handle side of the jig 17. FIG. 35B is an enlargement view of flip stop assembly 16 shown in FIG. 35A. FIG. 35C is an enlargement view of the double T-slot extruded track 61 shown in FIG. 35A.

FIG. 36A is a KREG K5 pocket hole jig 17, shown with the L-shaped flip stop assembly 16 attached to the double T-slot corrugated extrusion 61, which is attached to the storage box 15 on the side of the jig 17. FIG. 36B is an enlargement view of the flip stop assembly 16 shown in FIG. 36A. FIG. 36C is a perspective view which illustrates that the workpiece 14 is in contact with the flip stop assembly 16. FIG. 36D is an enlargement view of a flip stop assembly 16 shown in FIG. 36C.

FIG. 37A is an enlargement view of a double track 71 shown in FIG. 35A. It is attached to the storage box 15 on the side of the jig. FIG. 37B is an enlargement view of double track 71 shown in FIG. 35A. It shows an inside T-slot connector extrusion 91 connecting the double T-slot extruded track 61 and the L-shaped corrupted track. The angled T-slot ruler extrusion 73 is illustrated with the stick-on ruler 52.

FIG. 38A is a KREG K5 pocket hole jig 17 with the shape of the L-shaped corrugated extrusion 71 attached to the side of the jig 17. A dashed outline designates the location of the L-shaped corrugated track 71. The track connector base 90 is shown on the inside of the L-shaped corrugated track 71. The long leg of the L-shaped corrugated track 71 is 1.5 inches, which is the height of the KREG K5 pocket hole jig 17 floor from a workbench top. The use of the track connector base 90 and the L-shaped corrugated extrusion 71 is discussed and illustrated in detail above in connection with FIGS. 28, 29, and 30 in reference to the KREG K4 pocket hole jig 10. FIG. 38B is an enlargement view of FIG. 38A. FIG. 38C illustrates the L-shaped track 71 with the flip stop assembly 16 connected to the example K5 jig 17. The short leg of the L-shaped track 71 is parallel to the floor of KREG K5 pocket hole jig 17. FIG. 39A is a perspective view of a pocket hole jig 17 with the shape of the L-shaped extrusion 71 located on the side of the jig 17 with a flip stop assembly 16 attached to the track 71. Two extrusion 73, 91 are located inside the L-shaped extrusion 71 T-slots and fit inside another extrusion. The two inside extrusions 73, 91 can be secured inside the T-slots to couple or lock the extrusions together. FIG. 39B is an enlargement of FIG. 39A. FIG. 39C is an enlargement of FIG. 39A shown with the large piece of track removed.

FIGS. 40 to 55 illustrate an embodiment for use with an example KREG pocket hole drill guide 12, or other drill guides described in detail in this application or generally available, in conjunction with a table saw 105 having a miter gauge. Using a miter gauge head 122 to support the workpiece 14 or the pocket hole drill 114 has a number of advantages. The table miter slot 108 secures the bar 110 of the miter gauge and prevents it from rotating. The miter gauge is a useful tool that the average woodworker already has. The workpiece 14 can be supported by the table saw table top 106 such that the workpiece 14 can rest directly on the table top 106. A wide board or panel is preferably supported on each side of the standard pocket hole drilling device such as the KREG K4 pocket hole jig 10. The height of the KREG K4 pocket hole jig 10 floor is 1 inch from the work bench or saw table top 106. Supporting a large panel workpiece with a 1 inch thick support piece requires use of a non-standard wood thickness.

Using the tables miter gauge head 122 to support the workpiece 114 allows the workpiece location to be measured and set with a flip stop assembly 16 measuring system having a miter gauge L-shaped corrugated track 71 attached to the miter gauge head 122.

FIG. 40A shows a pocket hole drill guide 114 secured to a miter gauge bar 110 with a toggle clamp also attached to the miter bar 110 positioned on a table saw top 106. The clamp pad 20 presses the drill guide 114 against the workpiece 14 which is pressed against the miter gauge head 122. FIG. 40B is an enlargement view of FIG. 40A.

FIG. 41A is a perspective view of FIG. 40A viewed from the back of the table saw. The miter gauge head 122 is moveable and can be secured to the miter gauge bar 110 with accurately spaced threaded holes 119 in the miter gauge bar 110. FIG. 41B is an enlarged view of FIG. 41A. The movable miter gauge head 122 is secured in place with thumb screws 47.

FIG. 42A shows a pocket hole drill guide 114 secured to a miter gauge bar 110 with a toggle clamp 18. FIG. 42B is an enlargement view of the drill guide 114 shown in FIG. 42A. The pocket hole drill guide 114 has drill guide bushings 11 located on the top of the guide 114. The pocket hole drill guide 114 is pushed against the workpiece by the clamp pad 20 attached to the clamp shaft 21 of the clamp 18. The example pocket hole drill guide 114 is a two-part system having two L-shaped members in the form of a block 116 and a base 118. The drill guide bushings 11 are located in the L-shaped drill guide block 116 with corrugated surface 64. The corrugated surface 64 is located at a mating interface of the block 116. The L-shaped block base 118 also defines a corrugated surface 64 that mates with the L-shaped drill guide block 116 to create the two-piece drill guide block 114 when assembled. FIG. 42C is an enlargement view of the flip stop assembly 16 shown in FIG. 42A. FIG. 42D is an end view of the drill guide block 114 shown in FIG. 42A with both block 116 and base 118 mated to mesh the respective corrugated surfaces 64. FIG. 42E is an end view of the drill guide base 118 which is L-shaped with a corrugated surface 64 located on the inside of the long leg of the L and FIG. 42F is an end view of the drill guide block 116 with a corrugated surface 64 also located along the long leg of the L. Extruded holes 123 are located adjacent to the corrugated surface 64 of the guide block 116.

FIG. 43A is an exploded view of the two-piece drill guide block 114 illustrating the drill guide block 116, the drill guide base 118, and a rod 124 with threaded axial center hole 41 and transverse threaded holes that intersect the center hole 41. The threaded rod 124 slides into the extruded holes 123 of the drill guide block 116. Stove bolts 50, for instance, extend partially through openings in the guide base 118 and thread into the transverse threaded holes in threaded rod 124 and secure the drill guide block 116 to the drill guide base 118 to form one solid unit.

Adjusting the location of the two halves of the drill guide block 114 in relationship to each other (e.g., by raising or lowering the relative position of the guide block 116 relative to the guide base 118) determines the appropriate setting for wood thickness which is illustrated in the following end view examples. FIG. 43B illustrates the drill guide block 114 adjusted for drilling ¾ inch material. FIG. 43C illustrates the drill guide block 118 adjusted for drilling 1⅛ inch material. And, FIG. 43D illustrates the drill guide block adjusted for drilling 1½ inch material. Given the benefit of this disclosure, one skilled in the art will appreciate that the guide block 114 and interface between the guide block 116 and guide base 118 can be adapted (e.g., sized, oriented, etc.) to accommodate a variety of desired relative positions, which will accommodate application specific woodworking applications.

FIG. 44A shows a pocket hole drill guide 114 secured to a miter gauge bar 110 with a toggle clamp 18 also attached to the miter bar 110 positioned on a table saw 106. FIG. 44B is an enlargement view of FIG. 44A illustrating the flip stop arm 49 attached to the side of the pocket hole drill guide 114. FIG. 45A is a perspective view of FIG. 44A shown from the back of the table saw 106. FIG. 45B is an enlargement view of FIG. 45A. FIG. 45C is a perspective view of FIG. 45B showing the stop bolt 34 touching the workpiece 14. FIG. 45D is an exploded view of the flip stop arm 49, the adjustable bolt 34, the securing bolt 34, the nut 46, and the locking thumb screws 36.

FIG. 46A is an exploded view of the miter gauge (having a miter gauge bar 110 and miter gauge head 122) and drill guide block 114 shown from the perspective of the back side of the table saw 106. A toilet bolt 111 fits through an oblong hole 51 in the miter gauge bar 110 and threads into the bottom of the drill guide base 118. FIG. 46B is an enlargement view of FIG. 46A. FIG. 46C is an exploded view of the miter gauge and drill guide block 114 shown from the perspective of the front side of the table saw 106. FIG. 46D is an enlargement view of FIG. 46C that illustrates the engagement and connection established by the stove bolts 50 that extend partially through recessed slots formed on the guide base 118 to threadably engage the rod 124 that is captured in the horizontal holes 123 in the guide block 116.

47A is an exploded view of the miter gauge and drill guide block 114 shown from the perspective of the bottom of the table saw 106. FIG. 47B is an enlargement view of FIG. 47A. The drill guide base 118 is secured to the miter bar 110 with a toilet bolt 111 which is located in an oblong hole 51 in the middle of the miter bar 110. A groove 133 in the bottom of the miter bar 110 captures the head of the toilet bolt 111.

This configuration allows the guide block 114 to be slid and adjusted along the identified length of the miter bar 110. FIG. 48A is a perspective view of the drill guide block 114 secured to the miter bar 110 with a toilet bolt 111 which is located in a slot 51 in the middle of the miter bar 110. The slot 51 allows the drill guide 114 to rotate and move forward and backward along the miter bar 110 to a desired position and orientation, such as the dashed orientation identified at 107 whereat the drill guide 114 is skewed relative to the longitudinal axis of the miter bar 110. FIG. 48B is an enlargement view of FIG. 48A.

FIG. 49A is a perspective view of the drill guide block 114 secured to the miter bar 110 with a toilet bolt 111 which is located in a slot 51 in the middle of the miter bar 110. Again, the slot 51 allows the drill guide 114 to move forward and backward on the miter bar. This construction also allows the drill block 114 to be rotated so the drill guide holes can be located on the same side of the workpiece as the clamp 18 or located on the opposite side of the clamp 18. FIG. 49B is an enlargement view of FIG. 49A.

FIG. 50A shows a pocket hole drill block 116 positioned on a table saw 106 and secured to a miter gauge bar 110 with a toggle clamp 18 that is also attached to the miter bar 110. The clamp pad 20 presses the workpiece 14 toward the drill block 116. FIG. 50B is an enlargement view of FIG. 50A. In this example, the guide base 118 is shown removed, such that the guide block 116 is configured to directly interface with the miter head 122, as illustrated in the accompanying figures and described below. FIG. 51A is an exploded view of FIG. 50A. FIG. 51B is an enlargement view of FIG. 51A. FIG. 52A is an exploded perspective view of FIG. 50A, and FIG. 52B is an enlargement view of FIG. 52A. Slot 44 in the miter gauge head 122 allows the stop bolts 50, which are engaged with the rod 124 that is captured in one of the holes 123, to adjust the relative position of the drill block 116 up and down. The corrugated surfaces 64 on both the drill block 116 and defined along the upright portion 132 of the miter head 122 are configured to mesh and help secure the components when urged into engagement.

FIG. 53A is a perspective view of FIG. 50A from the back of the saw 106. FIG. 53B is an enlargement view of FIG. 53A. FIG. 54A is a close up view of the drill guide block 116 and the miter head 122. FIG. 54B illustrates the drill guide block 116 adjusted for drilling ¾ inch material, for example. FIG. 54C illustrates the drill guide block 116 adjusted for drilling 1⅛ inch material, for example. And, FIG. 54D illustrates the drill guide block 116 adjusted for drilling 1½ inch material, for example. Again, the relative positioning between the corrugated surfaces 64 on the guide block 116 and the corrugated surface 64 on the upright portion 132 of the miter head 122 provides for relative positioning and adjustment that can be tailored to accommodate a variety of application specific requirements.

FIG. 55A shows a pocket hole drill guide 114 and toggle clamp 18 secured to an aluminum extrusion with eight T-slots 120. In this example, the drill guide 114 includes the guide base 118 and the mating guide block 116. The clamp pad 20 presses the drill guide 114 against the workpiece 14, which is then clamped between the drill guide 114 and an alternative miter head 122 having a corrugated surface 64 along an upright portion 132. FIG. 55B is an exploded perspective view of FIG. 55A.

FIGS. 56 to 58 illustrate options of the disclosed concepts for customizing, for instance, the KREG K4 pocket hole jig. One option is to offer an aftermarket upgrade accessories kit for customizing the KREG K4 pocket hole jig 10 for the advantageous same side clamping and drilling.

FIG. 56A illustrates a KREG K4 pocket hole drill guide 10 and the toggle clamp 18 secured to a wide and thin aluminum extrusion with a T-slot 113. The clamp pad 20 presses the drill guide 12 against the workpiece 14. FIG. 56B is a close up of the wide extrusion T-slot 113. FIG. 56C is a perspective view that illustrates a toilet bolt 111 defining a head that fits into the T-slot of the wide extrusion 113 and screws into a flat nut 100 located in the KREG hole spacer 104. FIG. 56D is an exploded perspective view of FIG. 56C.

FIG. 57A is a top perspective view of an example modified KREG K4 pocket hole jig 10 illustrating the shape of the U-shaped extrusion 45 fitted into the drill guide cavity 94. FIG. 57B is an enlargement of the U-shaped extrusion 45 fitted into the drill guide cavity 94 shown in FIG. 57A. FIG. 57C shows a KREG K4 pocket hole drill guide 12 and toggle clamp 18 secured to a wide and thin aluminum extrusion with a T-slot 113. The clamp pad 20 presses the drill guide 12 against the workpiece 14 and toward the extrusion 45. FIG. 57D is an enlargement of FIG. 57C.

FIG. 58A is a top perspective view of a modified KREG K4 pocket hole jig 10 illustrating the shape of the U-shaped extrusion 45 fitted into the drill guide cavity 94. The drill guide 12 is secured to the jig floor through an oblong hole 151 with a toilet bolt 111. FIG. 58B is an enlargement of FIG. 58A. FIG. 58C is an enlargement of the toilet bolt 111 and flat nut 100 showing the direction of adjustment.

FIG. 59A is an L-shaped corrugated track 71 with an L-shaped flip stop 32 and a curved stop bottom accessory 84 secured to the bottom of the flip stop 32. FIG. 59B is the L-shaped flip stop 32 bolted to the corrugated flip stop base 66. FIG. 59C illustrates two pieces of the L-shaped corrugated track 71 and the L-shaped connector track 83. This type of L-shaped flip stop 32 (with or without the curved stop bottom accessory 84) can be adapted for use with the various embodiments and tracks described herein and as contemplated by one of ordinary skill given the benefit of this disclosure. FIG. 60A is an end view of the L-shaped track 71 and flip stop 32. FIG. 60B is the L-shaped track 71 and the L-shaped connector track 83. FIG. 60C is an enlargement of FIG. 60B. The mechanism that aids and enhances locking the extrusions together and inhibits relative rotation is the V-ridge 156 which fits into the V-groove 155.

FIG. 61A is a back view of the L-shaped track 71 with an attached micro-adjuster 126. FIG. 61B is an end view of the L-shaped track 71, L-shaped connector track 83, and the micro-adjuster extrusion 125. FIG. 61C is an end view of the L-shaped track 71, L-shaped connector track 83, and the micro-adjuster extrusion 125. The mechanism that locks the extrusions together and keeps them from rotating is the V-ridge 156 which fits into the V-groove 155. FIG. 61D is an end view of the micro-adjuster extrusion 125. FIG. 61E is a perspective view of the micro-adjuster 126 in contact with an L-shaped miter gauge extrusion 71. The micro-adjuster 126 is configured to facilitate granular adjustment of its distal positioning end, such as by incorporating a very fine thread resulting in a rotation to linear movement ratio allowing for fine adjustment (e.g., 1 rotation results in 0.02 inch of linear movement of the positioning end).

FIG. 62A is a perspective view of the miter gauge head 122. FIG. 62B is an enlargement of the miter gauge bar 110 with threaded holes 121 at, for example, 1 inch intervals. The miter gauge head 122 features accurately spaced holes 119 every ½ inch. FIG. 62C is an enlargement of the miter gauge scale 127 and a magnifier 128.

FIG. 63A is a perspective view of the miter gauge head 122 shown on the table saw 106. The miter gauge head 122 is shown with the miter gauge sled 129. The miter gauge sled 129 has holes 130 spaced 1 inch. FIG. 63B is an exploded, partial hidden view of the miter gauge head 122, bar 110, and sled sheet material 129 illustrating the holes 130 spaced 1 inch apart. The bar 110 has threaded holes 121 spaced at 1 inch intervals. The bar 110 is configured to ride in the track beneath the sled 129 while accommodating the miter gauge head 122 having a corrugated surface 64. FIG. 64A is a perspective view of a saw 131, an extrusion 71, and a stop 32. FIG. 64B is an enlargement of the flip stop assembly 32, and the corrugated fence extrusion 71. The extrusion track 71 and accompanying stop 32 are shown adapted for integration and use with the saw 131, such as an extension of the backstop or gate.

FIG. 65 is an illustration of an example KREG pocket hole drill guide 12 secured by an L-shaped connector bracket 39 and mounted on a miter gauge bar 110. The L-shaped connector bracket 39 captures the clamp pad 20 of the clamp 18. The embodiment shown is adapted (or easily modified) for use with, for example, a table saw, router, bench top, and the like, and can be efficiently incorporated and used given, for instance, the underlying bar 110.

Preferred embodiments of the invention have been described in considerable detail. Given the benefit of this disclosure, one skilled in the art will appreciate the various modifications and variations to the preferred embodiments described herein. Therefore, the invention should not be limited to the specific embodiments described.

I claim:

1. A flip stop assembly comprising:
   a base having a first base portion mated with a second base portion at a mating interface to define a flip stop opening through the base; and
   a flip stop rotatably received within the flip stop opening;
   wherein:
   the first base portion defines a first mating surface and a first set of interlocking members;
   the second base portion defines a second mating surface and a second set of interlocking members that are substantially identical to the first set of interlocking members;
   the first set of interlocking members and the second set of interlocking members are configured to interlock with each other to inhibit relative planar rotation and relative planar sliding at the mating interface between the first base portion and the second base portion when the first mating surface is mated with the second mating surface.

2. The flip stop assembly of claim 1, wherein the flip stop opening comprises multiple flip stop openings.

3. The flip stop assembly of claim 2, wherein:
   the first base portion defines a first wall of the multiple flip stop openings; and
   the second base portion defines a second wall of the multiple flip stop openings, such that the multiple flip stop openings are defined by the base when the first base portion is mated with the second base portion.

4. The flip stop assembly of claim 1, wherein:
   the first set of interlocking members are spaced apart such that a first land portion of the first mating surface extends between the first set of interlocking members; and
   the second set of interlocking members are spaced apart such that a second land portion of the second mating surface extends between the second set of interlocking members.

5. The flip stop assembly of claim 1, wherein:
   the first set of interlocking members includes a first v-ridge and a first v-groove;
   the second set of interlocking members includes a second v-groove and a second v-ridge;
   the first v-ridge of the first set of interlocking members and the second v-groove of the second set of interlocking members are configured to seat together; and
   the first v-groove of the first set of interlocking members and the second v-ridge of the second interlocking members are configured to seat together.

6. The flip stop assembly of claim 1, wherein at least one of the first base portion and the second base portion defines a contoured outer surface.

7. The flip stop assembly of claim 6, wherein the contoured outer surface is corrugated.

8. The flip stop assembly of claim 1, further comprising:
   a first slot opening defined through the first base portion;
   a second slot opening defined through the second base portion;
   a fastener positioned in the first slot opening and the second slot opening, wherein the fastener is configured to selectively couple the first base portion and the second base portion together and at different positions along and across a track supporting the flip stop assembly.

9. The flip stop assembly of claim 8, wherein the fastener comprises a bolt and a thumbnut configured to clamp together the first base portion and the second base portion.

10. The flip stop assembly of claim 1, wherein the flip stop further comprises:
    a flip stop arm; and
    a fastener extending from the flip stop arm and configured to rotatably capture the flip stop arm with the flip stop opening.

11. The flip stop assembly of claim 1, wherein the first base portion and the second base portion are substantially structurally identical such that the first base portion and the second base portion are configured to functionally mate to define the base when the first base portion is stacked with the second base portion.

12. The flip stop assembly of claim 1 further comprising a base adapter configured to mate with an outer surface of the base.

13. The flip stop assembly of claim 12, wherein:
    the base adapter defines a contoured base adapter mating surface;
    the base defines a contoured base mating surface;
    the contoured base adapter mating surface and the contoured base mating surface are configured to inhibit relative movement between the base adapter and the base in at least two orthogonal directions.

14. The flip stop assembly of claim 12, wherein the base adapter defines a track interface having a curved portion and a notched portion.

15. The flip stop assembly of claim 14, wherein the notched portion defines an acute corner.

16. A base for a flip stop assembly, the base comprising:
    an upper stop base defining an upper interlock portion and an upper mating surface with an upper arcuate interior portion; and
    a lower stop base defining a lower interlock portion and a lower mating surface with a lower arcuate interior portion;
    wherein the upper stop base is stacked on the lower stop base to engage the upper mating surface and the lower mating surface and to align the upper arcuate interior portion and the lower arcuate interior portion to define a flip stop opening through the base; and
    wherein the upper interlock portion and the lower interlock portion are configured to interlock with each other to inhibit relative movement between the upper stop base and the lower stop base in at least two orthogonal directions in a mating plane defined at the interface of the upper stop base and the lower stop base.

17. The base for a flip stop of claim 16, wherein:
    the upper interlocking portion comprises an upper set of upper interlocks defining an upper ridge and an upper groove;
    the lower interlocking portion comprises a lower set of interlocks defining a lower ridge and a lower groove;
    the upper ridge and the lower groove are configured to interlock; and
    the upper groove and the lower ridge are configured to interlock.

18. The base for a flip stop of claim 16 wherein the upper stop base and the lower stop base are operationally identical such that the upper stop base and the lower stop base are configured to permit stacking and functional engagement of the upper interlocking portion and the lower interlocking portion.

19. The base for a flip stop of claim 16, wherein:
    the upper stop base defines an upper oblong opening;
    the lower stop base defines a lower oblong opening;
    the upper oblong opening and the lower oblong opening are configured to receive a fastener to selectively couple the upper stop base and the lower stop base together and at different positions along and across a track supporting the base.

20. The base for a flip stop of claim 16, wherein:
    the upper mating surface defines multiple upper arcuate interior portions;
    the lower mating surface defines multiple lower arcuate interior portions; and
    the upper arcuate interior portions and the lower arcuate interior portions define multiple flip stop openings through the base.

* * * * *